US011292458B2

United States Patent
Urano et al.

(10) Patent No.: US 11,292,458 B2
(45) Date of Patent: Apr. 5, 2022

(54) AUTONOMOUS VEHICLE USER INTERFACE WITH PREDICTED TRAJECTORIES

(71) Applicant: Toyota Research Institute, Inc., Los Altos, CA (US)

(72) Inventors: Hiromitsu Urano, Ann Arbor, MI (US); Maiko Hirano, Nagoya (JP); Yusuke Sawamura, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 167 days.

(21) Appl. No.: 16/527,512

(22) Filed: Jul. 31, 2019

(65) Prior Publication Data

US 2021/0031759 A1 Feb. 4, 2021

(51) Int. Cl.
*B60W 30/09* (2012.01)
*B60W 30/095* (2012.01)
*B60W 50/14* (2020.01)

(52) U.S. Cl.
CPC ........ *B60W 30/09* (2013.01); *B60W 30/0953* (2013.01); *B60W 30/0956* (2013.01); *B60W 50/14* (2013.01); *B60W 2050/146* (2013.01)

(58) Field of Classification Search
CPC ....... B60W 30/09–0956; B60W 50/14; B60W 2050/146
See application file for complete search history.

(56) References Cited

U.S. PATENT DOCUMENTS

| 8,676,431 | B1 | 3/2014 | Mariet et al. |
| 8,849,494 | B1 | 9/2014 | Herbach et al. |
| 9,104,965 | B2 | 8/2015 | Fritsch et al. |

(Continued)

FOREIGN PATENT DOCUMENTS

| CN | 110007752 A | 7/2019 |
| DE | 102018113926 A1 | 12/2018 |

(Continued)

OTHER PUBLICATIONS

U.S. Appl. No. 16/527,483, filed Jul. 31, 2019 (not yet published).

(Continued)

*Primary Examiner* — Calvin Cheung
(74) *Attorney, Agent, or Firm* — Christopher G. Darrow; Darrow Mustafa PC

(57) ABSTRACT

Systems and methods are provided for generating trajectories for a vehicle user interface showing a driver's perspective view. Methods include generating an ego-vehicle predicted trajectory for an ego-vehicle; and generating at least one road agent predicted trajectory for a road agent that is external to the ego-vehicle. After the predicted trajectories are generated, the method continues by determining that at least one predicted trajectory overlaps either an object or another predicted trajectory, when displayed on the user interface showing a driver's perspective view. The method includes modifying the at least one road agent predicted trajectory to remove the overlap. The method then proceeds with updating a display of the user interface to include any modified road agent predicted trajectory. Systems include a trajectory-prediction module to execute the methods.

9 Claims, 36 Drawing Sheets

(56) References Cited

U.S. PATENT DOCUMENTS

| | | |
|---|---|---|
| 9,633,564 B2 | 4/2017 | Ferguson |
| 9,701,306 B2 | 7/2017 | Prokhorov et al. |
| 9,740,202 B2 | 8/2017 | Barton-Sweeney et al. |
| 9,934,625 B1 | 4/2018 | Wahba et al. |
| 10,156,850 B1 | 12/2018 | Ansari et al. |
| 2015/0046078 A1 | 2/2015 | Biess et al. |
| 2015/0100231 A1 | 4/2015 | Weir et al. |
| 2015/0210312 A1* | 7/2015 | Stein .................. G06K 9/00805 701/41 |
| 2016/0284218 A1 | 9/2016 | Ejiri |
| 2017/0083774 A1* | 3/2017 | Solar ..................... B60Q 1/143 |
| 2017/0101093 A1 | 4/2017 | Barfield, Jr. et al. |
| 2017/0169709 A1* | 6/2017 | Ando ..................... G08G 1/161 |
| 2018/0141544 A1 | 5/2018 | Xiao et al. |
| 2018/0143644 A1 | 5/2018 | Li et al. |
| 2018/0196437 A1 | 7/2018 | Herbach et al. |
| 2018/0292834 A1 | 10/2018 | Kindo |
| 2018/0326982 A1* | 11/2018 | Paris .................... G05D 1/0088 |
| 2019/0025841 A1 | 1/2019 | Haynes et al. |
| 2019/0164430 A1 | 5/2019 | Nix |
| 2019/0384292 A1 | 12/2019 | Aragon et al. |
| 2020/0004239 A1 | 1/2020 | Pedersen et al. |
| 2020/0086858 A1 | 3/2020 | Yao et al. |
| 2020/0089246 A1 | 3/2020 | McGill, Jr. et al. |
| 2020/0097738 A1 | 3/2020 | Aragon et al. |
| 2020/0133295 A1 | 4/2020 | Indrakanti et al. |
| 2020/0137191 A1 | 4/2020 | Neishaboori |

FOREIGN PATENT DOCUMENTS

| | | |
|---|---|---|
| EP | 3509032 A1 | 7/2019 |
| WO | 2017079321 A1 | 5/2017 |
| WO | 2019060927 A2 | 3/2019 |

OTHER PUBLICATIONS

U.S. Appl. No. 16/527,495, filed Jul. 31, 2019 (not yet published).

Fassbender et al., "An Optimization Approach to Trajectory Generation for Autonomous Vehicle Following," IEEE/RSJ International Conference on Intelligent Robots and Systems (IROS) Sep. 24-28, 2017.

Hsu et al., "Car Trajectory Prediction in Image Processing and Control Manners," 2016 IEEE International Conference an Intelligent Transportation Engineering.

* cited by examiner

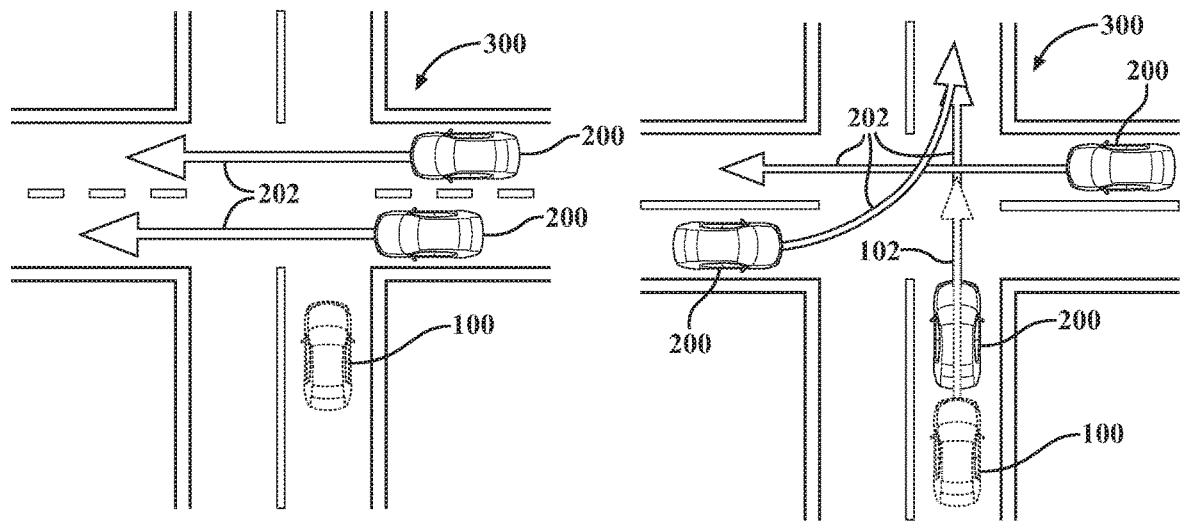
FIG. 4A  FIG. 4B
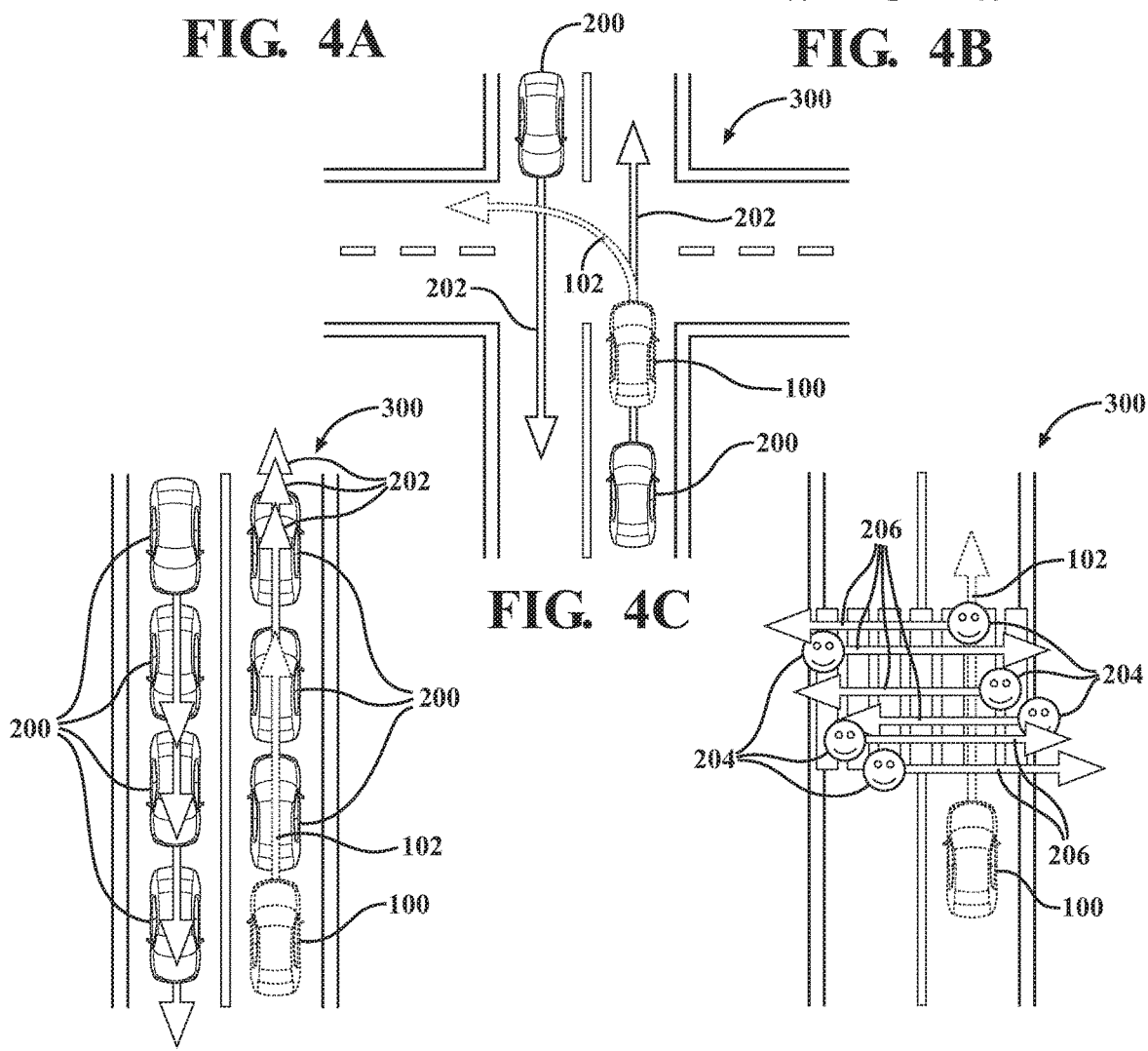
FIG. 4C
FIG. 4D  FIG. 4E

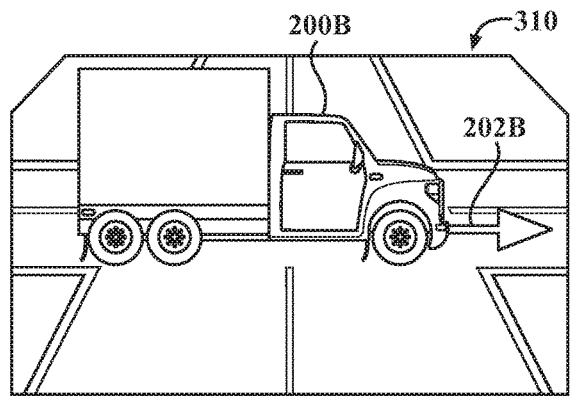
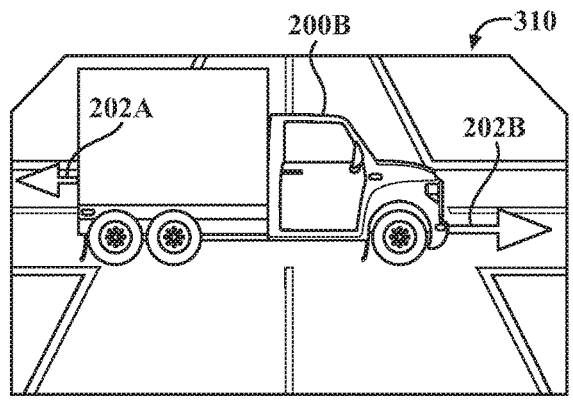
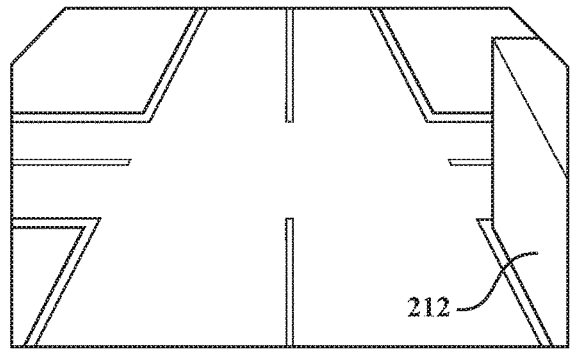
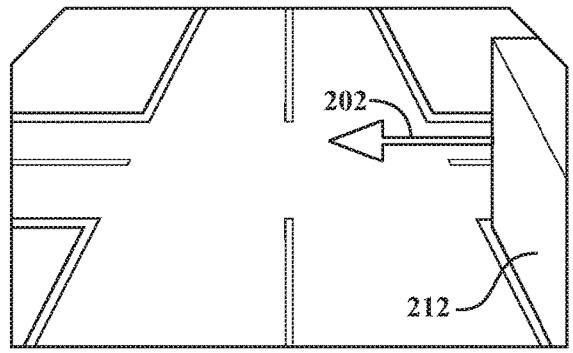
FIG. 24A  FIG. 24B
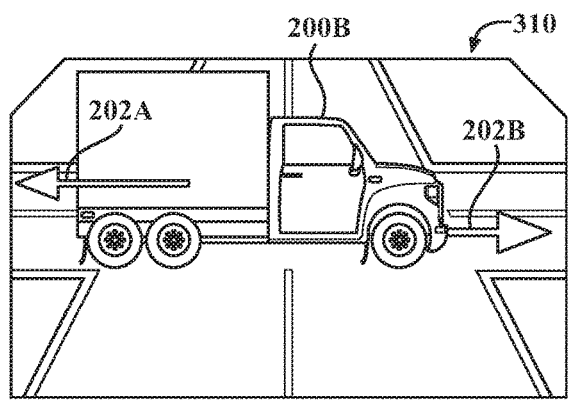
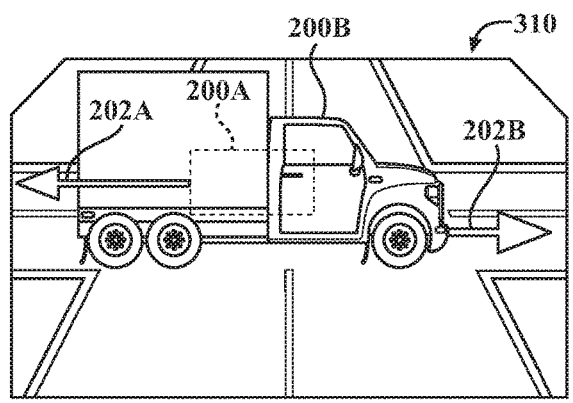
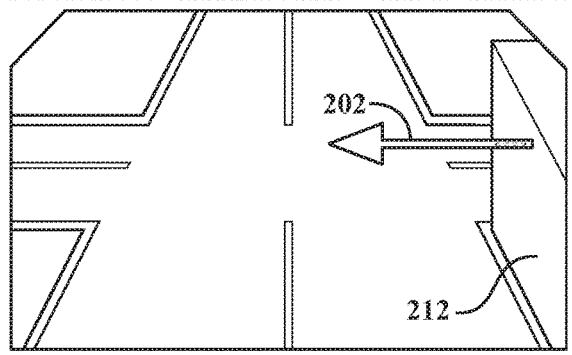
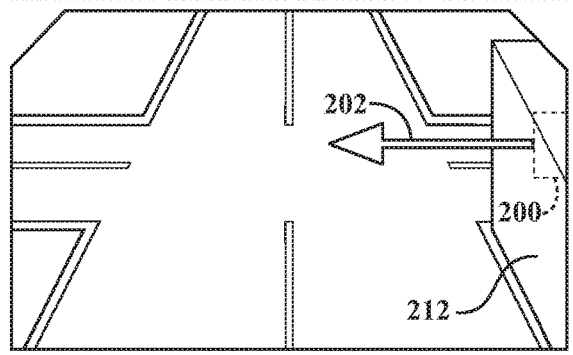
FIG. 24C  FIG. 24D

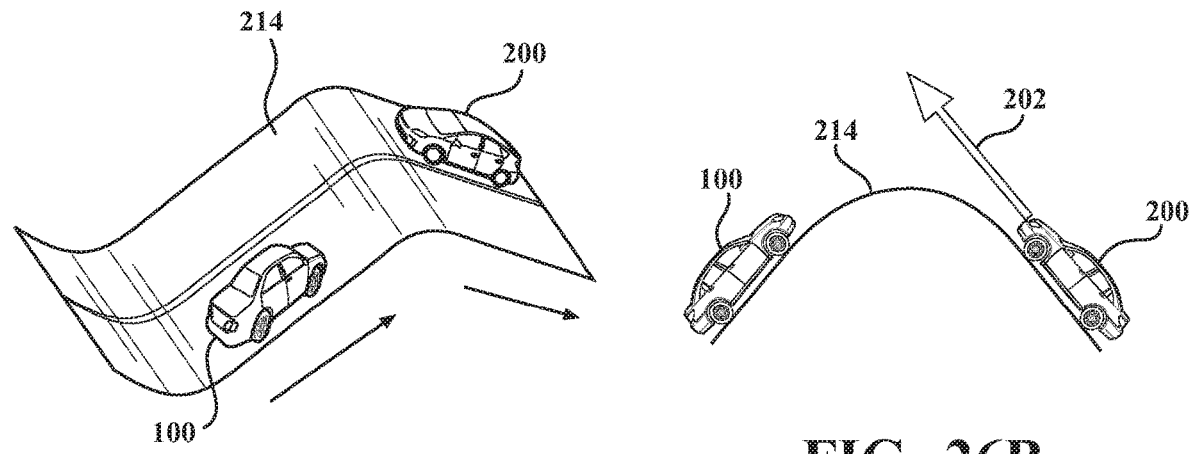
FIG. 26A
FIG. 26B
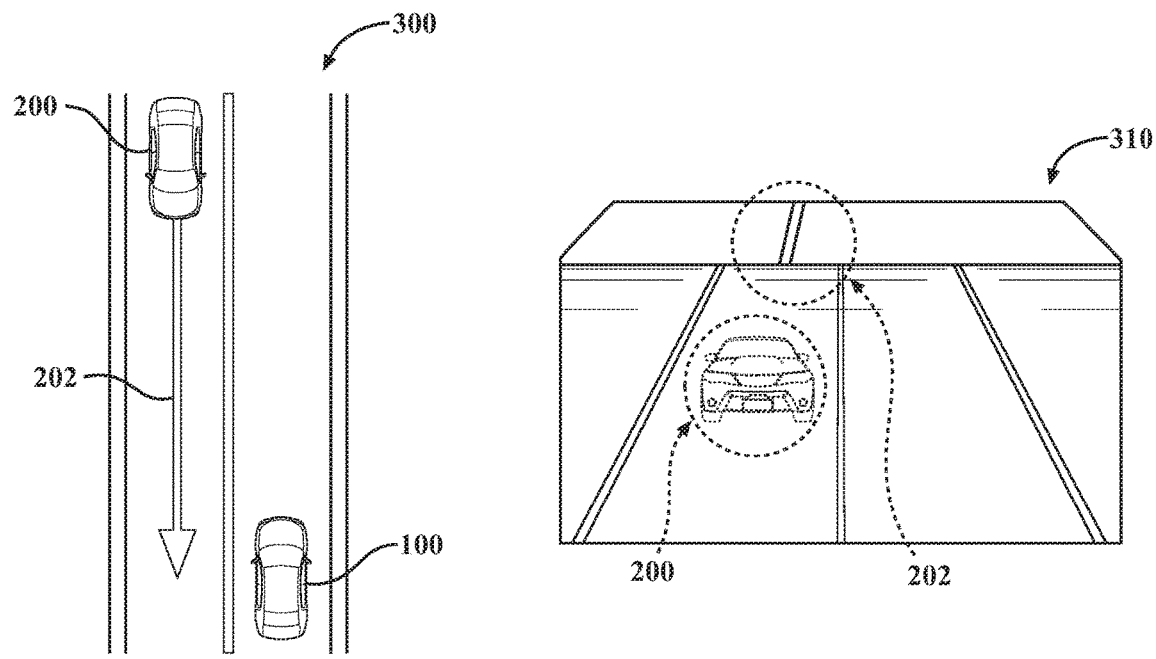
FIG. 26C
FIG. 26D

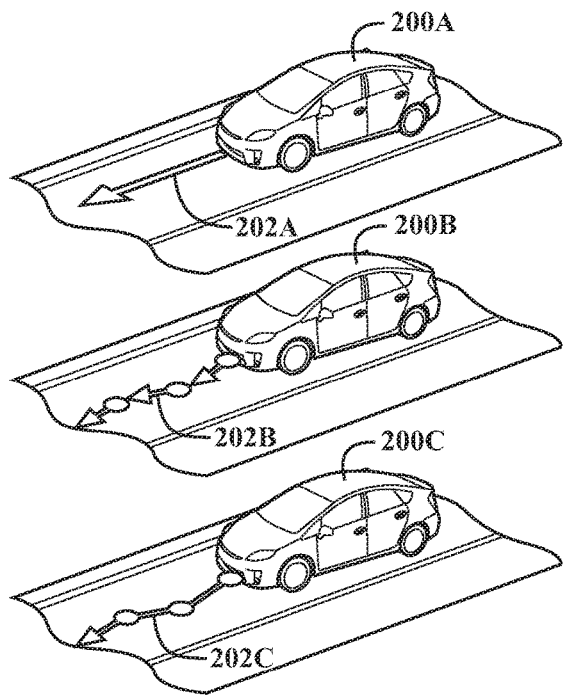
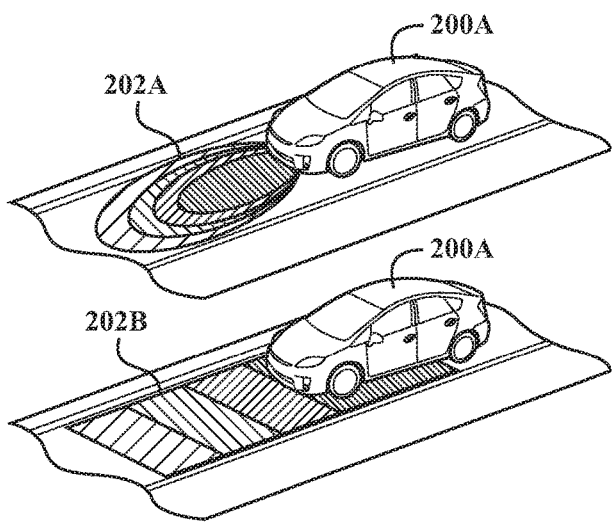
FIG. 35A
FIG. 35B
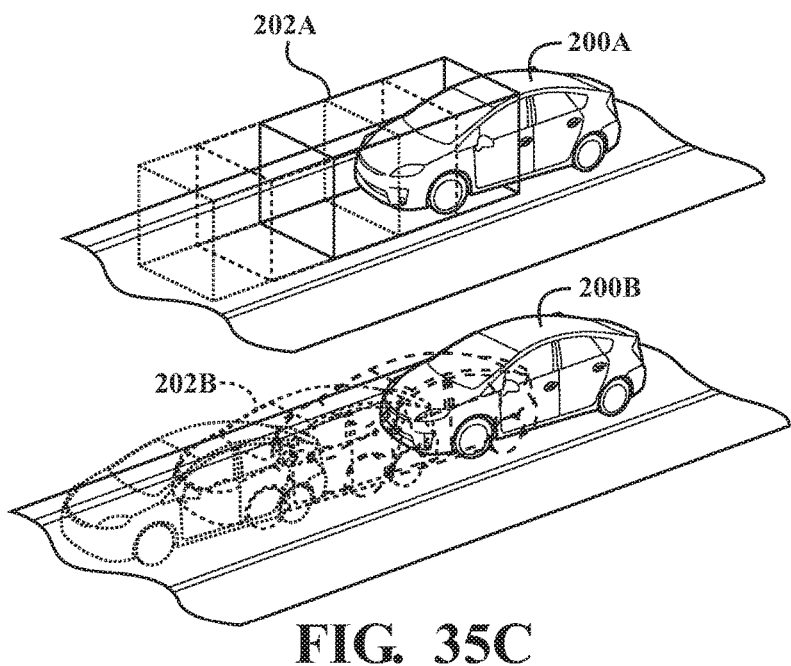
FIG. 35C

AUTONOMOUS VEHICLE USER INTERFACE WITH PREDICTED TRAJECTORIES

TECHNICAL FIELD

The present disclosure generally relates to user interfaces for autonomous vehicles and, more particularly, to systems and methods for modifying and displaying predicted trajectories on user interfaces that provide a driver's perspective view.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

In various applications, vehicular systems may predict the trajectory of a vehicle (sometimes referred to herein as the "ego-vehicle"). For example, a parallel-autonomy vehicle, such as a vehicle that includes an advanced driver-assistance system (ADAS), is a vehicle whose control may be shared between a human driver and an autonomous-driving system. The human driver may retain control of certain aspects of driving such a vehicle (e.g., steering) while the ADAS monitors the driver's actions and, when necessary, intervenes to prevent an accident. Predicting the trajectory of the ego-vehicle is thus an important aspect of such an ADAS. The vehicle system may display the ego-vehicle trajectories on a user interface.

The vehicular system may also predict the trajectory of one or more road agent(s) external to a vehicle, and display the road agent trajectories on the user interface display. Examples of road agents include various types of other vehicles (e.g., automobiles, motorcycles, or bicycles) and pedestrians. One objective for an autonomous vehicle or a parallel-autonomy vehicle is to travel a route without colliding with the road agents the vehicle encounters along the way. Since the intentions of road agents or their drivers are not usually known with certainty to an autonomous vehicle or the driver of a parallel-autonomy vehicle, predicting the trajectory of a road agent can further that objective.

However, when many road agent trajectories are provided on a user interface, it may quickly become overly complicated, especially when the display is provided as a driver's perspective view (as compared to a top plan view, for example). Accordingly, it would be desirable to provide improved trajectory prediction systems to adequately account for the presence of numerous and/or overlapping trajectories that may be provided on a user interface, which may lead to less complicated displays.

SUMMARY

This section provides a general summary of the disclosure, and is not a comprehensive disclosure of its full scope or all of its features.

In various aspects, the present teachings provide a system for generating trajectories for a vehicle user interface showing a driver's perspective view. The system includes one or more processors, and a memory communicably coupled to the one or more processors. The memory stores a trajectory-prediction module including instructions that when executed by the one or more processors cause the one or more processors to perform a series of steps. For example, the trajectory-prediction module may include an instruction to generate an ego-vehicle predicted trajectory for an ego-vehicle, and to generate at least one road agent predicted trajectory for a road agent that is external to the ego-vehicle. The instructions may include a step to determine that at least one road agent predicted trajectory protrudes from a display area and has an unknown direction of travel when displayed on the user interface showing a driver's perspective view. The instructions may include a step modify the at least one road agent predicted trajectory to provide an indication of direction. A control module may also be provided, including instructions that, when executed by the one or more processors, cause the one or more processors to update the user interface to include any modified road agent predicted trajectory.

In other aspects, the present teachings provide a system for generating trajectories for a vehicle user interface showing a driver's perspective view. The system includes one or more processors, and a memory communicably coupled to the one or more processors. The memory stores a trajectory-prediction module including instructions that when executed by the one or more processors cause the one or more processors to perform a series of steps. For example, the trajectory-prediction module may include an instruction to generate an ego-vehicle predicted trajectory for an ego-vehicle, and to generate at least one road agent predicted trajectory for a road agent that is external to the ego-vehicle. The instructions may include a step to determine that at least one predicted trajectory overlaps either an object or another predicted trajectory, when displayed on the user interface showing a driver's perspective view. The instructions may include a step to modify the at least one road agent predicted trajectory to remove the overlap. A control module may also be provided, including instructions that, when executed by the one or more processors, cause the one or more processors to update the user interface to include any modified road agent predicted trajectory.

In still other aspects, the present teachings provide a method for generating trajectories for a vehicle user interface showing a driver's perspective view. The method includes generating an ego-vehicle predicted trajectory for an ego-vehicle; and generating at least one road agent predicted trajectory for a road agent that is external to the ego-vehicle. After the predicted trajectories are generated, the method continues by determining that at least one predicted trajectory overlaps either an object or another predicted trajectory, when displayed on the user interface showing a driver's perspective view. The method includes modifying the at least one road agent predicted trajectory to remove the overlap. The method then proceeds with updating a display of the user interface to include any modified road agent predicted trajectory.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIGS. 4A-4E are five example displays illustrating a user interface having an image representing a top plan view of an ego-vehicle and at least one road agent vehicle or pedestrian with respective trajectories;

FIGS. 24A-24D illustrate additional modifications of at least one predicted trajectory, in accordance with the methods of FIG. 22;

FIGS. 26A-26D and 27A-27D illustrate modifications of at least one predicted trajectory, in accordance with the methods of FIG. 25;

FIGS. 35A-35C illustrate variations of predicted trajectories having different lines, 2-D patterns, and 3-D shapes;

Figure 1:
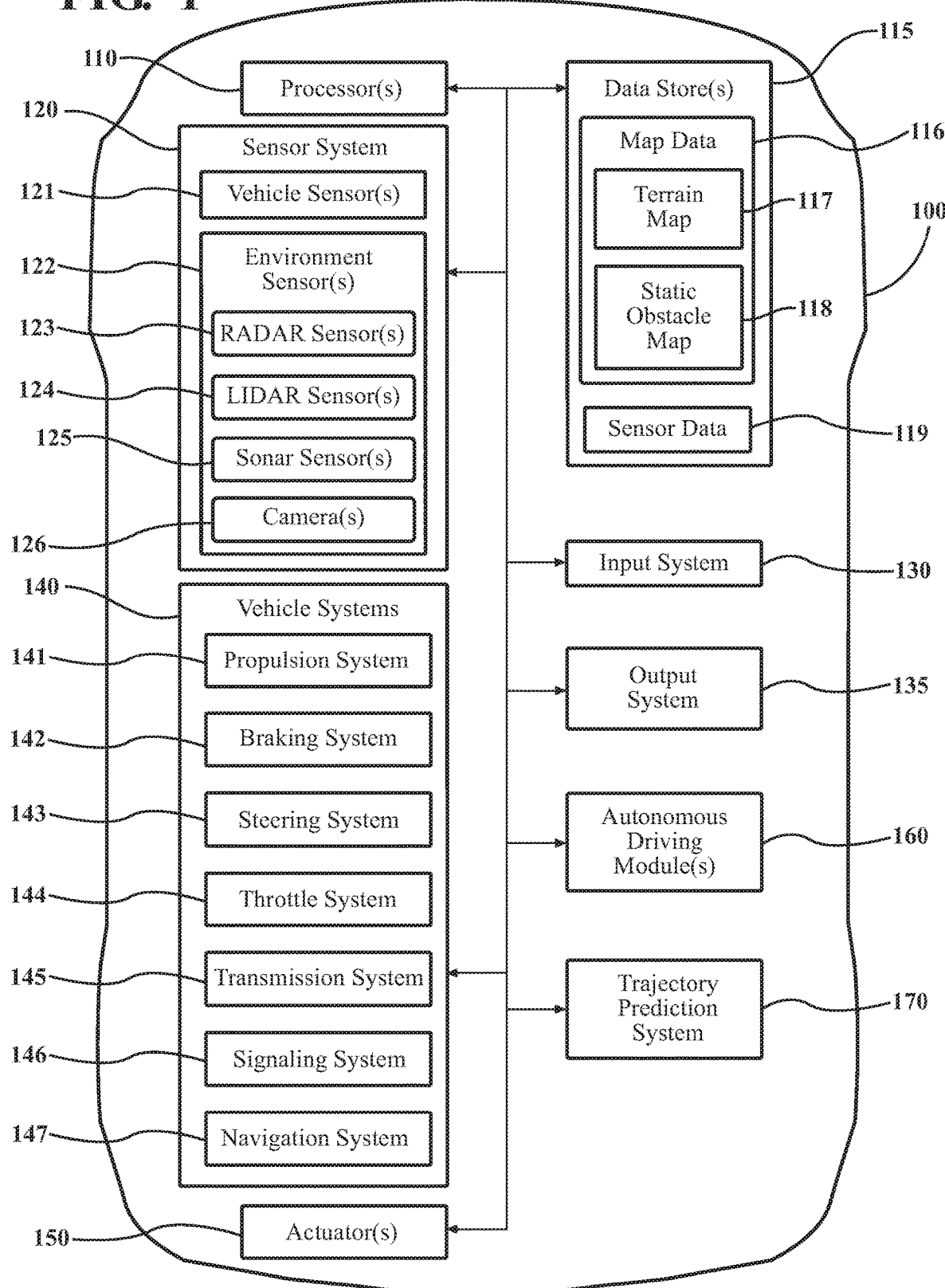
FIG. 1 is a schematic diagram illustrating an exemplary aspect of a vehicle within which systems and methods disclosed herein according to the present technology may be implemented.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific aspects within the scope of this technology. Further, certain aspects may incorporate features from a combination of figures.

DETAILED DESCRIPTION

The technology described herein pertains to an improved display of predicted road agent and ego-vehicle trajectories on a user interface. In particular, the technology improves how those trajectories can interact with one another and be adapted and/or simplified with respect to size, location, and various other details related to their display on the user interface. In this regard, this technology can simplify trajectory information presented to a user. For example, it can provide improved trajectory prediction systems providing displays that adequately account for the presence of numerous and/or overlapping trajectories that may be provided on a user interface, and may lead to less complicated views.

As used herein, the term "trajectory" or "trajectories" can refer to past, current, and future trajectories simulated, predicted, or observed for a given road agent, vehicle, ego-vehicle, etc. As used herein, the term "road agent" refers generally to any object that is capable of moving from place to place along, or in a manner that intersects with, a roadway. Such objects are not always necessarily in motion. For example, various aspects described herein consider an automobile, bus, bicycle, other type of vehicle parked along a street to be a road agent. In those aspects, the systems may track the parked automobile, along with other detected objects in the environment, using the vehicle's sensors. The sensor data will typically reveal that the road agent (the parked automobile) is stationary—that there is no trajectory associated with it that can be predicted at that time. However, in those various aspects, the system might continue to track the parked automobile because it could begin moving at any time. In various aspects, the road agents of interest are external to a vehicle (sometimes referred to herein as the "ego-vehicle" or "host vehicle") in which an aspect of the present technology is operating. Such road agents are sometimes referred to herein as "external road agents." Additional non-limiting examples of road agents include, without limitation, other vehicles of various types (automobiles, buses, motorcycles, bicycles, trucks, construction equipment, etc.), pedestrians, and animals. In some aspects, a road agent may simply be referred to as an object.

In non-limiting aspects, probabilistic variational trajectory predictors may be used to predict the ego-vehicle and/or road-agent trajectories, which may be referred to as predicted trajectories. In those aspects, the trajectory probability distributions for the ego-vehicle or a given road-agent, whichever applies, can be sampled to generate one or more specific predicted trajectories. Those predicted trajectories can be cross-fed and iteratively updated between the ego-vehicle and one or more road agents, as described above, and they can also be output to a control module of the ego-vehicle that controls, to at least some extent, the output provided to various displays and user interfaces of the ego-vehicle, as described further below. In some variational-predictor aspects, the statistical parameters of the trajectory probability distributions may be output to the control module of the ego-vehicle instead of specific trajectories sampled from the distributions.

Depending on the particular aspect, the ego-vehicle predicted trajectories can be created considering the predicted trajectories of multiple external road agents in any of a number of possible orderings. In one aspect, the road-agent predicted trajectories are prioritized by their distance from the ego-vehicle, those closer to the ego-vehicle receiving a higher priority than those farther away. In another aspect, the road-agent predicted trajectories are prioritized by any uncertainty associated with the road-agent predicted trajectories, those with less uncertainty (i.e., greater certainty) receiving a higher priority than those with greater uncertainty (i.e., lower certainty). Furthermore, intermediate predicted trajectories for the ego-vehicle and/or one or more external road agents during the iterative trajectory prediction process can be preserved, collected, and aggregated, taking into account all possible orderings of the external road agents. Keeping all of these various hypotheses alive permits the ego-vehicle's control module to consider all of the possible actions the road agents might take. This conservative approach furthers the objective of the ego-vehicle planning and traversing a safe trajectory.

Other techniques can be combined advantageously with the iterative-trajectory-prediction architecture described above: (1) employing multiple trajectory predictors to predict the future trajectory of the ego-vehicle and multiple trajectory predictors to predict the future trajectory of one or more road agents external to the ego-vehicle; and (2) generating confidence estimates for the predicted ego-vehicle and road-agent trajectories so that their trustworthiness can be evaluated. These techniques are explained further in the paragraphs that follow.

To predict the future trajectory of the ego-vehicle or a given external road agent, some aspects described herein employ two or more trajectory predictors that use different deterministic or probabilistic computational models. For example, in one aspect including two trajectory predictors, the first trajectory predictor is a probabilistic variational trajectory predictor that includes a DNN, and the second trajectory predictor is a physics-based (deterministic) model. In various aspects, the trajectory predictors receive, as inputs, any of a variety of vehicle sensor data discussed further below. Depending on the particular aspect, the trajectory predictors may also receive measured past trajectory information for the ego-vehicle or road agent, depending on which type of trajectory is being predicted.

Regarding the confidence estimates, one important aspect of the disclosed aspects is the temporal (time) horizon over which a vehicle or road-agent trajectory is predicted. For example, a given predicted trajectory from a particular trajectory predictor might be trustworthy over a relatively short temporal horizon of from about 0.1 to about 3 seconds, but it might not be trustworthy over a longer temporal horizon extending beyond about 3 seconds up to about 10 seconds. In some aspects, the confidence estimates for the ego-vehicle and road-agent predicted trajectories are computed as a continuous-time function over the applicable temporal horizon using a deep-neural-network (DNN) model. The confidence measures thus assist the trajectory prediction system in deciding which ego-vehicle or road-agent predicted trajectories are most trustworthy for particular segments of the overall temporal prediction horizon. In various aspects, the confidence scores associated with the iteratively updated ego-vehicle and road-agent predicted trajectories are also iteratively updated as the predicted trajectories themselves are iteratively updated.

Referring to FIG. 1, an example of a vehicle 100 (sometimes referred to herein as an "ego-vehicle") is illustrated. As used herein, a "vehicle" is any form of motorized transport. In one or more implementations, the vehicle 100 is an automobile. While arrangements will be described herein with respect to automobiles, it will be understood that aspects are not limited to automobiles. In some implementations, the vehicle 100 may be any other form of motorized transport that, for example, can operate at least semi-autonomously.

The vehicle 100 also includes various elements. It will be understood that in various aspects it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. Some of the possible elements of the vehicle 100 are shown in FIG. 1 and will be described along with subsequent figures. However, a description of many of the elements in FIG. 1 will be provided after the discussion of the remaining figures for purposes of brevity of this description.

Figure 2:
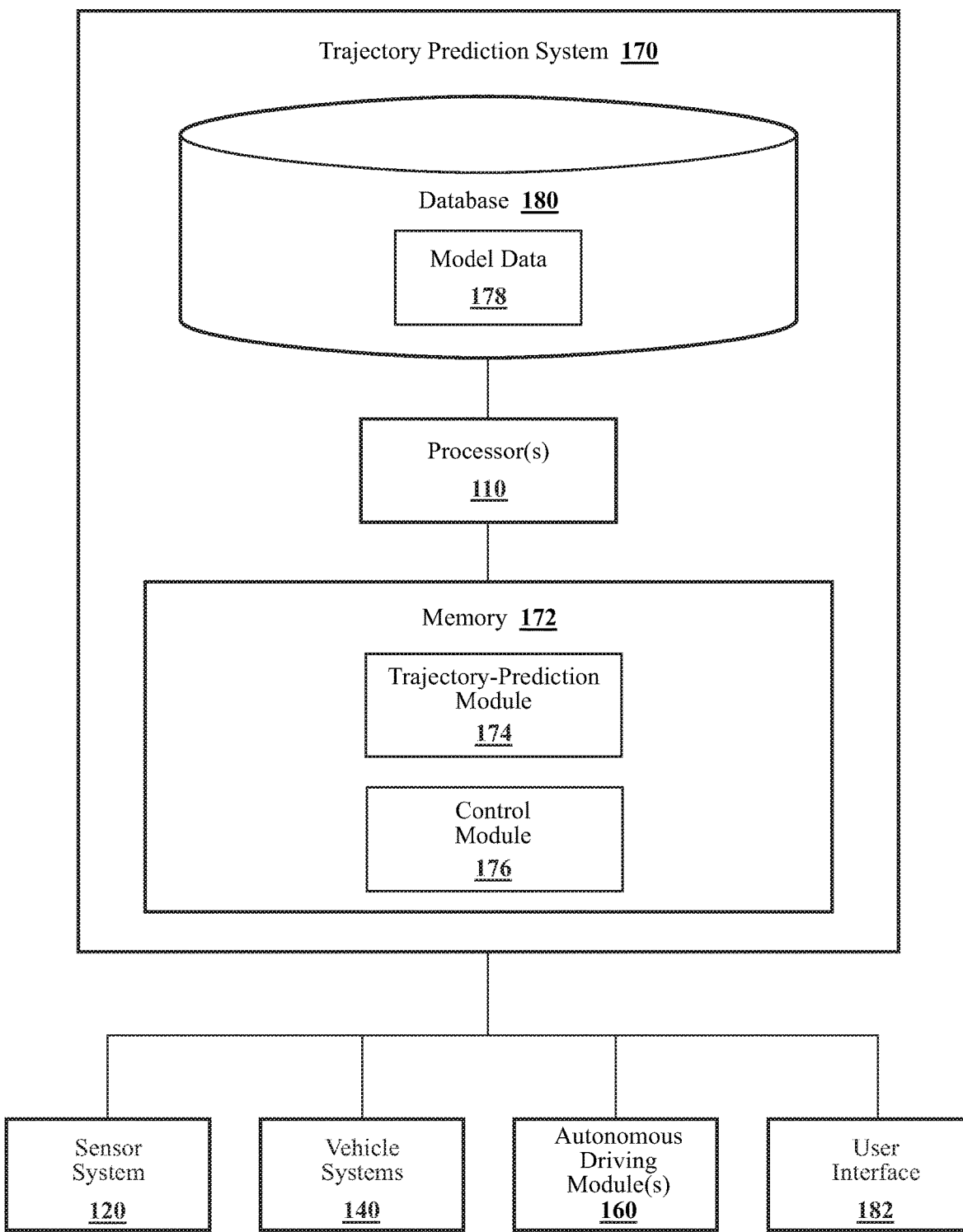
FIG. 2 is a schematic diagram illustrating an exemplary aspect of a trajectory prediction system as provided in FIG. 1.

With reference to FIG. 2, an exemplary trajectory prediction system 170 of FIG. 1 is illustrated. The trajectory prediction system 170 is implemented to perform methods and other functions as disclosed herein relating to controlling the operation of vehicle 100 based, at least in part, on past, current, observed, or predicted future trajectories of the vehicle 100 itself and/or based on past, current, observed, or predicted trajectories of one or more road agents external to the vehicle 100. In some aspects, the trajectory of the vehicle 100 or a road agent can be modeled in three-dimensional space.

The trajectory prediction system 170 is shown as including one or more processors 110 from the vehicle 100 of FIG. 1. The one or more processors 110 may be a part of the trajectory prediction system 170, the trajectory prediction system 170 may include one or more separate processors from the one or more processors 110 of the vehicle 100, or the trajectory prediction system 170 may access the one or more processors 110 through a data bus or another communication path, depending on the embodiment. In one aspect, the trajectory prediction system 170 includes a memory 172 that stores at least a trajectory-prediction module 174 and a control module 176. The memory 172 may be a random-access memory (RAM), read-only memory (ROM), a hard-disk drive, a flash memory, or other suitable memory for storing the modules 174, 176. The modules 174, 176 are, for example, computer-readable instructions that when executed by the one or more processors 110, cause the one or more processors 110 to perform the various functions disclosed herein.

In connection with predicting the trajectory of the vehicle 100, the trajectory prediction system 170 can store various kinds of model-related data 178 in a database 180. As shown in FIG. 1, the trajectory prediction system 170 may receive sensor data from a sensor system 120 in the vehicle 100 (the ego-vehicle). For example, in some aspects, the trajectory prediction system 170 receives image data from one or more cameras 126. The trajectory prediction system 170 may also receive LIDAR data from LIDAR sensors 124, radar data from radar sensors 123, and/or sonar data from sonar sensors 125, depending on the particular embodiment. In some aspects, the trajectory prediction system 170 also receives inputs from vehicle systems 140. Examples include, without limitation, steering wheel angle, gas pedal (accelerator) position, linear velocity, and angular velocity. Steering-wheel-angle and gas-pedal-position data are examples of what may be termed controller-area-network (CAN bus) data, and linear velocity and angular velocity are examples of what may be termed Inertial Measurement Unit (IMU) data. Certain of the above types of sensor data pertain to predicting the trajectory of vehicle 100 (the ego-vehicle) but not to predicting the trajectory of an external road agent, as explained further below. As also indicated in FIG. 1, the trajectory prediction system 170, in particular the control module 176, can communicate with vehicle systems 140 and/or autonomous driving module(s) 160 to assist with semi-autonomous or autonomous control over various functions of the vehicle 100. The control module 182 also includes instructions that cause the one or more processors 110 to control the operation of the user interface system 182 and coordinate the data, including predicted trajectories, provided to various displays throughout the vehicle 100.

In some aspects, other or additional kinds of data from sensor system 120 can be fed to the trajectory prediction system 170, such as radar, and/or sonar data. Additionally, more highly structured data such as a rasterized map data (e.g., an occupancy grid for the environment surrounding vehicle 100) can be fed to a variational trajectory predictor. The specific kinds of raw sensor data or structured data are fed to the trajectory prediction system 170 can vary, depending on the aspect.

In some aspects that include confidence scores, described below, the confidence scores may be computed based, at least in part, on the number of iterations that occur between the prediction of ego-vehicle trajectories and the prediction of road-agent trajectories while the predicted ego-vehicle and road-agent trajectories are being iteratively updated. In general, a greater number of iterations corresponds to a higher level of confidence in the resulting predicted trajectories because the predicted trajectories tend to converge to more stable predictions after sufficient iterations.

As described in detail herein, the trajectory-prediction module 174 generally includes instructions that cause the one or more processors 110 to produce one or more predicted trajectories for the vehicle 100 (the ego-vehicle) and one or more predicted trajectories for at least one external road agent for display on a user interface. Various user interface designs may be useful for displaying trajectory information regarding the present technology, and the description provided herein is not meant to limit the types of displays useful with the present technology.

Figure 3:
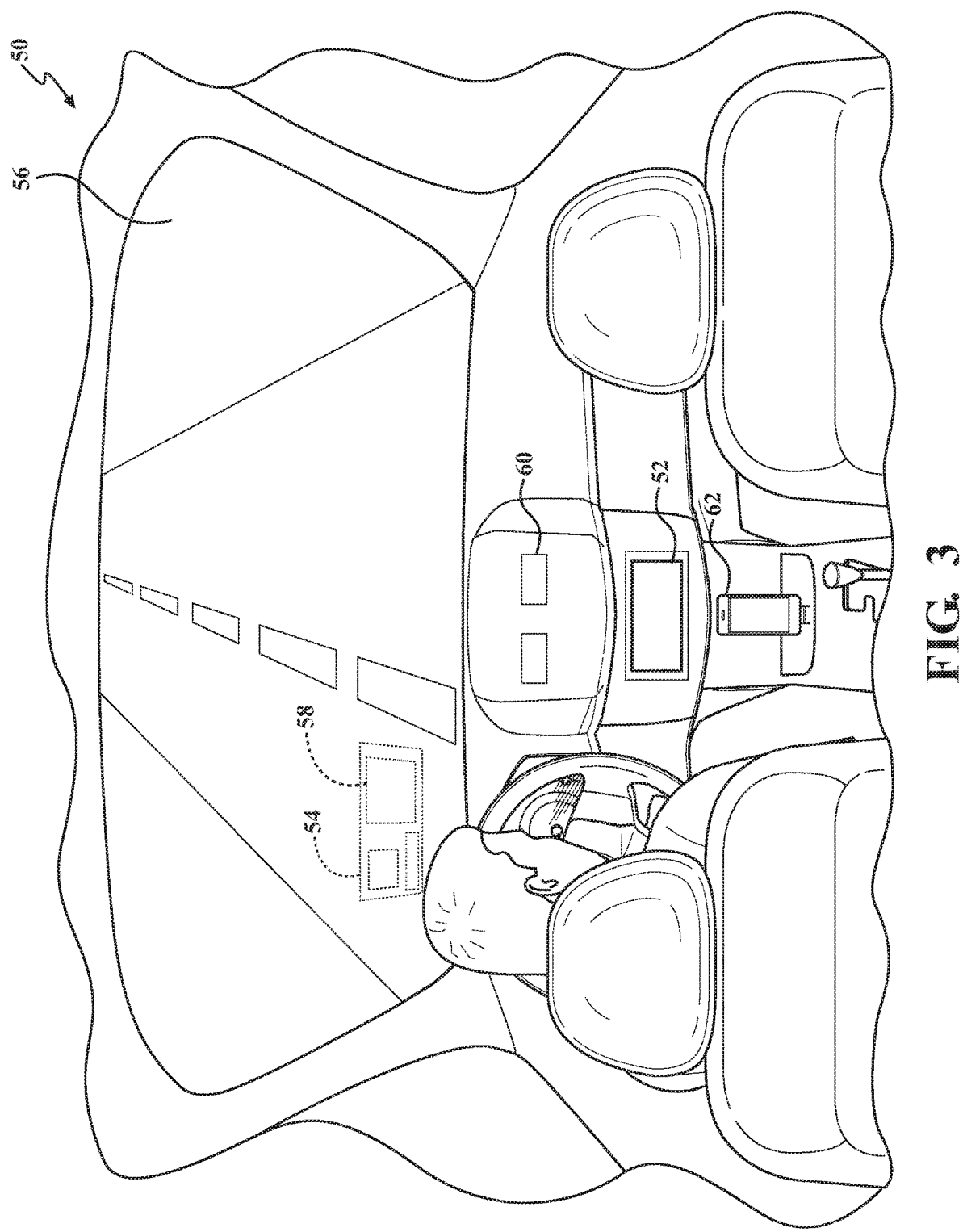
FIG. 3 illustrates a partial perspective view of an interior cabin of an exemplary vehicle interior compartment, providing multiple display systems that can be used, either singly or in combination, to provide a user interface display(s) according to various aspects of the present technology.

FIG. 3 provides a partial perspective view of an exemplary vehicle interior compartment 50, illustrating two front seats for vehicle passengers, as well as various vehicle controls. As can be seen, the vehicle includes a navigation display 52 and a head's up display (HUD) 54 projected on a windshield 56 with multiple panels 58 that can accommodate the display for a user interface. Multi-information displays (MIDs) 60, such as screens/displays that can toggle between different informational displays, can also be used, located in various areas of the vehicle interior compartment. In other aspects, personal electronics devices such as phones 62, tablets (not shown), and the like can also be used for display purposes. A number of variations in the architecture just described are possible, depending on the particular aspect. In various aspects, the systems and methods provided herein may include the use of a road agent provided as an automobile, a motorcycle, a bicycle, and/or a pedestrian; and the vehicle user interface is one of a navigation display, a multi-information display, a heads-up display (HUD), a head mounted display (HMD), a remote operator display, and a wearable device. Multiple display may be used in combination with one another and may include different perspective points of view.

FIGS. 4A-4E are five example displays illustrating a user interface having an image representing a top plan view 300 of an ego-vehicle 100 and at least one road agent such as a vehicle 200 or pedestrian 204 with respective trajectories 202, 206. FIGS. 5A-5E are five example displays illustrating a user interface having an image representing a front perspective view 310, or driver's view, of the same ego-vehicle 100 and the road agent vehicle(s) 200 or pedestrians 202 and their respective trajectories 202, 204 in the same scenarios as provided in FIGS. 4A-4E, showing an overlap in trajectories and vehicles.

Figure 5A:
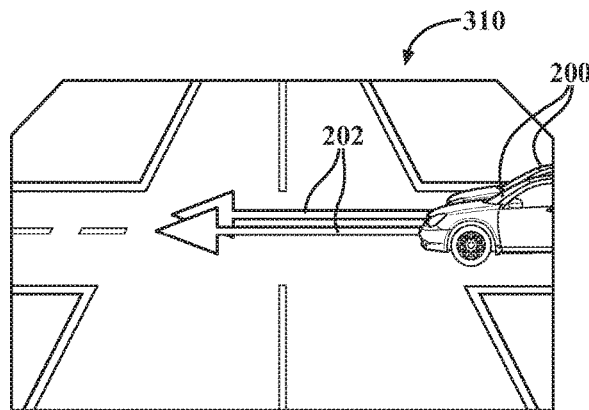
FIGS. 5A-5E are five example displays illustrating a user interface having an image representing a front perspective view, or driver's view, of the ego-vehicle and the road agent vehicle(s) or pedestrians and their respective trajectories in the same scenarios as provided in FIGS. 4A-4E, showing an overlap in trajectories and vehicles.
Figure 5B:
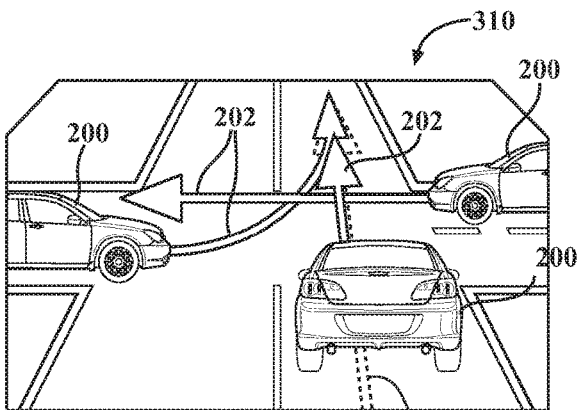
Figure 5C:
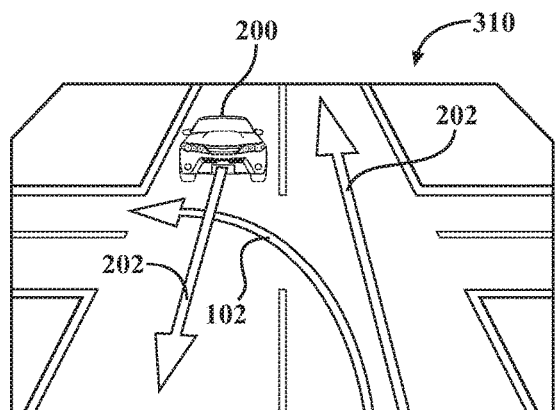
Figure 5D:
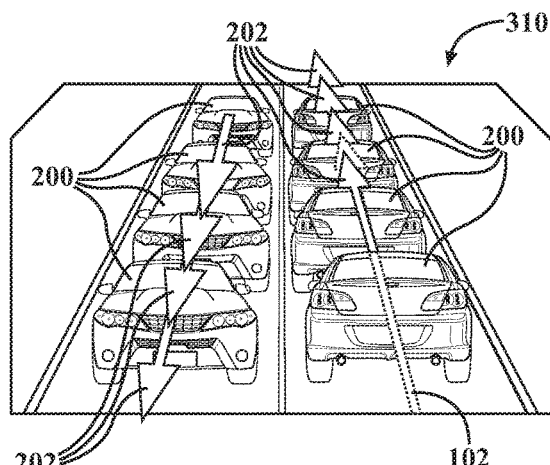
Figure 5E:
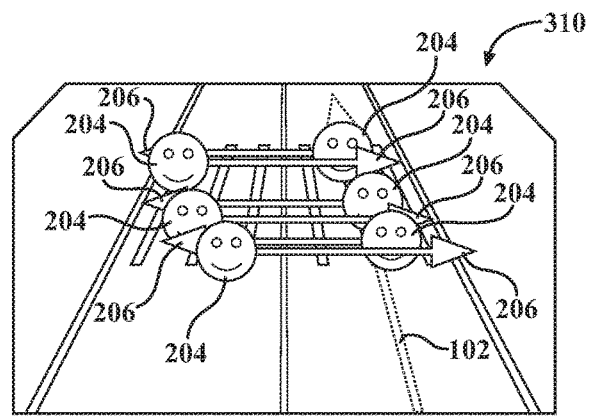

For example, FIG. 4A illustrates a top plan view 300 with two road agent vehicles 200. While the road agent predicted trajectories 202 do not overlap in FIG. 4A, in FIG. 5A, with the driver's perspective point of view 310, the road agent predicted trajectories 202 are close to one another, with portions overlapping that may cause confusion to a user. FIGS. 4B-4D illustrate top plans views 300 of an ego-vehicle 100 with an ego-vehicle predicted trajectory 102 and a plurality of road agent vehicle 200 and their respective road agent predicted trajectories 202 in different traffic patterns. As shown, the various predicted trajectories 102, 202 not only overlap with one another, they also overlap certain of the road agent vehicles themselves, likely causing confusion with a user. FIGS. 5B-5D illustrate driver's views 310 of those vehicles 100, 200 and the similar overlap of predicted trajectories 102, 202, also providing a complex visualization likely interfering with visibility and/or causing confusion with a user. FIGS. 4E and 5E illustrate the ego-vehicle 100 and predicted trajectory 102 adjacent a cross-walk with a plurality of pedestrians 204 and their respective predicted trajectories 206, with various overlapping.

Figure 6:
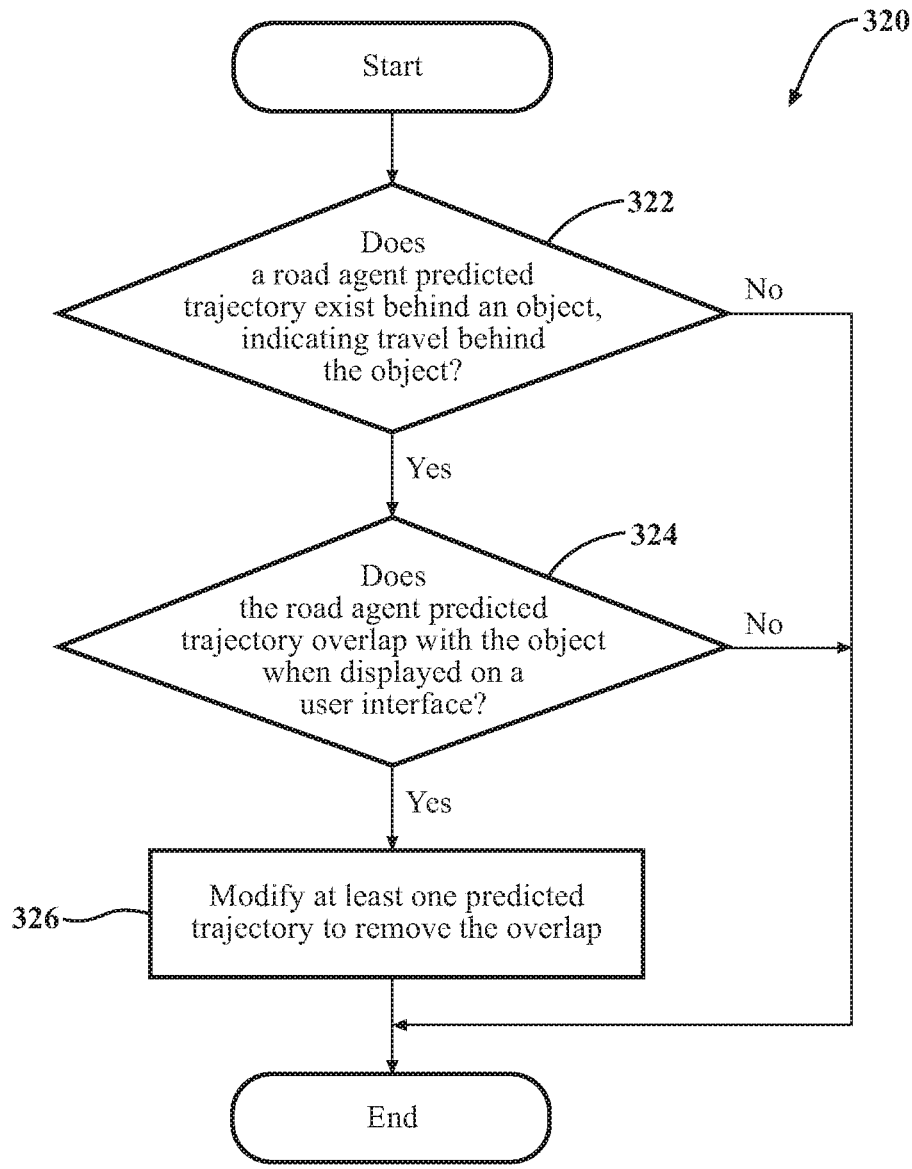
FIG. 6 is a flow chart diagram of a method of modifying at least one predicted trajectory based on an overlap of the predicted trajectory with an object, in accordance with an illustrative aspect of the present technology.

FIG. 6 is a flow chart diagram of a method 320 of modifying at least one predicted trajectory based on an overlap of the predicted trajectory with an object, in accordance with an illustrative aspect of the present technology. The method 320 is for generating trajectories for a vehicle user interface showing a driver's perspective view. The method first includes generating an ego-vehicle predicted trajectory 102 for an ego-vehicle 100, and generating at least one road agent predicted trajectory 202 for a road agent that is external to the ego-vehicle 100. The road agent(s) can be other vehicles 200, pedestrians 204, and combinations thereof. As indicated by method step 322, after the respective predicted trajectories 102, 202 are generated, the method 320 continues by determining that at least one road agent predicted trajectory 202 exists behind an object when viewed in the driver's perspective, indicating travel behind the object. As indicated by method step 324, the method continues to determine whether the predicted trajectory 202 overlaps with the object, when displayed on the user interface showing a driver's perspective view. Unless otherwise indicated, the term "object", as used with the methods described herein, can broadly include a static object, such as a parked vehicle, building, median divider, etc.; and/or can also include a moving object, which may include a moving vehicle, a moving pedestrian, and the like. The method 320 then includes modifying the at least one road agent predicted trajectory 202 to remove the overlap, as indicated by method step 326. The method then proceeds with updating a display of the user interface to include any modified road agent predicted trajectory(s). With renewed reference to FIG. 2, in various aspects, a control module 176 can be used to provide instructions to one or more processors 110 and/or the user interface system 182 to update a user interface to include a display of any modified road agent predicted trajectory.

Figure 7:
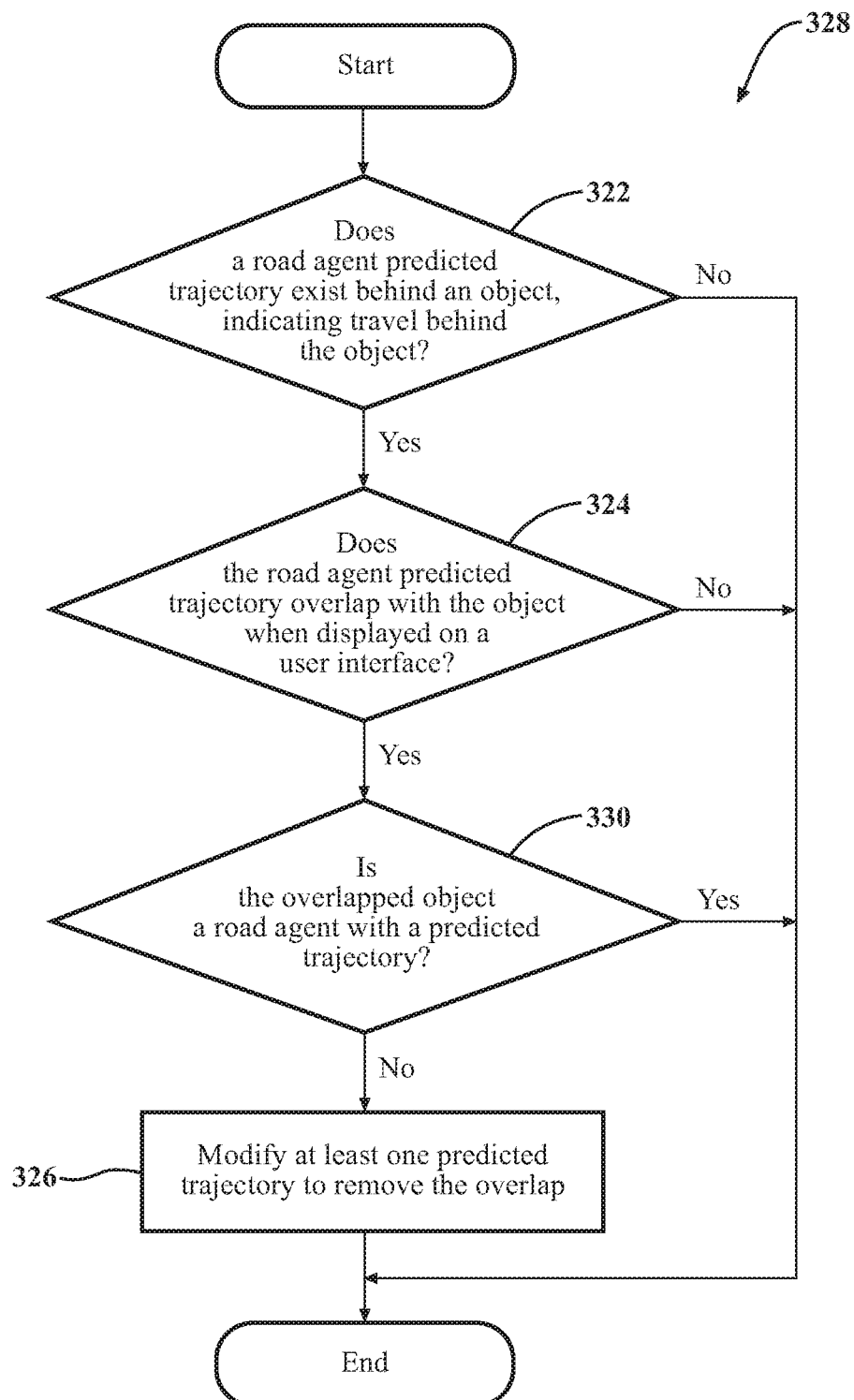
FIG. 7 is another flow chart diagram of a method of modifying at least one predicted trajectory based on an overlap of the predicted trajectory with an object, in accordance with an illustrative aspect of the present technology.

FIG. 7 is a flow chart diagram of a method 328 of modifying at least one predicted trajectory based on an overlap of the predicted trajectory with an object, similar to the method 320 of FIG. 6, but with an additional feature. As shown in FIG. 7, there is an additional method step 330 of determining whether the object is a road agent with its own predicted trajectory. If so, no modifications are made. If it is not a source, then the modifications are made.

Figure 8A:
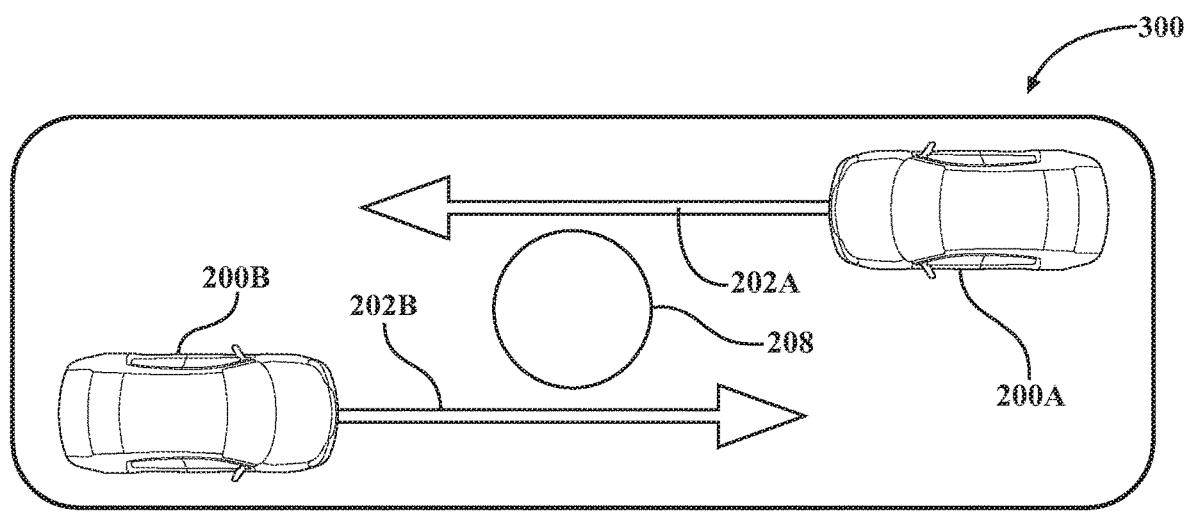
FIGS. 8A-8C illustrate a modification of at least one predicted trajectory based on an overlap with an object, in accordance with an illustrative aspect of the present technology.
Figure 8B:
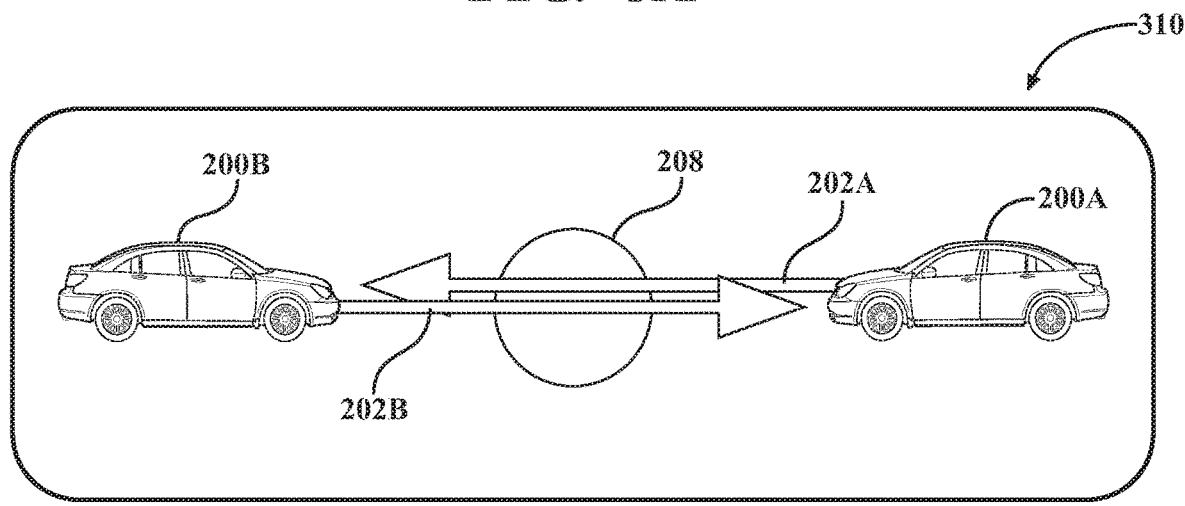
Figure 8C:
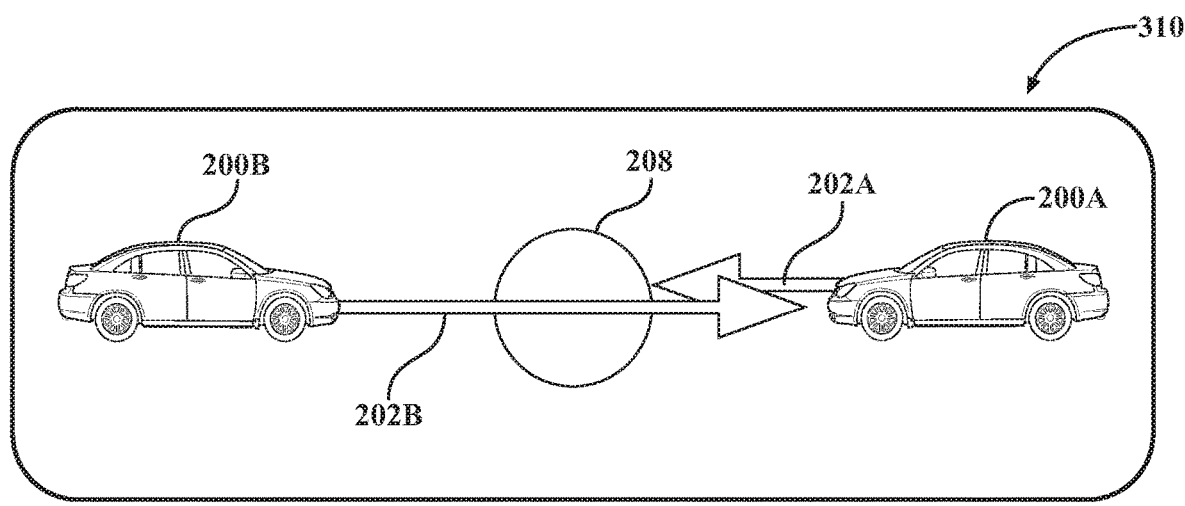

FIGS. 8A-8C illustrate the modification of at least one predicted trajectory based on an overlap with an object, in accordance with the methods of FIGS. 6-7. FIG. 8A is a top plan view 300 that provides two road agent vehicles 200A, 200B, each with a respective road agent predicted trajectory 202A, 202B with an arrow to indicate a direction of travel. The road agent vehicles 200A, 200B are travelling in opposite directions. From the ego-vehicle driver's perspective point of view, one vehicle 200A will travel behind an object 208, and one vehicle 200B will travel in front of the object 208. FIG. 8B provides the driver's perspective point of view 310 of the situation as presented in FIG. 8A. As shown in FIG. 8B, the road agent predicted trajectory 202A may cause confusion because it overlaps the object 208 and it appears that the vehicle 200A will travel in front of the object 208 while, in reality, the vehicle 200A will travel behind the object 208. FIG. 8C illustrates the resulting modification of a length of the road agent predicted trajectory 202A being shortened so as to no longer overlap with the object 208.

Figure 9A:
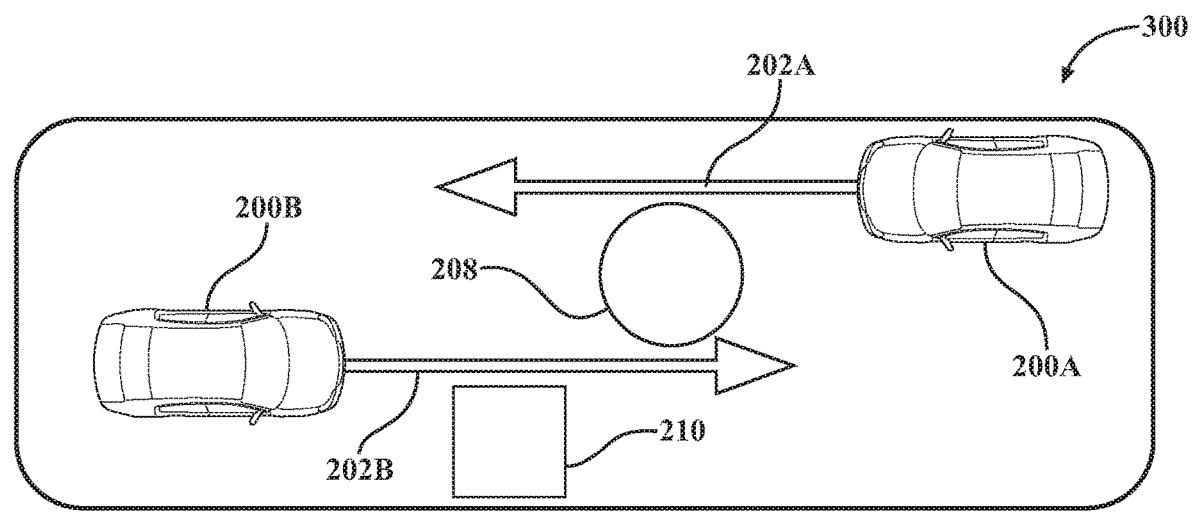
FIGS. 9A-9C illustrate a modification of at least one predicted trajectory based on an overlap with two objects, in accordance with an illustrative aspect of the present technology.
Figure 9B:
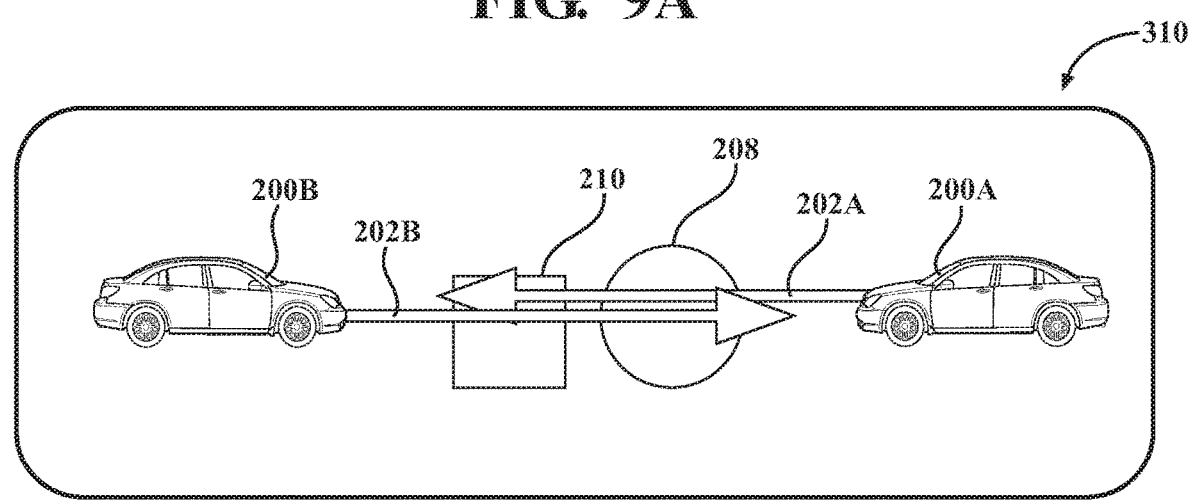
Figure 9C:
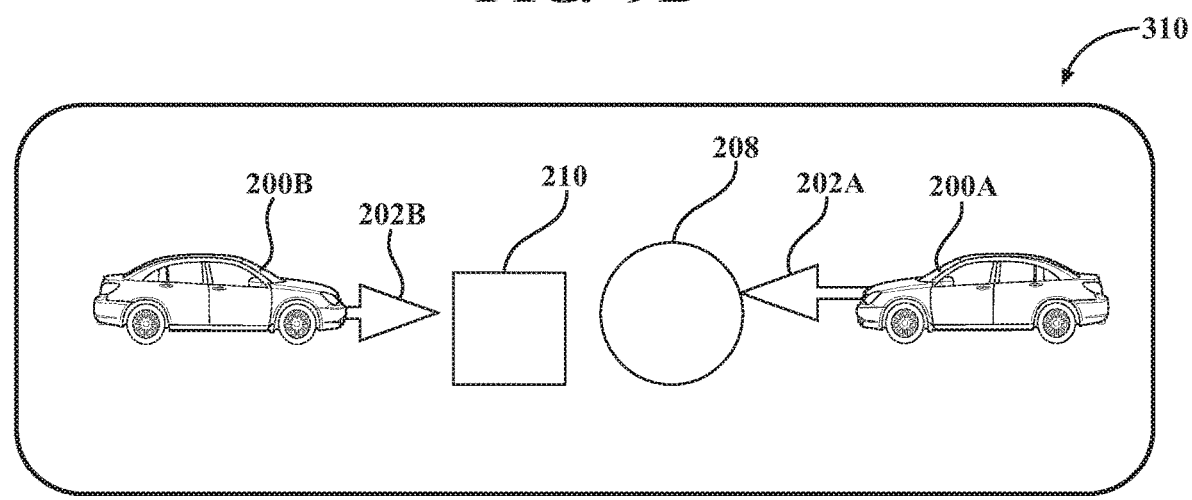

FIGS. 9A-9C illustrate a modification of at least one road predicted trajectory based on an overlap with two objects, in accordance with an illustrative aspect of the present technology. FIG. 9A is a top plan view 300 that provides two road agent vehicles 200A, 200B, each with a respective road agent predicted trajectory 202A, 202B with an arrow to indicate a direction of travel. The road agent vehicles 200A, 200B are travelling in opposite directions. From the ego-vehicle driver's perspective point of view, one vehicle 200A will travel behind a first object 208, and one vehicle 200B will travel in front of the first object 208, but behind a second object 110. FIG. 9B provides the driver's perspective point of view 310 of the situation as presented in FIG. 9A. As shown in FIG. 9B, the road agent predicted trajectories 202A, 202B may cause confusion because they both overlap the objects 208, 210 and it appears that both vehicles 200A, 200B will travel in front of the objects 208, 210 while, in reality, the vehicle 200A will travel behind the first object 208, and the vehicle 200B will travel in front of the first object 208 and behind the second object 210. FIG. 9C illustrates the resulting modification of a length of the both road agent predicted trajectories 202A, 202B being shortened so as to no longer overlap with the objects 208, 210.

Figure 10:
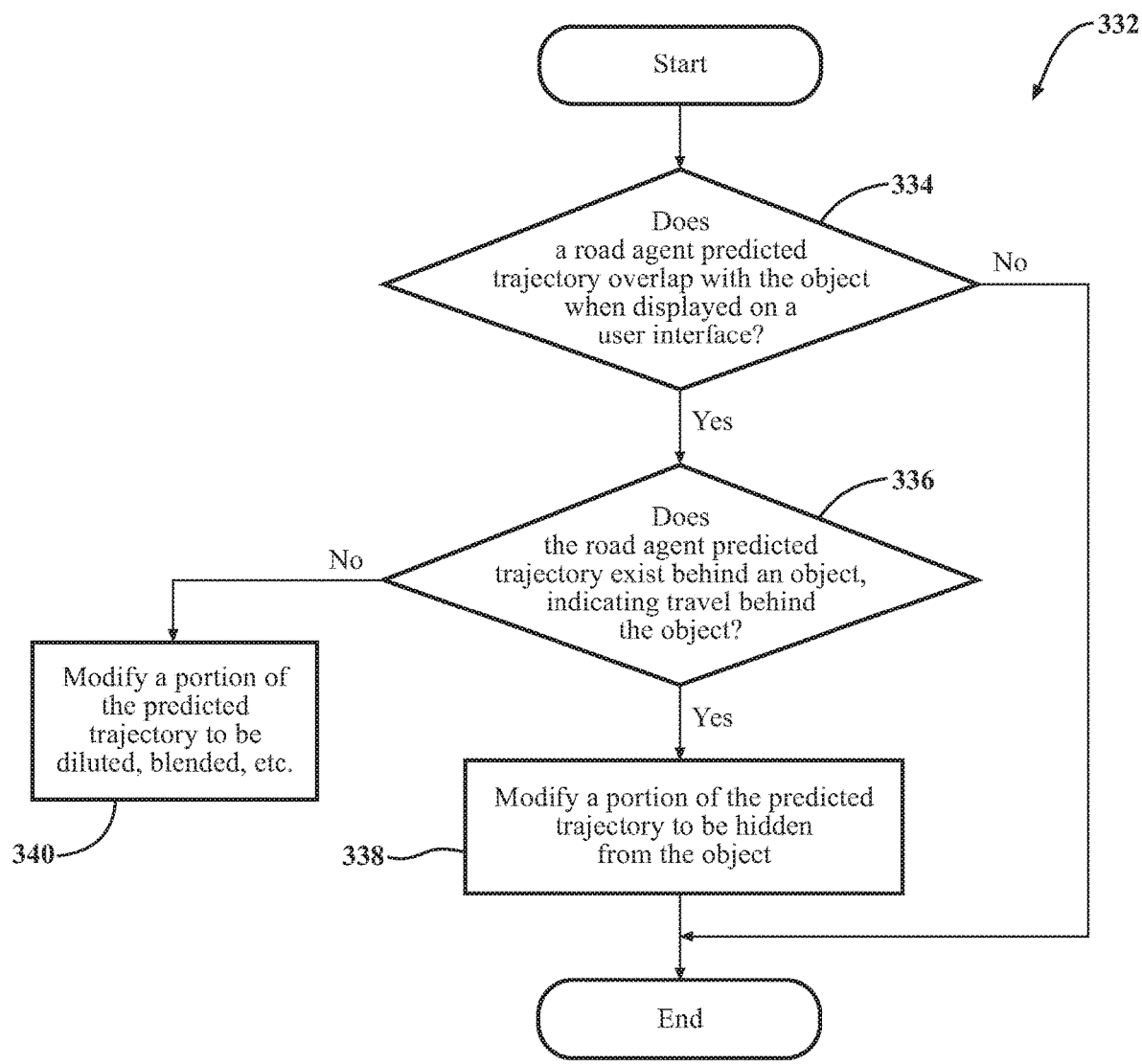
FIG. 10 is flow chart diagram of a method of modifying at least one predicted trajectory based on an overlap with an object by hiding, diluting, and/or diluting the predicted trajectory, in accordance with various aspects of the present technology.

FIG. 10 is flow chart diagram of a method 332 of modifying at least one road predicted trajectory based on an overlap with an object by hiding, diluting, and/or diluting the predicted trajectory, in accordance with various aspects of the present technology. The method step of 334 determines whether a road agent predicted trajectory overlaps with an object when displayed on a user interface with a driver's perspective point of view. Similar to the method 320 of FIG. 8, this method 332 also determines whether a road agent predicted trajectory exists partially or fully behind an object, indicating travel behind the object, as illustrated in method step 336. If yes, the method 332 proceeds by modifying a display of the object and the predicted trajectories. For example, a portion or an entirety of the road agent predicted trajectory may be modified so as to be hidden from, or behind, the object, as illustrated in method step 338. If not, the method 332 proceeds by modifying a portion or entirety of the predicted trajectory to be diluted, blended, or the like, as illustrated in method step 340, in order for the user to better understand the anteroposterior relationship in the situation. In other aspects, the method includes instructions to modify a display of the object such that a first part of the road agent predicted trajectory appears hidden behind the object when displayed on the user interface showing a driver's perspective view; and modify a second part of the road agent predicted trajectory using at least one technique selected from the group consisting of hiding, diluting, and blending.

Figure 11A:
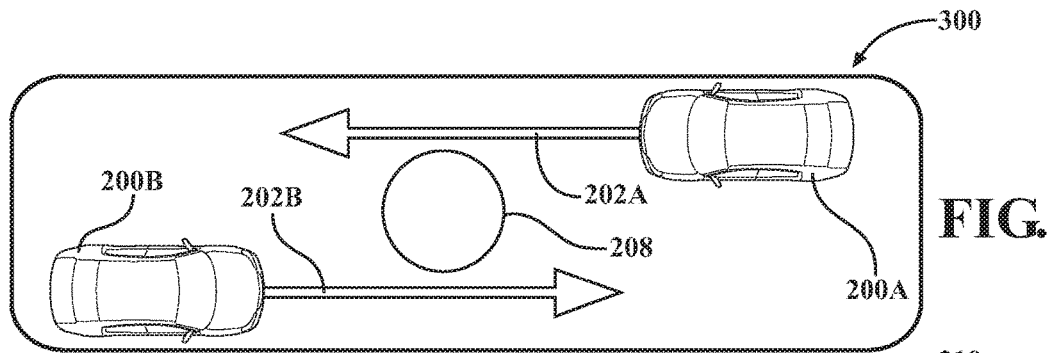
FIGS. 11A-11E illustrate various modifications of at least one predicted trajectory, in accordance with the methods of FIG. 10.
Figure 11B:
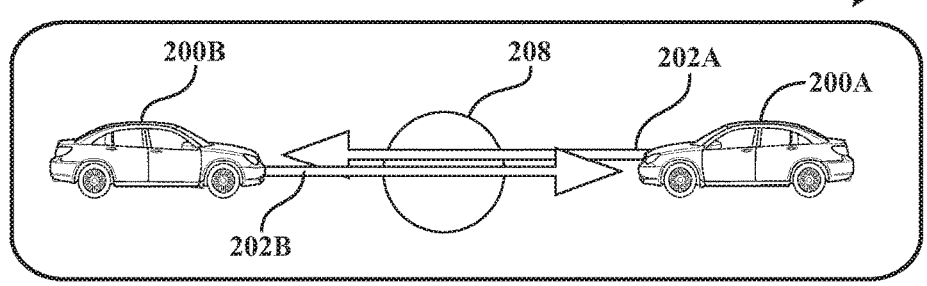
Figure 11C:
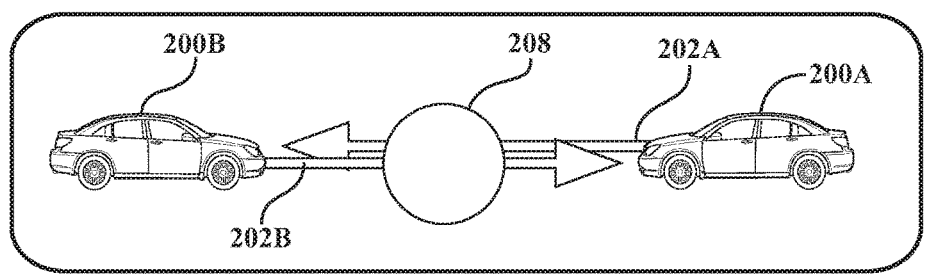
Figure 11D:
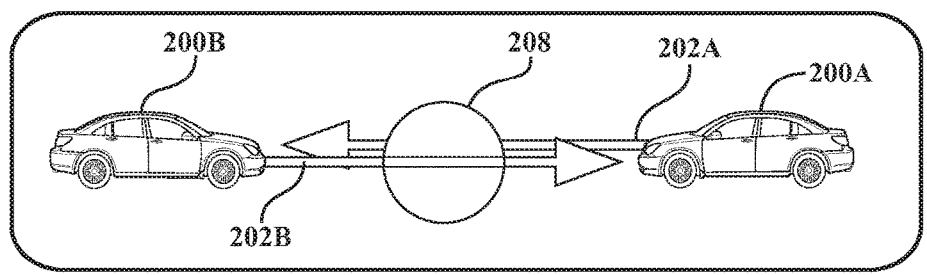
Figure 11E:
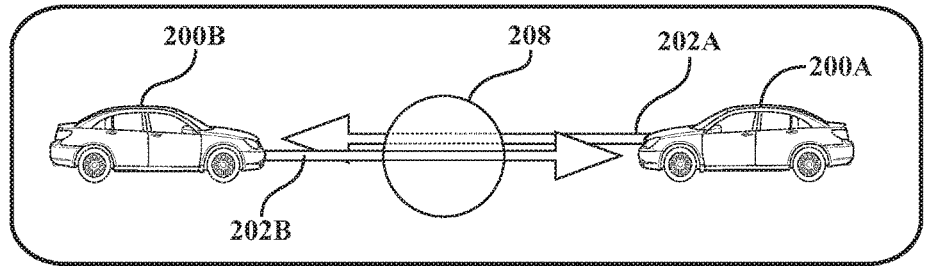

FIGS. 11A-11E illustrate various modifications of at least one road agent predicted trajectory, in accordance with the methods 332 of FIG. 10. FIG. 11A is a top plan view 300 that provides two road agent vehicles 200A, 200B, each with a respective road agent predicted trajectory 202A, 202B with an arrow to indicate a direction of travel. The road agent vehicles 200A, 200B are travelling in opposite directions. From the ego-vehicle driver's perspective point of view, one vehicle 200A will travel behind an object 208, and one vehicle 200B will travel in front of the object 208. FIG. 8B provides the driver's perspective point of view 310 of the situation as presented in FIG. 8A. As shown in FIG. 8B, the road agent predicted trajectory 202A may cause confusion because it overlaps the object 208 and it appears that the vehicle 200A will travel in front of the object 208 while, in reality, the vehicle 200A will travel behind the object 208. FIG. 11C provides a first resulting modification of having both road agent predicted trajectories 202A, 202B being modified as to have a portion of each be hidden behind the object 208. This provides a user with a more clear view of the object 208, however, there may be an ambiguity as to whether the second vehicle 200B is travelling in front of, or behind, the object 208. FIGS. 11D and 11E may provide a user with a more clear understanding of the situation. In FIG. 11D, the road agent predicted trajectory 202A for the road agent vehicle 200A travelling behind the object is partially hidden behind the object 208, while the road agent predicted trajectory 202B for the road agent vehicle 200B travelling in front of the object 208 is partially blended with the object 208. In FIG. 11E, the road agent predicted trajectory 202A for the road agent vehicle 200A travelling behind the object is partially diluted behind the object 208, while the road agent predicted trajectory 202B for the road agent vehicle 200B travelling in front of the object 208 is partially blended with the object 208. Different combinations of hiding, blending, and diluting can be used.

Figure 12:
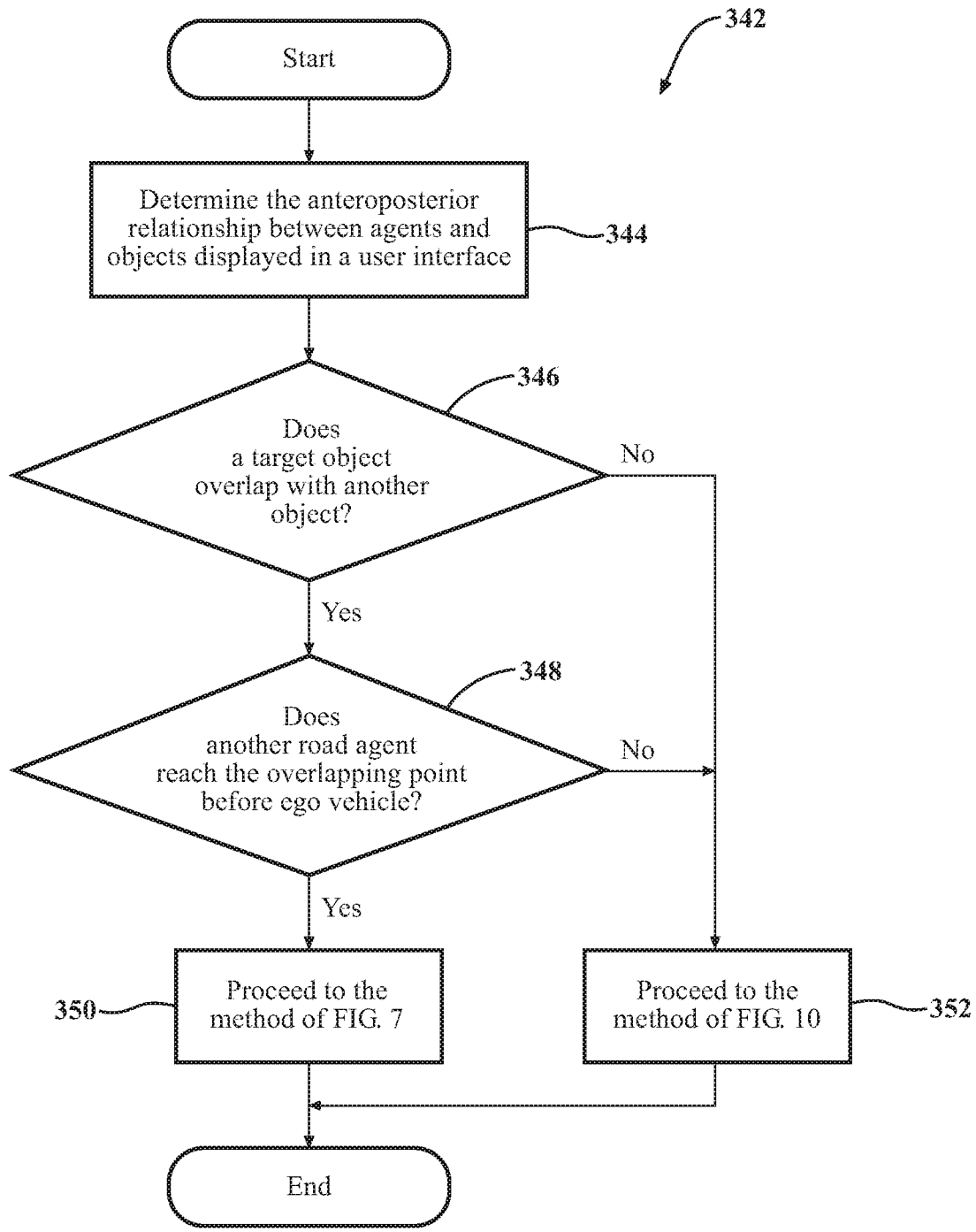
FIG. 12 is a flow chart diagram of a method of selecting different techniques of modifying at least one predicted trajectory based on different overlaps, in accordance with various aspects of the present technology.

FIG. 12 is a flow chart diagram of a method 342 of selecting different techniques of modifying at least one predicted trajectory based on different overlaps, in accordance with various aspects of the present technology. As illustrated in method step 344, the method determines the anteroposterior relationship between various road agents and objects that are displayed in a user interface display having a driver's perspective point of view. The method then determines whether a target object overlaps with another object, as illustrated by method step 346. If there is an overlap the method determines whether another road agent reaches the overlapping point before the ego-vehicle will reach the overlapping point. If yes, step 350 of the method directs the use of the method as provided in FIG. 7 to modify the road agent predicted trajectories. If not, step 352 of the method directs the use of the method as provided in FIG. 10 to modify the road agent predicted trajectories.

Figure 13A:
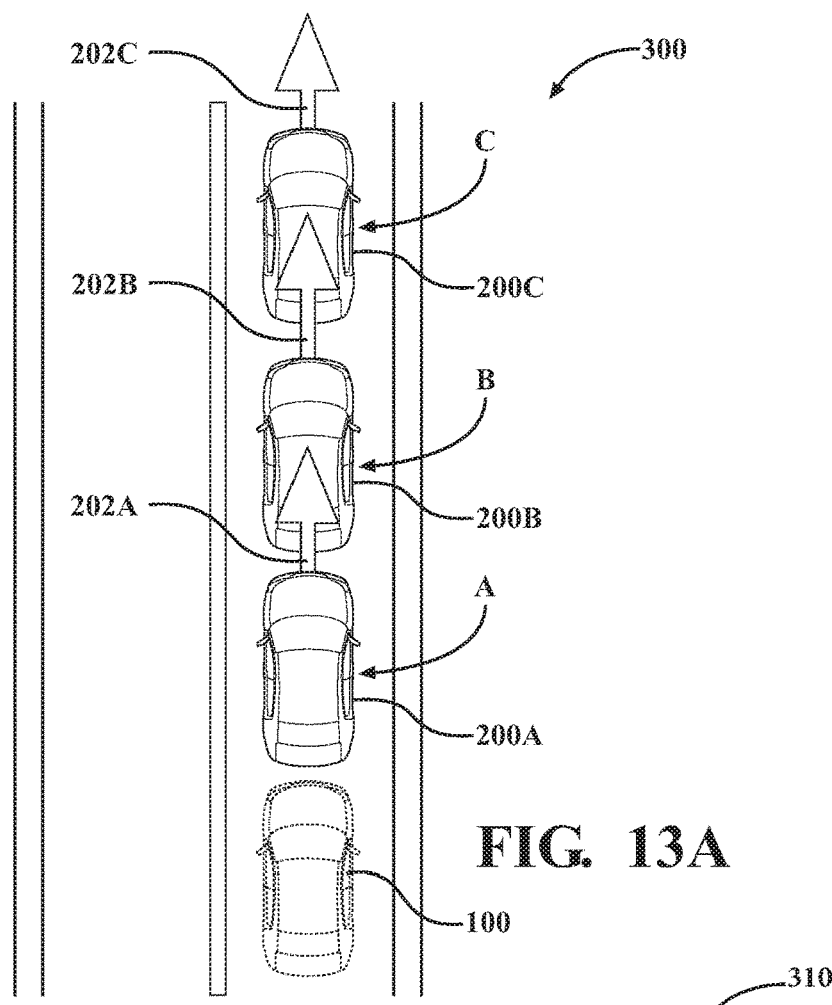
FIGS. 13A-13B illustrate modifications of at least one predicted trajectory, in accordance with the methods of FIG. 12.
Figure 13B:
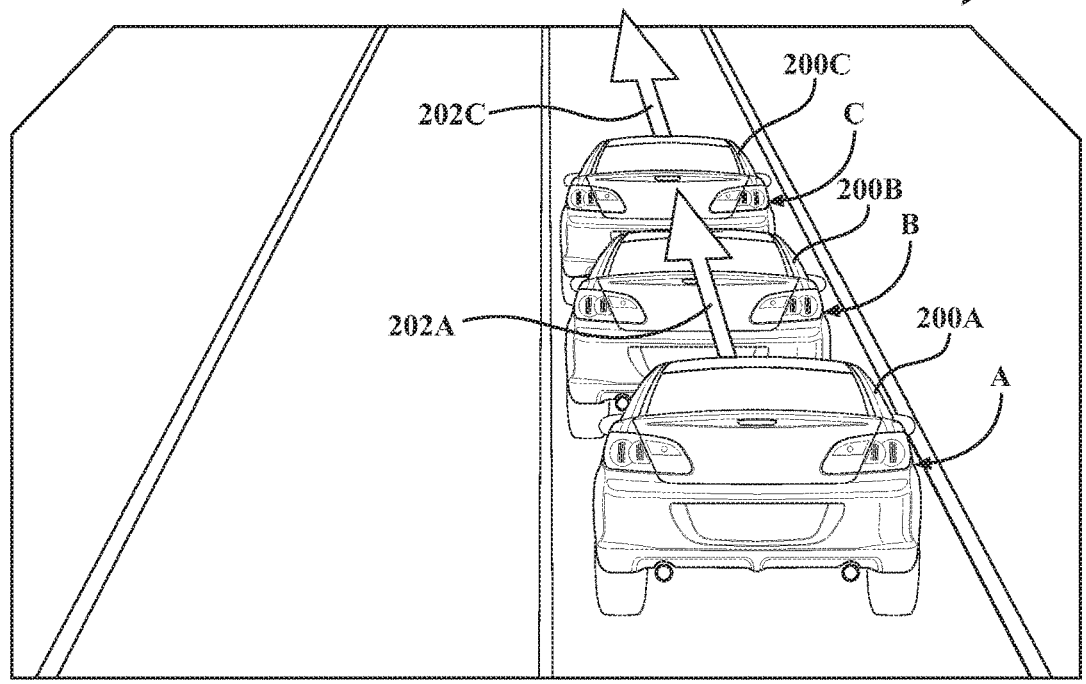

FIGS. 13A-13B illustrate modifications of at least one predicted trajectory in accordance with the methods 342 of FIG. 12, while ignoring the ego-vehicle trajectory for simplicity. FIG. 13A is a top plan view 300 including three road agent vehicles 200A, 200B, 200C in series, each with a respective predicted trajectory 202A, 202B, 202C. Two of the predicted trajectories 202A, 202B overlap with an adjacent road agent vehicle 200B, 200C. FIG. 13B provides a driver's perspective point of view 310 after implementing the method 342 of FIG. 12. For example, since there is no road agent or object in advance of vehicle 200C, the method of FIG. 7 is applied to the road agent predicted trajectory 202C, which is provided in the display. Since there are other vehicles in front of both vehicles 200A and 200B, the method of FIG. 10 is applied to their respective predicted trajectories 202A, 202B. As a result, predicted trajectory 202A overlaps with the vehicle 200B, but the predicted trajectory 202B is hidden due to the overlap with vehicle 200C.

Figure 14:
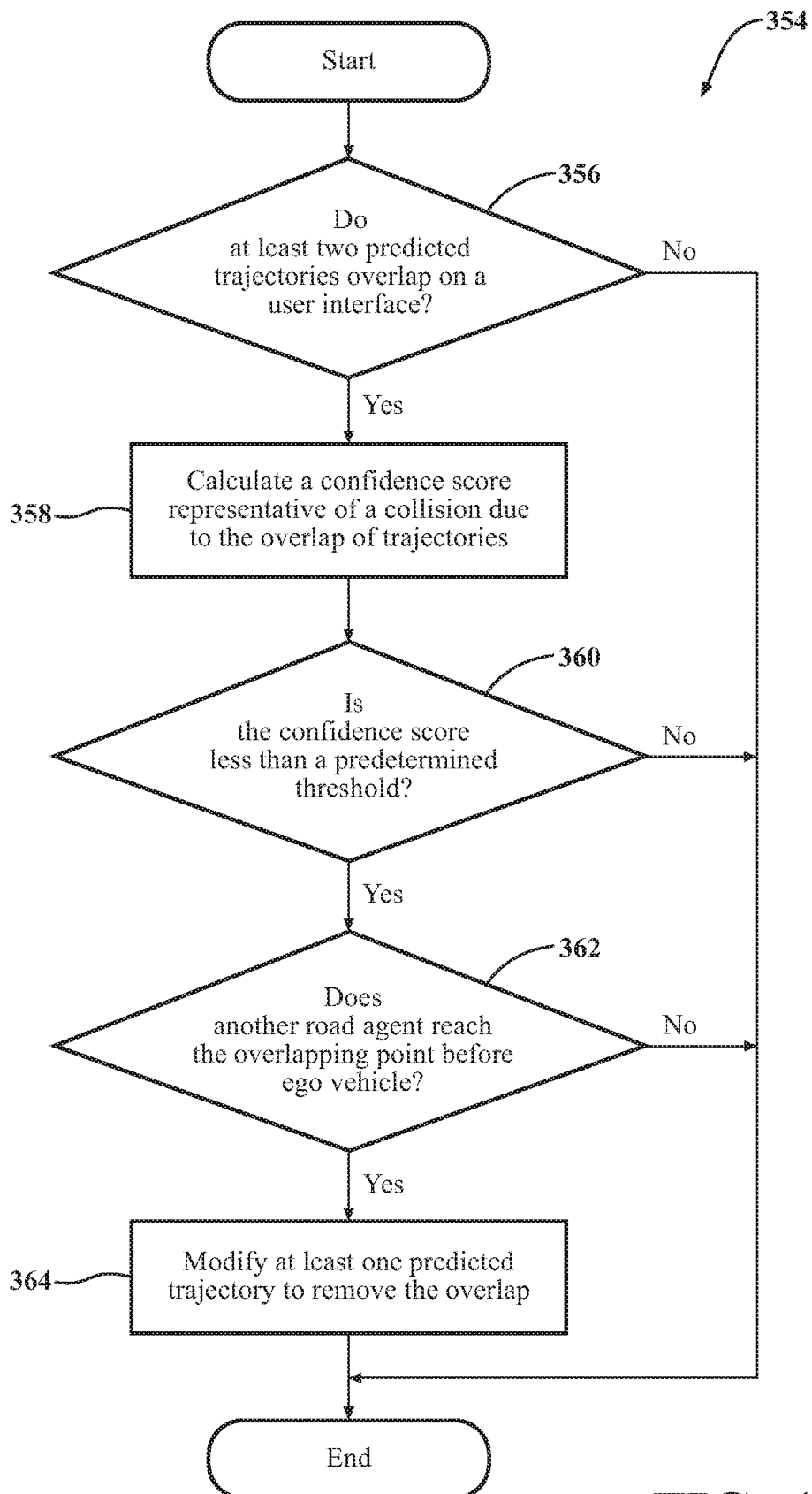
FIG. 14 is a flow chart diagram of a method of modifying at least one predicted trajectory based on an overlap of at least two projected trajectories, with an optional use of confidence scores, in accordance with an illustrative aspect of the present technology.

FIG. 14 is a flow chart diagram of a method 354 of modifying at least one predicted trajectory based on an overlap of at least two projected trajectories in a driver's perspective view, with an optional use of confidence scores, in accordance with an illustrative aspect of the present technology. The method 354 includes generating an ego-vehicle predicted trajectory for an ego-vehicle; and generating at least one road agent predicted trajectory for a road agent that is external to the ego-vehicle. After the predicted trajectories are generated, the method continues by determining that at least two predicted trajectories overlap when displayed on the user interface showing a driver's perspective view, when displayed on the user interface showing a driver's perspective view, as shown by method step 356. In various aspects, the method 356 may proceed directly to step 364, which includes modifying the at least one road agent predicted trajectory to remove the overlap. The method then proceeds with updating a display of the user interface to include any modified road agent predicted trajectory. In optional methods as shown in method step 358, the trajectory-prediction module 170 may include instructions to calculate or otherwise obtain a confidence score that is representative of a likelihood of a collision between road agents due to the presentation of an overlap of road agent predicted trajectories. The methods may also include performing a comparison of the confidence score in order to determine that the confidence score is less than a predetermined threshold, as indicated by method step 360. Once it is determined that the risk of a collision is less than a predetermined threshold, the method optionally continues in step 362 by determining whether another road agent will reach the overlapping point of the predicted trajectories before the ego-vehicle will reach that intersection. If yes, the method includes modifying at least one predicted trajectory in order to remove the overlap, as shown by method step 364. In various aspects, the modification may include a shortening of a length of the predicted trajectory, providing a separation distance between at least two of the predicted trajectories, and modifying a predicted trajectory using a technique such as hiding, diluting, blending, or similarly modifying at least a portion of the predicted trajectory (and/or adjacent road agent or object).

Figure 15:
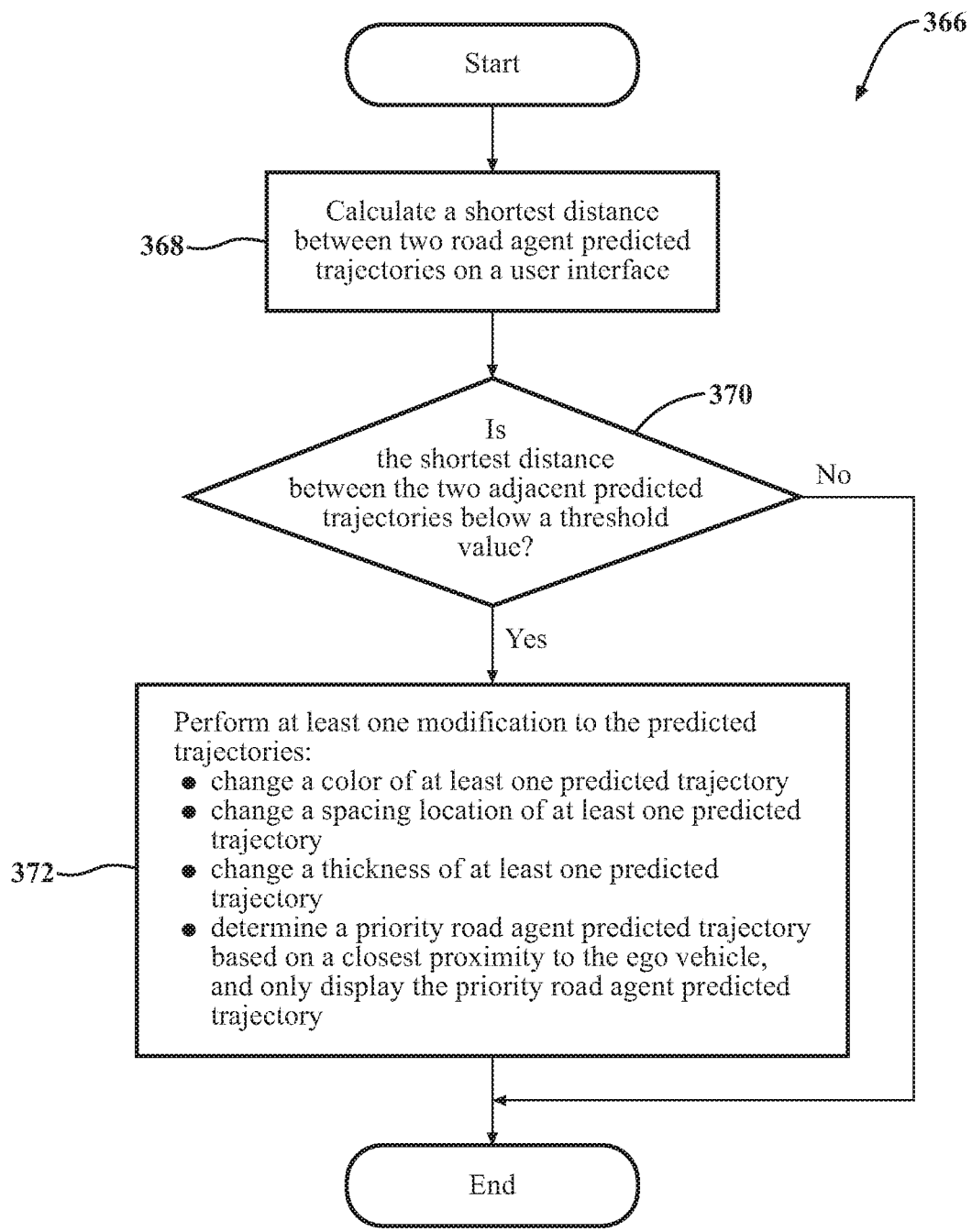
FIG. 15 is a flow chart diagram of a method of modifying at least one predicted trajectory based on a shorted distance between two adjacent predicted trajectories, in accordance with an illustrative aspect of the present technology.

FIG. 15 is a flow chart diagram of a method 366 of modifying at least one predicted trajectory based on the calculation of a shorted distance between two adjacent predicted trajectories being below a threshold value, in accordance with an illustrative aspect of the present technology. For example, the trajectory-prediction module 170 may include an instruction to generate an ego-vehicle predicted trajectory for an ego-vehicle, and to generate at least one road agent predicted trajectory for a road agent that is external to the ego-vehicle. As shown in method steps 368 and 370, the instructions may include a step to determine that a distance between two adjacent predicted trajectories is below a predetermined threshold value when displayed on the user interface showing a driver's perspective view. Thereafter, the instructions may include a step to perform at least one modification selected from the group consisting of: (1) change a color of at least one of the road agent predicted trajectories; (2) change a spacing location of at least one of the road agent predicted trajectories; (3) change a thickness of at least one of the road agent predicted trajectories; and (4) determine a priority road agent predicted trajectory based on a closest proximity to the ego-vehicle, and only display the priority road agent predicted trajectory. A control module 176 may also provide instructions that, when executed by the one or more processors 110, cause the one or more processors 110, or a user interface system 182, to update the user interface to include any modified road agent predicted trajectory.

Figure 16A:
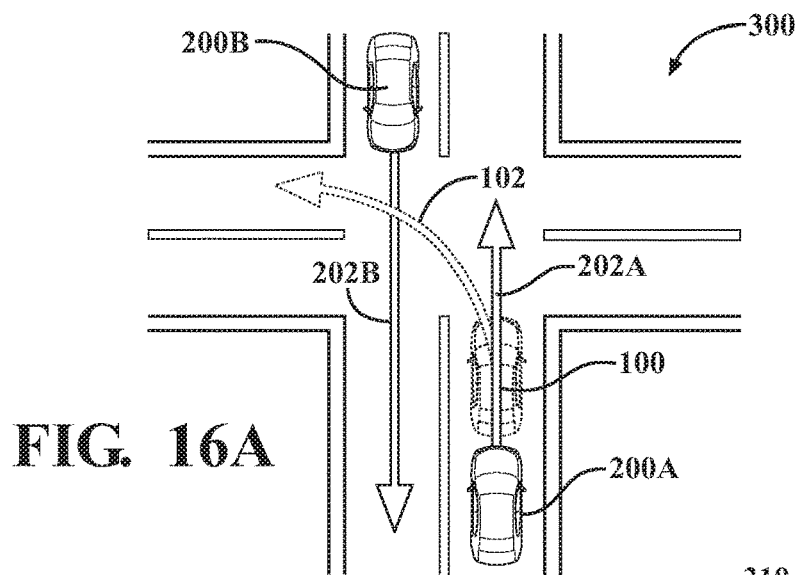
FIGS. 16A-16C illustrate modifications of at least one predicted trajectory, in accordance with the methods of FIG. 14.
Figure 16B:
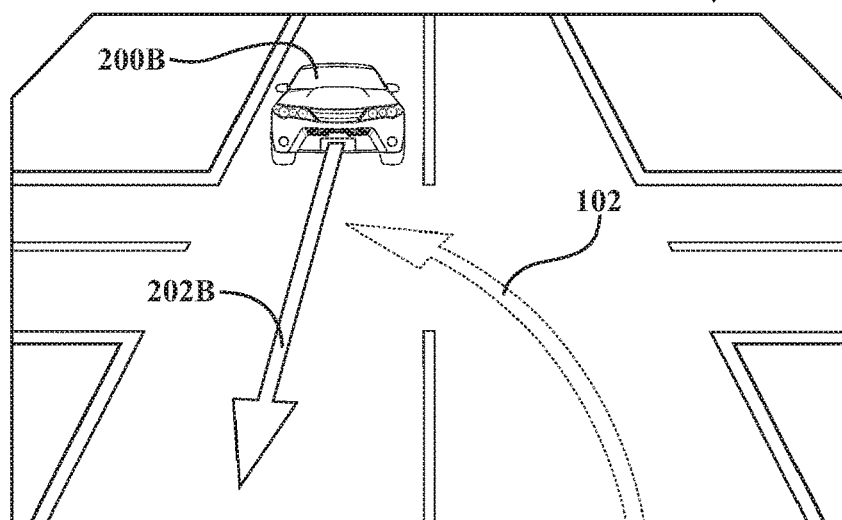
Figure 16C:
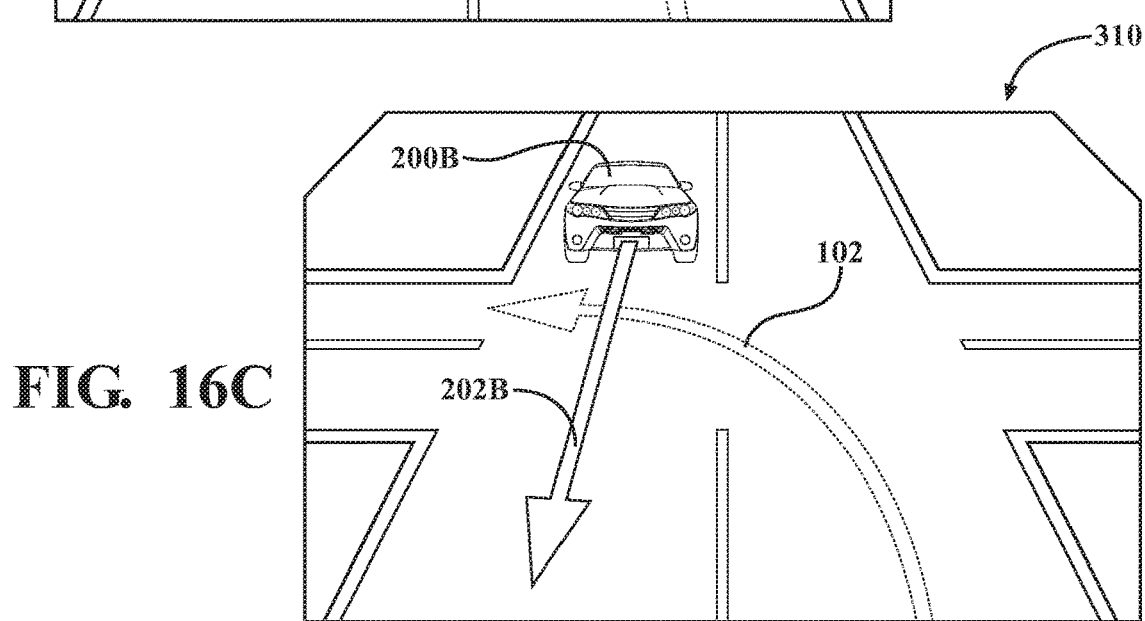

FIGS. 16A-16C illustrate modifications of at least one road agent and ego-vehicle predicted trajectory, in accordance with the methods 366 of FIG. 14. FIG. 16A illustrates a top plan view 300 of an ego-vehicle 100 with its predicted trajectory 102, as well as two road agent vehicles 200A, 200B and their respective predicted trajectories 202A, 202B. As shown, the ego-vehicle predicted trajectory 102 overlaps the road agent predicted trajectory 202B, and the other road agent predicted trajectory 202A overlaps with the ego-vehicle 100. FIG. 16B provides a driver's perspective point of view 310 that completely hides (removes) the road agent vehicle 200A and its predicted trajectory 202A, and shortens a length of the ego-vehicle predicted trajectory 102 to remove the overlap of predicted trajectories 102, 202B. FIG. 16C provides a driver's perspective point of view 310 that completely hides (removes) the road agent vehicle 200A and its predicted trajectory 202A, and blends a color of the ego-vehicle predicted trajectory 102 to minimize the presence of the overlap of predicted trajectories 102, 202B.

Figure 17:
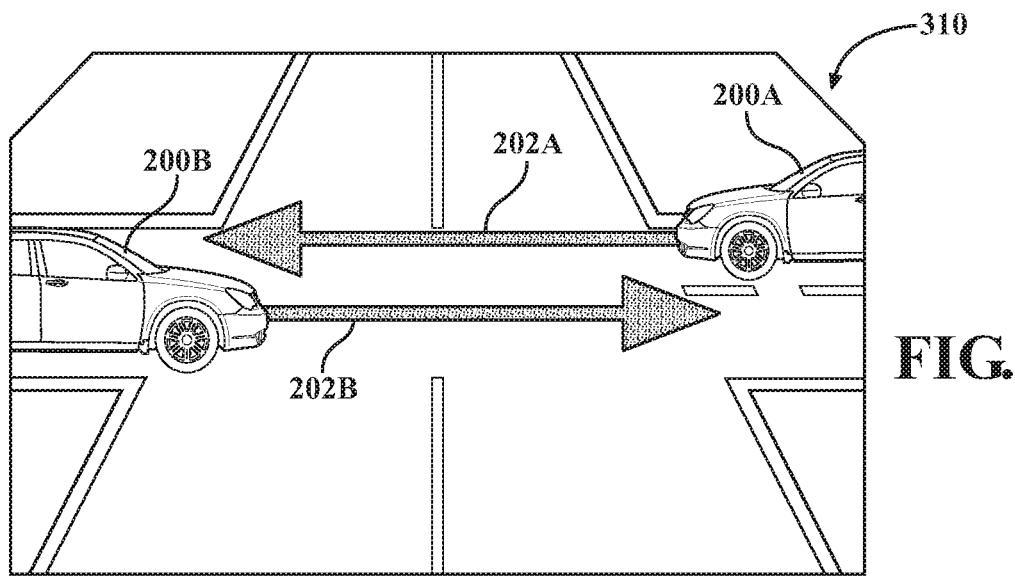
FIG. 17 illustrates a user interface display from a driver's perspective view with an overlap in road agents and predicted trajectories.
Figure 18A:
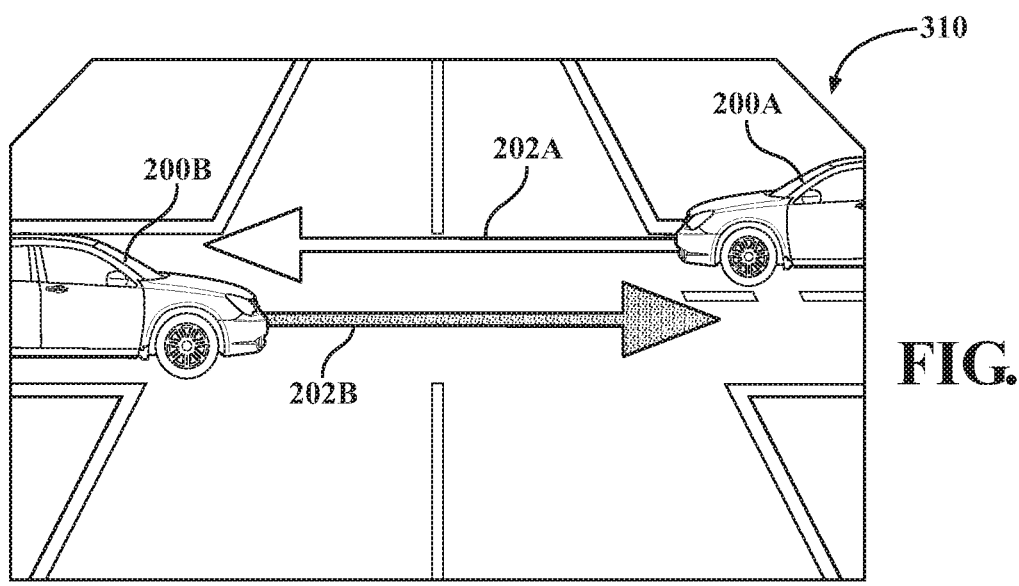
FIGS. 18A-18E illustrate modifications of at least one predicted trajectory of FIG. 17, in accordance with the methods of FIGS. 14-15.
Figure 18B:
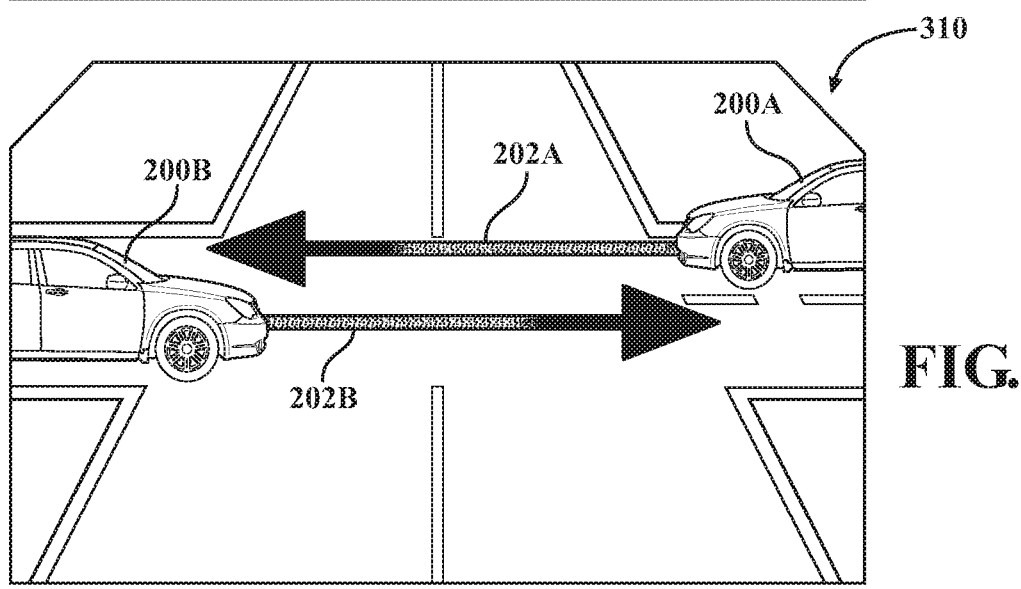
Figure 18C:
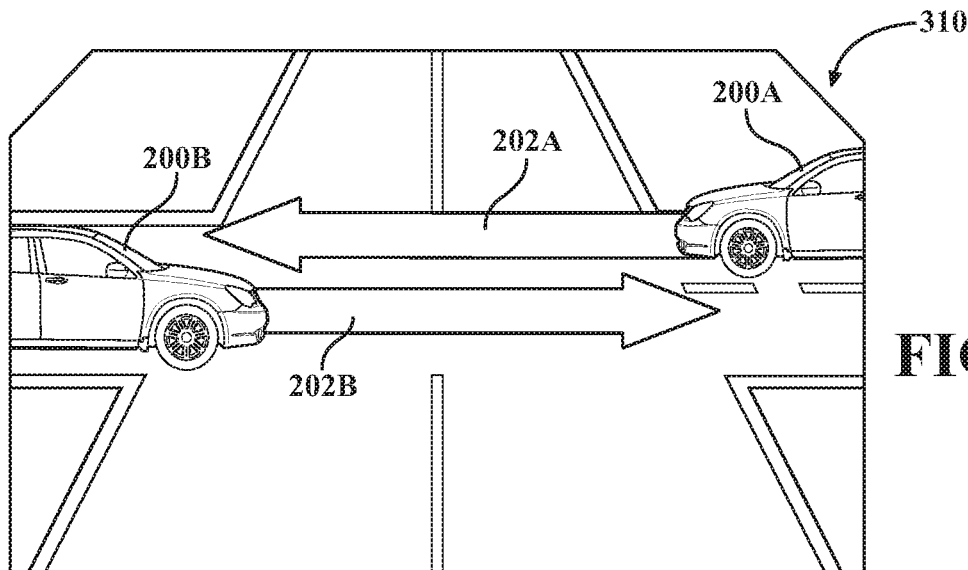
Figure 18D:
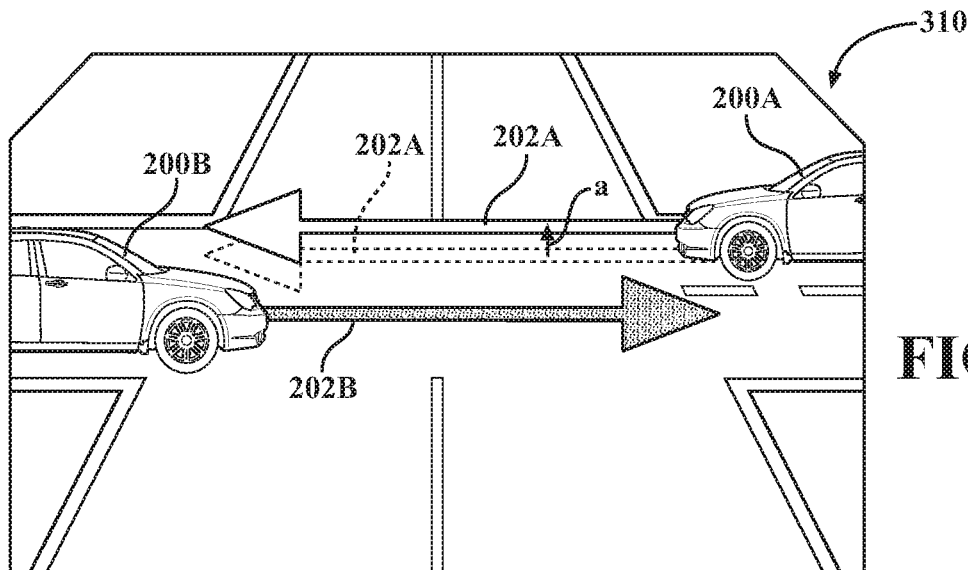
Figure 18E:
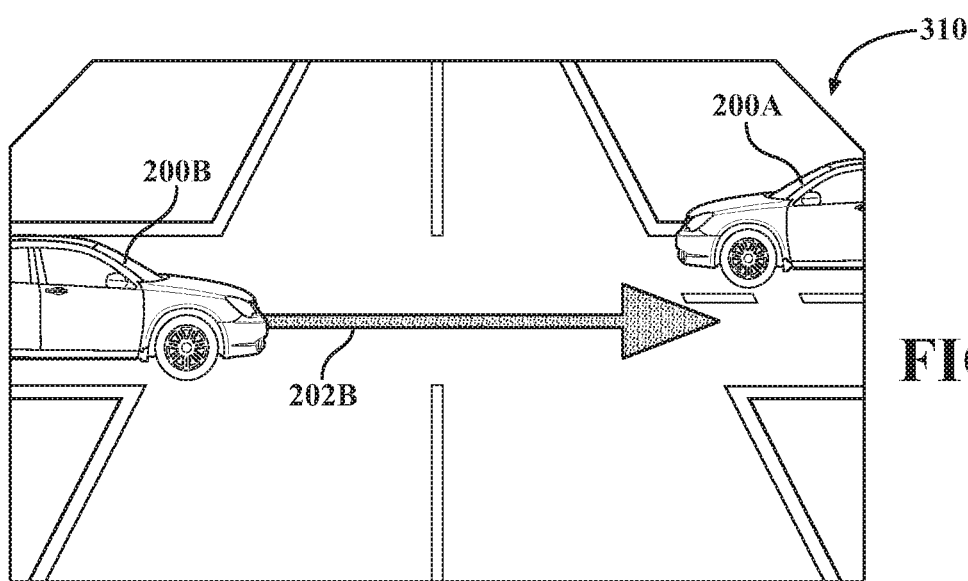

FIG. 17 illustrates a user interface display from a driver's perspective view 310 with an overlap in road agents 200A, 200B with predicted trajectories 202A, 202B. FIGS. 18A-18E illustrate modifications of at least one predicted trajectory of FIG. 17, in accordance with the methods of FIGS. 14-15. For example, in FIGS. 18A-18B, a color, gradient, or pattern of one road agent predicted trajectory 202A can be changed to make it appear distinct from another road agent predicted trajectory 202B. In FIG. 18C, the road agent predicted trajectories 202A, 202B can be provided with different thicknesses. In FIG. 18D, one of the predicted trajectories 202A can be shifted or separated by a distance "a" in order to provide more spacing between the adjacent predicted trajectories 202A, 202B. In FIG. 18E, one of the predicted trajectories 202A can be removed (hidden) from view altogether.

Figure 19:
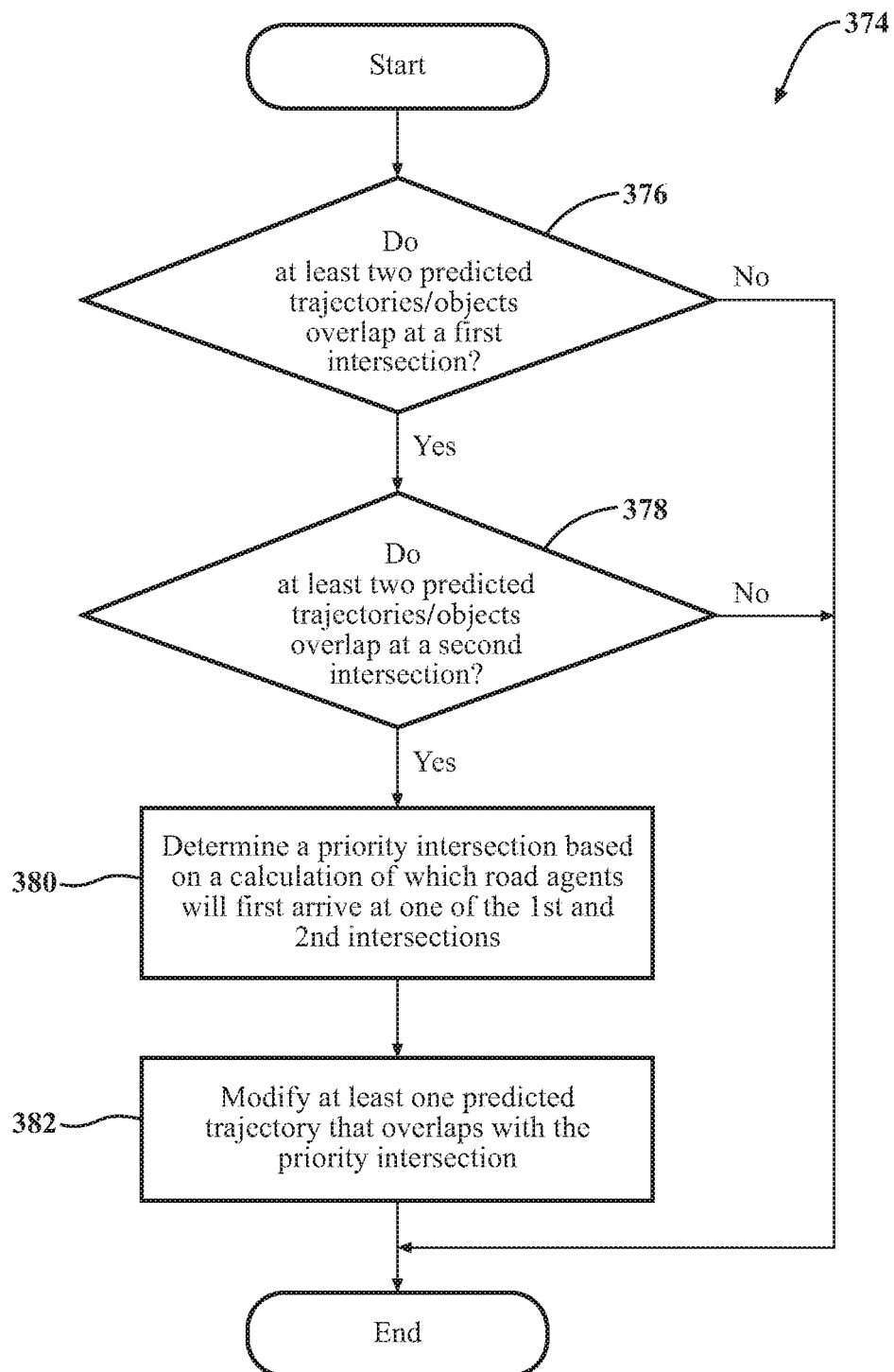
FIG. 19 is a flow chart diagram of a method of modifying at least one predicted trajectory based on an overlap of at least two projected trajectories, with a determination of a priority intersection, in accordance with an illustrative aspect of the present technology.

FIG. 19 is a flow chart diagram of a method 374 of modifying at least one predicted trajectory based on an overlap of either at least two projected trajectories, or one or more projected trajectory and one or more object, with a determination of a priority intersection, in accordance with an illustrative aspect of the present technology. After generating the required predicted trajectories, the method includes determining whether at least two of the predicted trajectories (or trajectory and object) overlap at a first intersection, as shown by method step 376, and determining whether at least two of the predicted trajectories (or trajectory and object) overlap at a second intersection, as shown by method step 378. When at least two overlaps are located, method step 380 provides for the determination of a priority intersection. This determination is based on a calculation of which road agents will first arrive at one of the first and second intersections. Once the priority intersection is located, the method includes modifying at least one predicted trajectory that overlaps with the priority intersection, as shown by method step 382.

Figure 20:
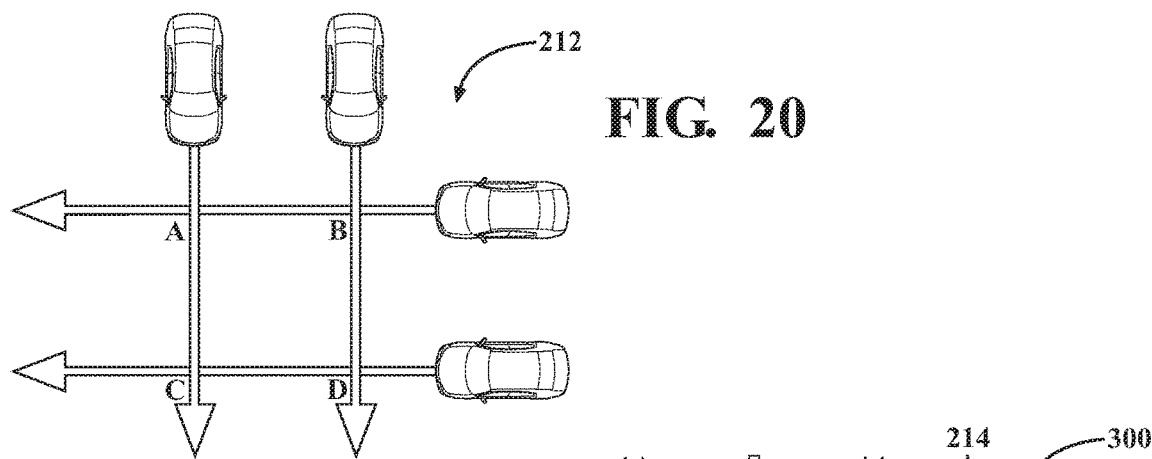
FIG. 20 illustrates a set of four vehicles having predicted trajectories with four intersections having various priorities.

To further explain the method 374 of FIG. 19, FIG. 20 is provided as illustrating a set of four vehicles having predicted trajectories overlapping at four intersections having various intersection times. FIG. 20 includes four intersections labeled as A, B, C, and D. The priority intersection here is at intersection B, which will occur first in time, assuming the vehicles are travelling at the same velocity. Intersection C should occur last in time, with intersections A and D occurring at some time between between B and C.

Figure 21A:
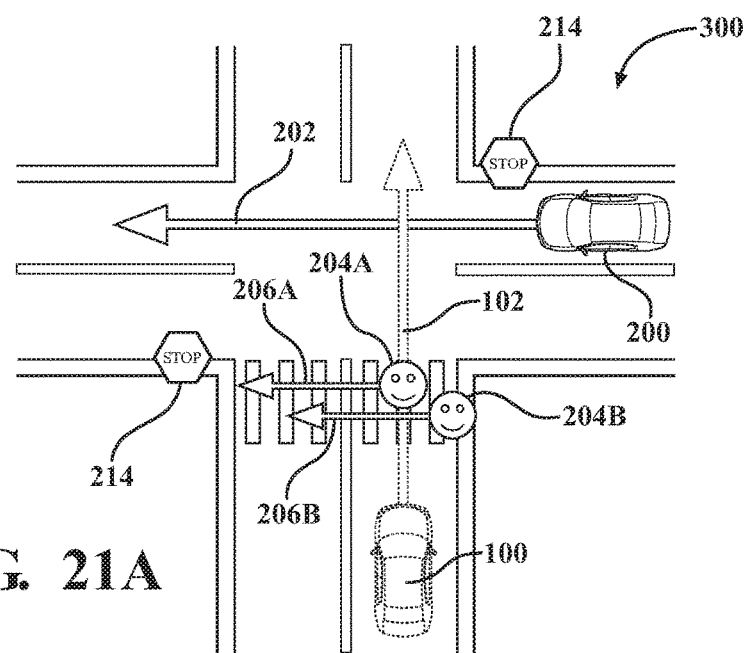
FIGS. 21A-21B illustrate modifications of at least one predicted trajectory, in accordance with the methods of FIG. 19.
Figure 21B:
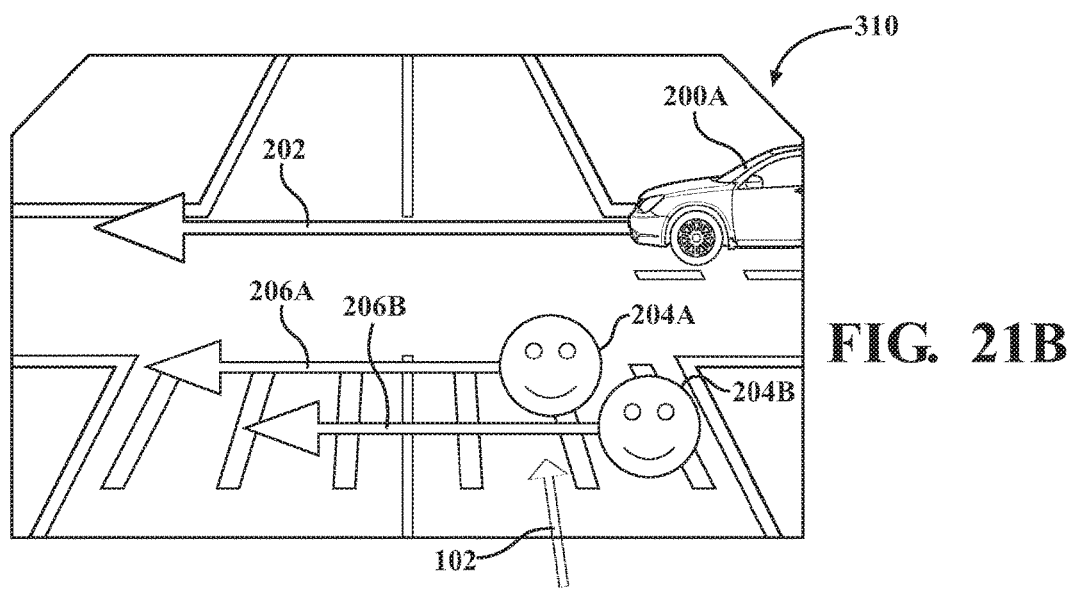

FIGS. 21A-21B further illustrate the modifications of at least one predicted trajectory, in accordance with the methods of FIG. 19. FIG. 21B is a top plan view 300 of an ego vehicle 100, a road agent vehicle 200, and two pedestrians 204, each with a respective predicted trajectory 102, 202, 206A, 206B. There are two stop signs 214 provided at the roadway intersection. Since the road agent vehicle 200 is at a stop sign, the priority intersection is between the ego-vehicle 100 and one of the pedestrians 204A, 204B, depending on speed of the pedestrians. The last intersection in time will be between the ego-vehicle 100 and the road agent vehicle 200. FIG. 21A provides a driver's perspective view 310 of the situation presented in FIG. 21A, and has modified the ego-vehicle predicted trajectory 102 by shortening a length thereof because it is involved with the priority intersection.

Figure 22:
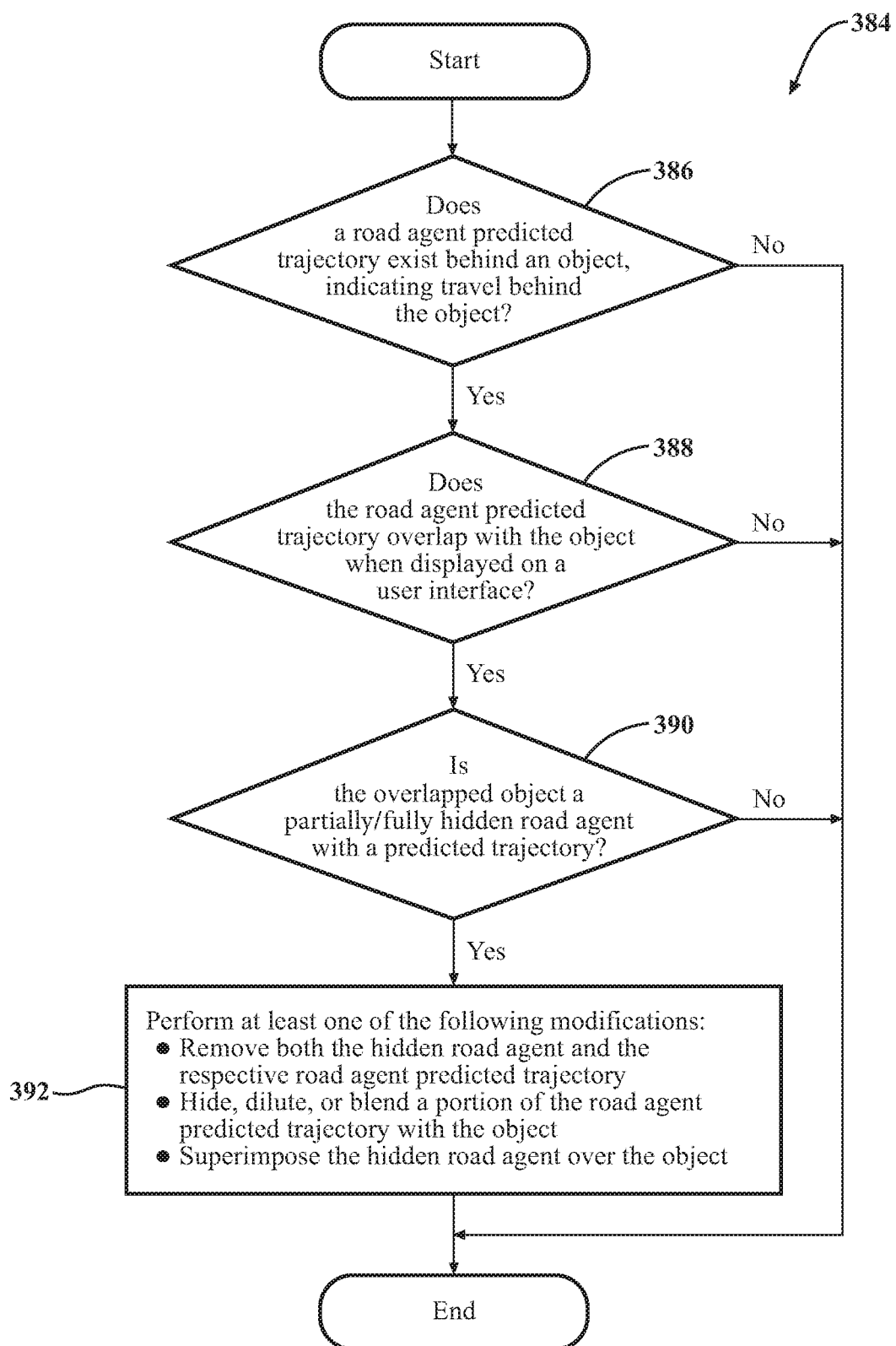
FIG. 22 is a flow chart diagram of a method of modifying at least one predicted trajectory based on an overlap of a projected trajectory and an object, with a determination that the object is a partially or fully hidden road agent, in accordance with an illustrative aspect of the present technology.

FIG. 22 is a flow chart diagram of a method 384 of modifying at least one predicted trajectory based on an overlap of a projected trajectory and an object, with a determination that the object is a partially or fully hidden road agent, in accordance with an illustrative aspect of the present technology. After generating the required predicted trajectories, the method includes a step 386 of determining that a road agent predicted trajectory exists behind an object, indicating travel behind the object when considering a driver's perspective point of view. As shown by method step 388, the method determines that the road agent predicted trajectory overlaps with the objected, when displayed on a user interface. If it is determined in method step 390 that at least one hidden road agent is behind the object when displayed on the user interface showing a driver's perspective view, step 392 provides performing at least one modification selected from the group consisting of: removing both the hidden road agent and the respective road agent predicted trajectory; hiding, diluting, or blending a portion of the road agent predicted trajectory with the object; and superimposing the hidden road agent over the object.

Figure 23A:
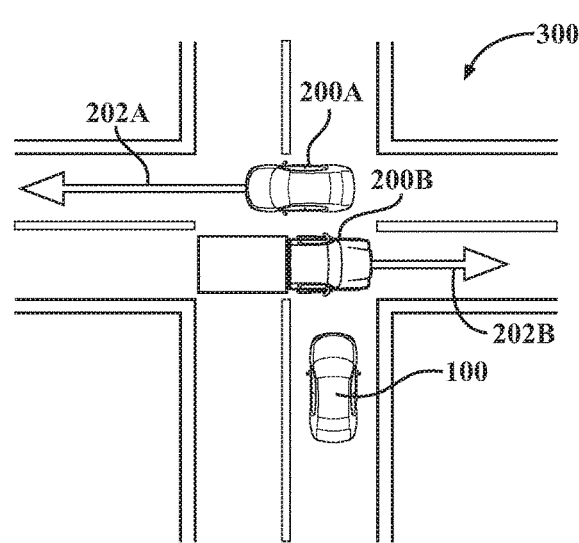
FIGS. 23A-23D illustrate a modification of at least one predicted trajectory, in accordance with the methods of FIG. 22.
Figure 23B:
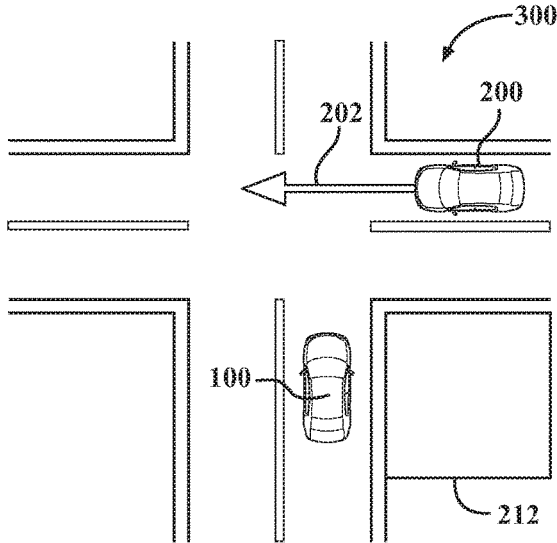
Figure 23C:
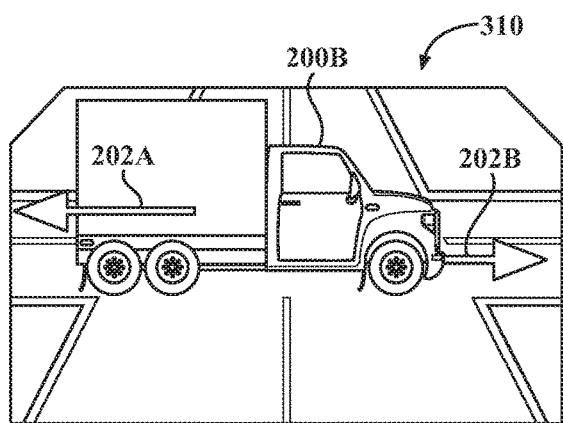
Figure 23D:
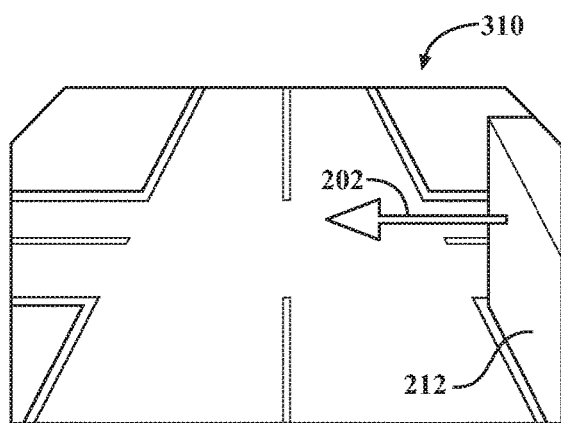

FIGS. 23A-23D illustrate example situations with a requirement for a modification of at least one predicted trajectory, in accordance with the methods of FIG. 22. For example, FIG. 23A provides a top plan view 300 including a smaller vehicle 200A located adjacent a larger vehicle 200B, such as a truck. FIG. 23B illustrates a top plan view 300 including a vehicle 200 adjacent an object, such as a building 212. FIGS. 23C and 23D provide driver's perspective views 310 of the situations presented in FIGS. 23A and 23B, respectively, in which the road agent vehicle is not in view. FIGS. 24A-24D illustrate additional modifications of at least one predicted trajectory, in accordance with the methods of FIG. 22 when presented with the situations of FIGS. 23C and 23D. FIG. 24A completely removes both the hidden road agent vehicle and the respective road agent predicted trajectory for both situations. FIG. 24B removes the hidden road agent but still presents the predicted trajectories. FIG. 24C blends the predicted trajectories with the road agent vehicle 200B and the building 212. FIG. 24D superimposes the hidden road agents 200, 200A with the building 212 and road agent vehicle 200B, respectively.

Figure 25:
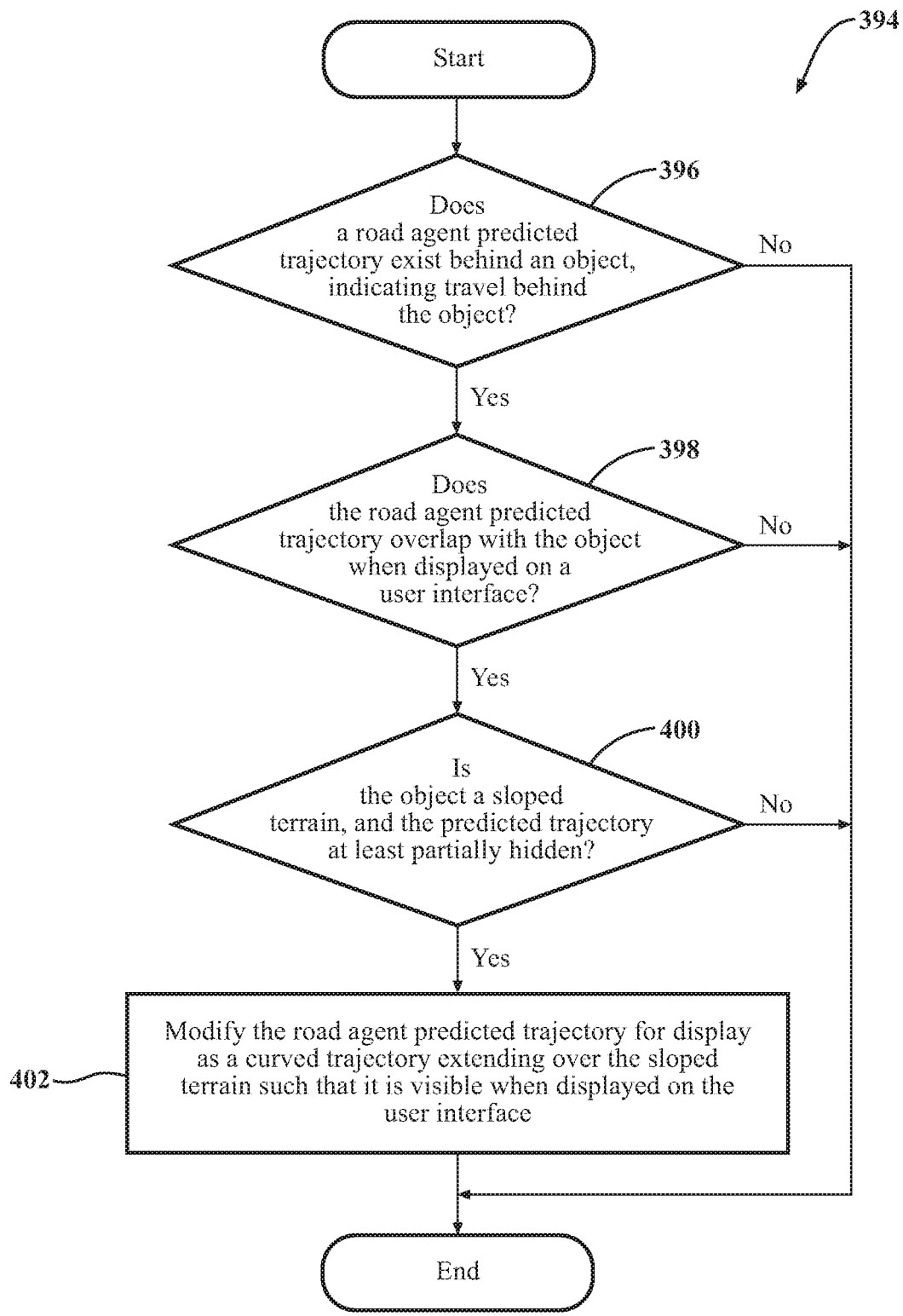
FIG. 25 is a flow chart diagram of a method of modifying at least one predicted trajectory based on the presence of a sloped terrain, in accordance with an illustrative aspect of the present technology.

FIG. 25 is a flow chart diagram of a method 394 of modifying at least one predicted trajectory based on the presence of a sloped terrain in a roadway, in accordance with an illustrative aspect of the present technology. The method 394 is for generating trajectories for a vehicle user interface showing a driver's perspective view, and includes generating an ego-vehicle predicted trajectory for an ego-vehicle, and generating at least one road agent predicted trajectory for a road agent that is external to the ego-vehicle. As indicated by method step 396, after the respective predicted trajectories are generated, the method 394 continues by determining that at least one road agent predicted trajectory exists behind an object when viewed in the driver's perspective, indicating travel behind the object. The method further determines that the road agent predicted trajectory overlaps with the object when displayed in the driver's perspective point of view. Specifically in this method aspect, there is a determination that the object is a sloped terrain, and the predicted trajectory is at least partially hidden, as indicated by method step 400. As shown in FIG. 26A, the sloped terrain 214 can be uphill or downhill. As indicated by method step 402, the method continues to modifying at least one road agent predicted trajectory for display as a curved trajectory, extending over the sloped terrain such that it is visible when displayed on the user interface showing the driver's perspective point of. The method then proceeds with updating a display of the user interface to include any modified road agent predicted trajectory(s).

Figure 27A:
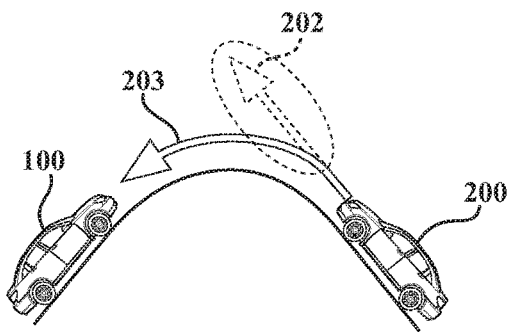
Figure 27B:
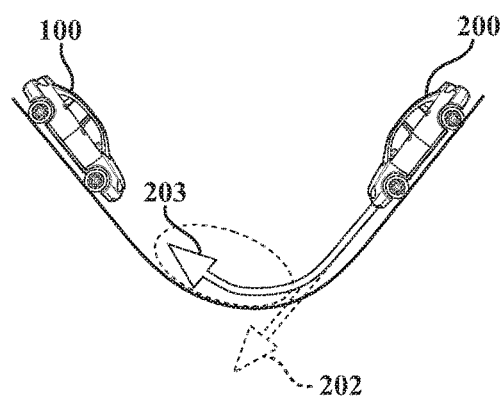
Figure 27C:
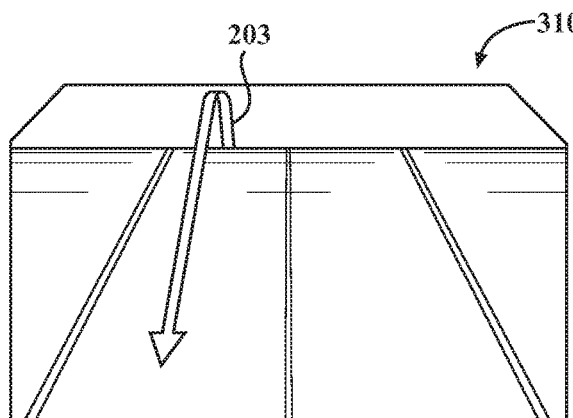
Figure 27D:
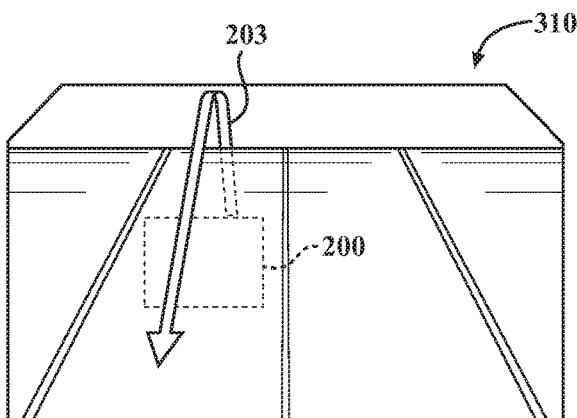

FIGS. 26A-26D and 27A-27D illustrate modifications of at least one predicted trajectory where a sloped terrain interferes with the view, in accordance with the methods of FIG. 25. FIG. 26A is a partial perspective view of an example scenario with an ego-vehicle 100 and a road agent vehicle 200 with its predicted trajectory 202. FIG. 26B provides a side plan view of the differences in elevation, specifically showing the sloped terrain 214 and with the road agent predicted trajectory 202 pointing in an upward direction due to the slope, which is not desirable. FIG. 26C provides a top plan view 300, while FIG. 26D provides the driver's perspective point of view 310 that has a hidden road agent vehicle 200 and only a portion of the predicted trajectory 202 showing, likely causing confusion for the user as to both the location of the road agent as well as its direction of travel. FIGS. 27A and 27B illustrate how the predicted trajectory of the road agent vehicle 200 is transformed from a straight line 202 to a curved, or at least partially curved, trajectory 203 that can extend a substantially fixed distance away from (over) the sloped terrain such that it does not indicate a direction that appears to be leading up into the sky or down into the roadway. For example, if the distance between a trajectory 202 and the road/terrain is increasingly larger than a predetermined threshold, indicating upward travel, at least a portion of the predicted trajectory can be curved 203 in a downward direction, as shown in FIG. 27A. In another example, if the distance between a trajectory 202 and the road/terrain is decreasingly smaller than another predetermined threshold, at least a portion of the predicted trajectory can be curved 203 in an upward direction, as shown in FIG. 27B. FIG. 27C illustrates a driver's perspective point of view 310 of the scenario of FIG. 27A, with the curved predicted trajectory 203. FIG. 27D further provides a superimposed representation of the road agent vehicle 200, which may be provided with a color and/or shape to indicate that is hidden, located at the other side of a hill, or the like.

Figure 28:
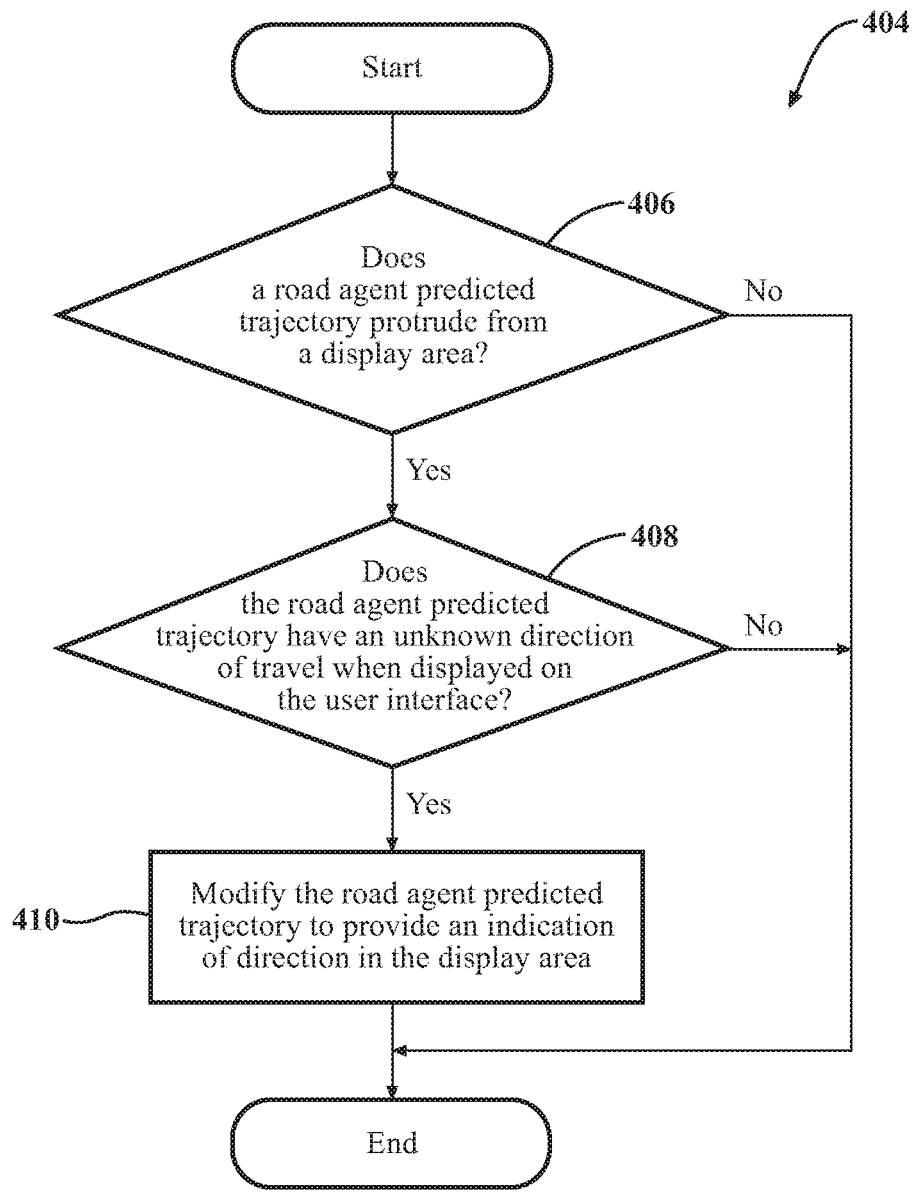
FIG. 28 is a flow chart diagram of a method of modifying at least one predicted trajectory based on at least one trajectory protruding from a display area, with an unknown direction of travel, in accordance with an illustrative aspect of the present technology.

FIG. 28 is a flow chart diagram of a method 404 of modifying at least one predicted trajectory based on at least one road agent predicted trajectory protruding from a display area, which would otherwise provide a user with an unknown direction of travel of the road agent, in accordance with an illustrative aspect of the present technology. The method 404 is for generating trajectories for a vehicle user interface showing a driver's perspective view, and includes generating an ego-vehicle predicted trajectory for an ego-vehicle, and generating at least one road agent predicted trajectory for a road agent that is external to the ego-vehicle. As indicated by method step 406, after the respective predicted trajectories are generated, the method 404 may use the trajectory-prediction module having an instruction to determine that at least one road agent predicted trajectory protrudes from a display area, and further has an unknown direction of travel when displayed on the user interface showing a driver's perspective view, as shown by method step 408. The methods may include a step 410 to modify the at least one road agent predicted trajectory to provide an indication of direction in the display area.

Figure 29A:
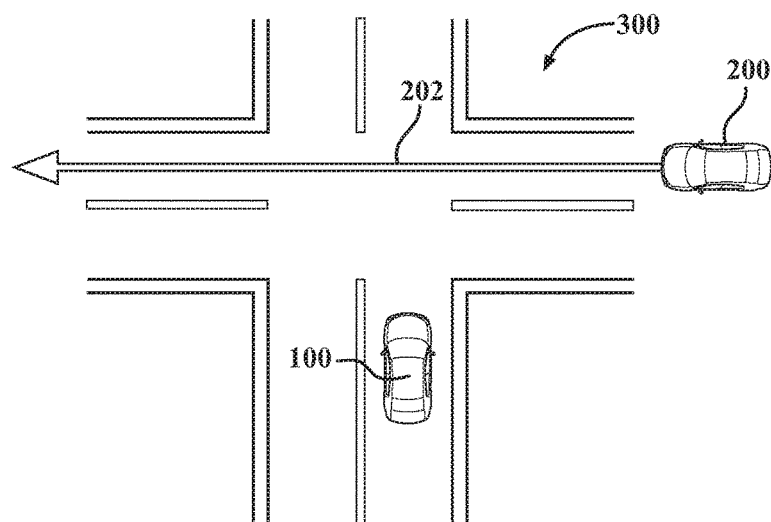
FIGS. 29A-29E illustrate a modification of at least one predicted trajectory, in accordance with the methods of FIG. 28.
Figure 29B:
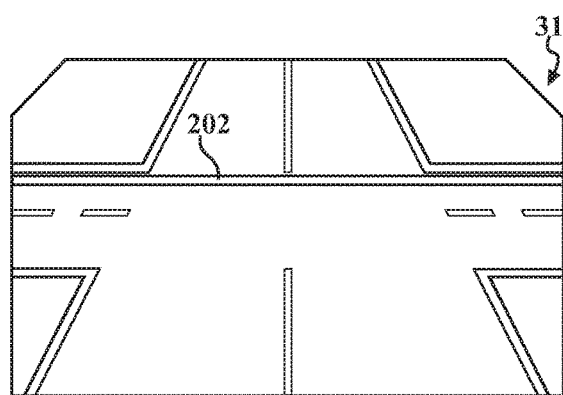
Figure 29C:
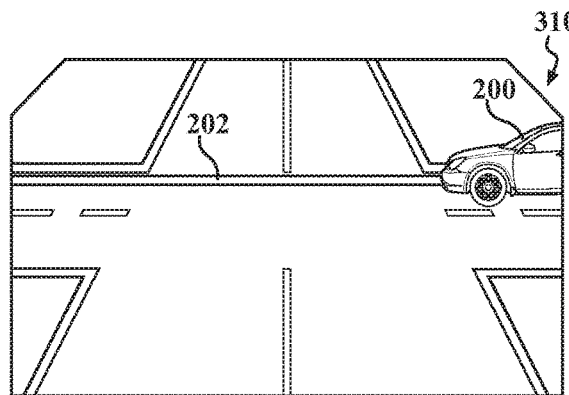
Figure 29D:
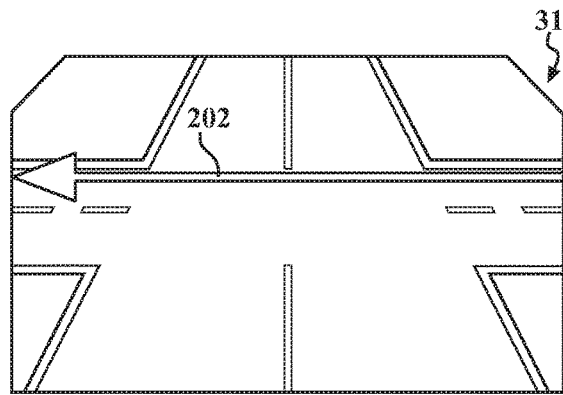
Figure 29E:
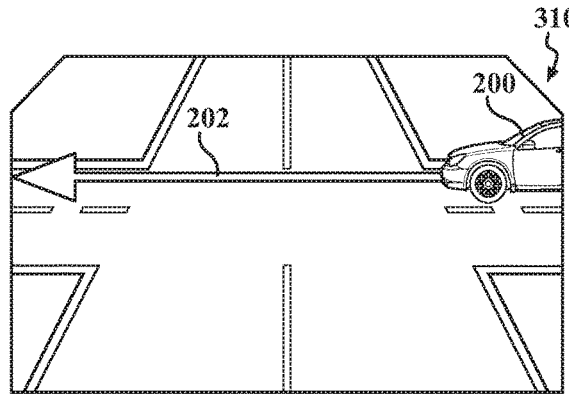

FIGS. 29A-29E illustrate a modification of at least one predicted trajectory, in accordance with the methods of FIG. 28. FIG. 29A illustrates a top plan view 300 with an ego-vehicle 100 and a road agent vehicle 200. Both the road agent vehicle 200 and the arrow of direction extend a distance off from the display. FIG. 29B illustrates this scenario from a driver's perspective point of view 310. As shown, only a portion of the road agent predicted trajectory 202 is present, which leaves confusion for the user with respect to the direction of travel. FIG. 29C adds an icon representative of at least a partial view of the road agent vehicle 200, however this may still be confusing to a user due to the lack of a directional arrow. FIGS. 29D and 29E modify a length of the road agent predicted trajectory 202, and add a directional arrow to the appropriate end of the predicted trajectory in order to provide the additional information to a user when viewed from a driver's perspective point of view.

Figure 30:
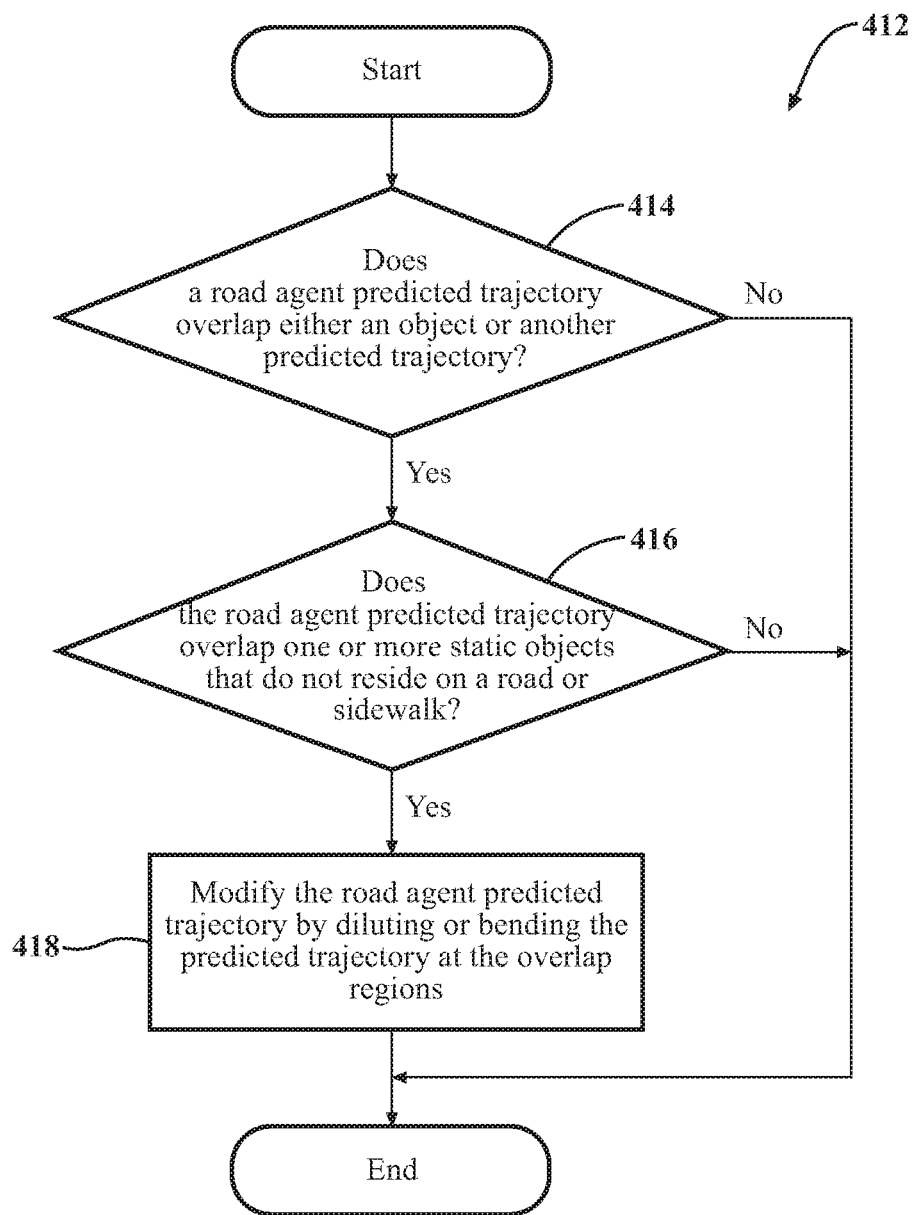
FIG. 30 is a flow chart diagram of a method of modifying at least one predicted trajectory based on an overlap of a projected trajectory and either an object or another predicted trajectory, with a determination that the predicted trajectory overlaps a plurality of static objects, in accordance with an illustrative aspect of the present technology.

FIG. 30 is a flow chart diagram of a method 412 of modifying at least one predicted trajectory based on an overlap of a projected trajectory and either an object or another predicted trajectory, with a determination that the predicted trajectory overlaps one or more static objects, in accordance with an illustrative aspect of the present technology. The method 412 is for generating trajectories for a vehicle user interface showing a driver's perspective view, and includes generating an ego-vehicle predicted trajectory for an ego-vehicle, and generating at least one road agent predicted trajectory for a road agent that is external to the ego-vehicle. As indicated by method step 414, after the respective predicted trajectories are generated, the method 412 continues by determining that at least one road agent predicted trajectory overlaps either an object or another road agent predicted trajectory. The method continues with step 416 to determine whether the road agent predicted trajectory overlaps one or more static objects, in particular, static objects that do not reside on a roadway or on a sidewalk. Non-limiting examples of such static objects may include a row of trees, a series of buildings or structures, etc. A plurality of static objects may be considered as a group or individually, depending on their size and location. As shown in method step 418, the method includes modifying the road agent predicted trajectory by hiding, diluting, or blending the road agent predicted trajectory at one or more of the locations where the predicted trajectory overlaps one or more of the static objects.

Figure 31A:
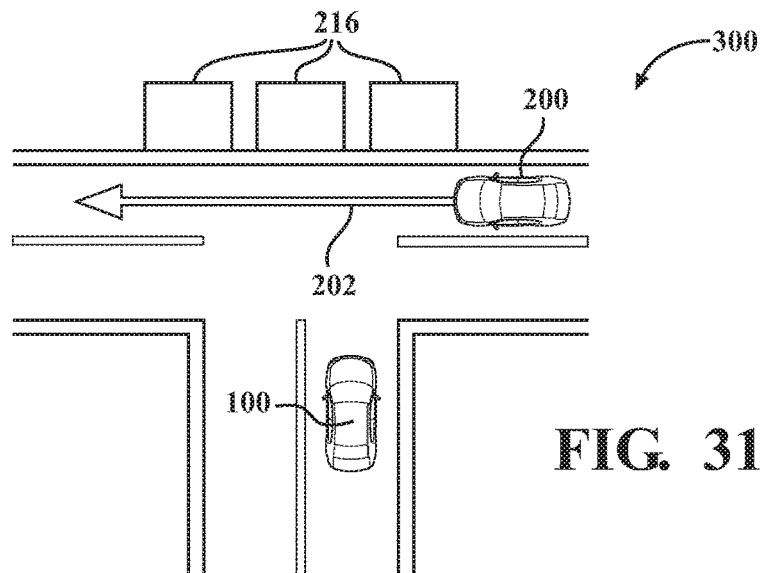
FIGS. 31A-31C illustrate a modification of at least one predicted trajectory, in accordance with the methods of FIG. 30.
Figure 31B:
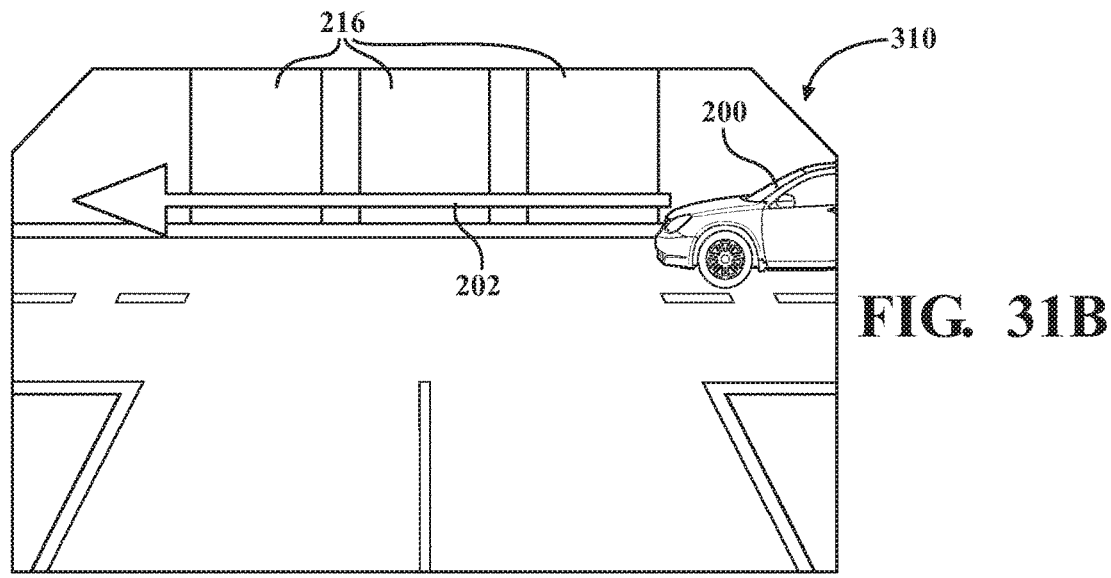
Figure 31C:
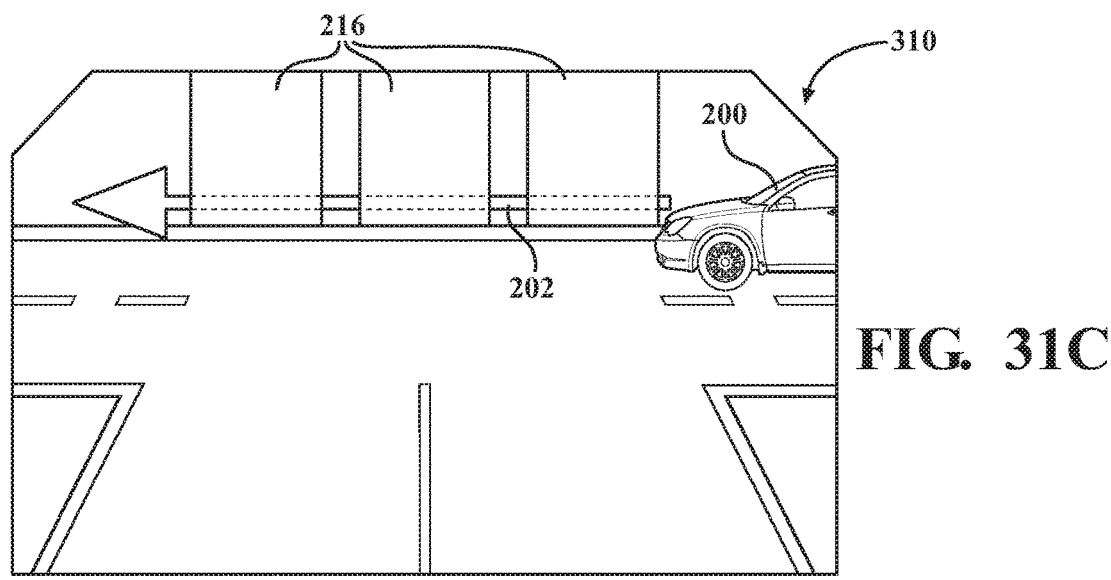

FIGS. 31A-31C illustrate a modification of at least one predicted trajectory that is adjacent a plurality of static objects, in accordance with the methods of FIG. 30. FIG. 31A provides a top plan view 300 of an ego-vehicle 100 and a road agent vehicle 200. The predicted trajectory 202 is in front of a plurality of static objects 216. When presented in the driver's perspective point of view 310 as shown in FIG. 31B, the relationship between the road agent predicted trajectory 202 and the static objects 216 may appear confusing. Accordingly, as shown in FIG. 31C, the road agent predicted trajectory 202 is modified such at areas/locations of the predicted trajectory 202 that overlap with the objects 216 are provided as blended with the objects 216. In other aspects, those portions may be diluted and/or hidden, depending on the type of static object and optionally other factors.

Figure 32:
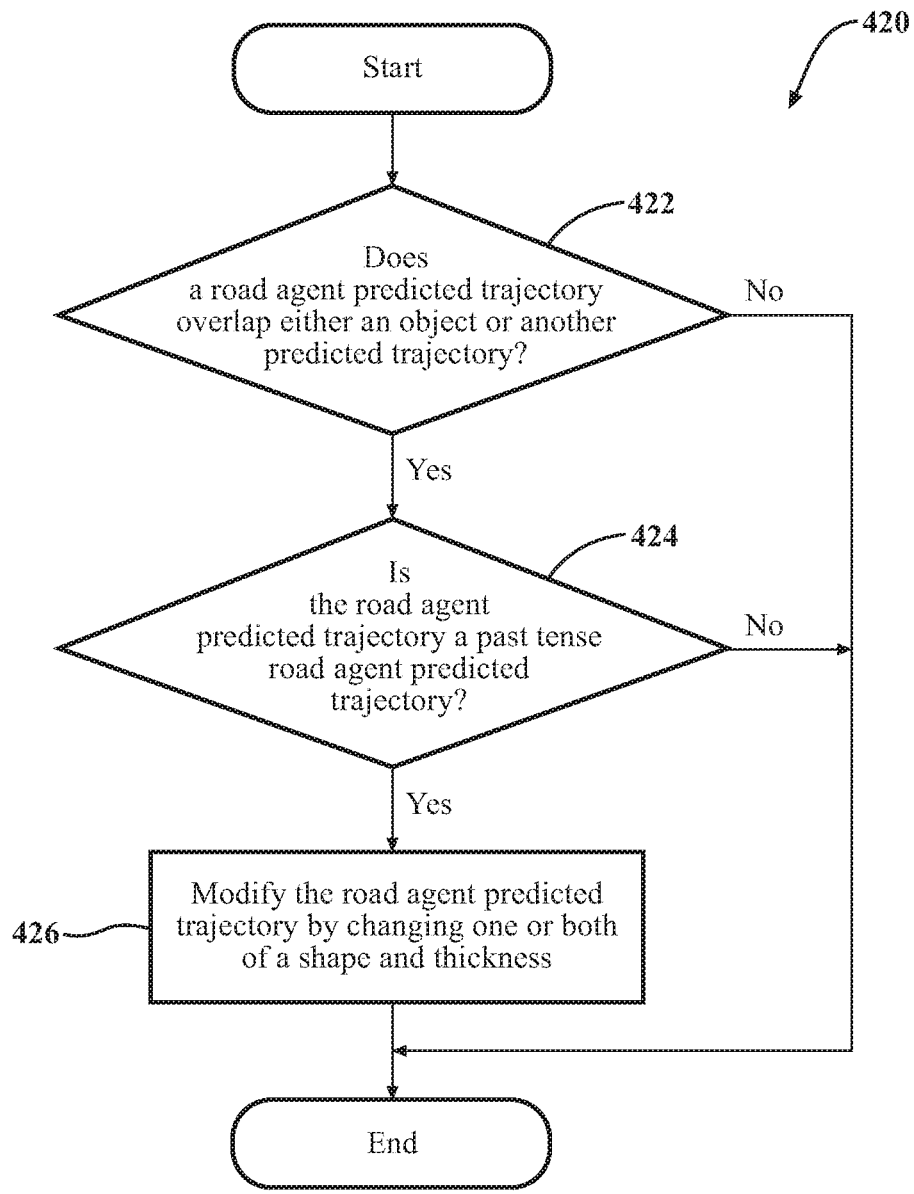
FIG. 32 is a flow chart diagram of a method of modifying at least one predicted trajectory based on an overlap of a projected trajectory and either an object or another predicted trajectory, with a determination that the predicted trajectory is a past tense road agent trajectory, in accordance with an illustrative aspect of the present technology.

FIG. 32 is a flow chart diagram of a method 420 of modifying at least one predicted trajectory based on an overlap of a projected trajectory and either an object or another predicted trajectory, with a determination that the predicted trajectory is a past tense road agent trajectory, in accordance with an illustrative aspect of the present technology. Typically the road agent predicted trajectories are current and/or future trajectories. However, in various aspects it may be beneficial or desirable to provide at least one past tense trajectory, or an indication of a road agent trajectory that has already traversed a portion of the roadway and no longer provides a threat of collision with the ego-vehicle. The method 420 is for generating trajectories for a vehicle user interface showing a driver's perspective view, and includes generating an ego-vehicle predicted trajectory for an ego-vehicle, and generating at least one road agent predicted trajectory for a road agent that is external to the ego-vehicle. As indicated by method step 422, after the respective predicted trajectories are generated, the method 420 continues by determining that at least one road agent predicted trajectory overlaps either an object or another road agent predicted trajectory. The method continues with step 424 to determine that the road agent predicted trajectory is actually a past tense road agent predicted trajectory. In other words, the travel across the roadway has already occurred. As shown in method step 426, the method includes modifying the past tense road agent predicted trajectory, for example, by modifying or changing a shape or thickness thereof.

Figure 33A:
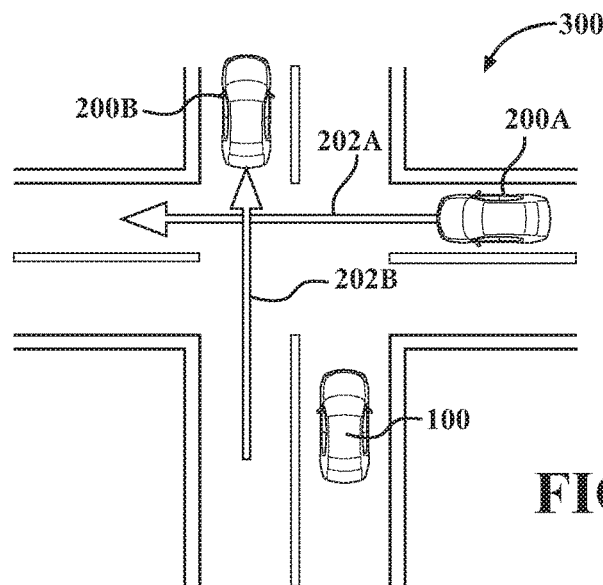
FIGS. 33A-33C illustrate a modification of at least one predicted trajectory, in accordance with the methods of FIG. 32.
Figure 33B:
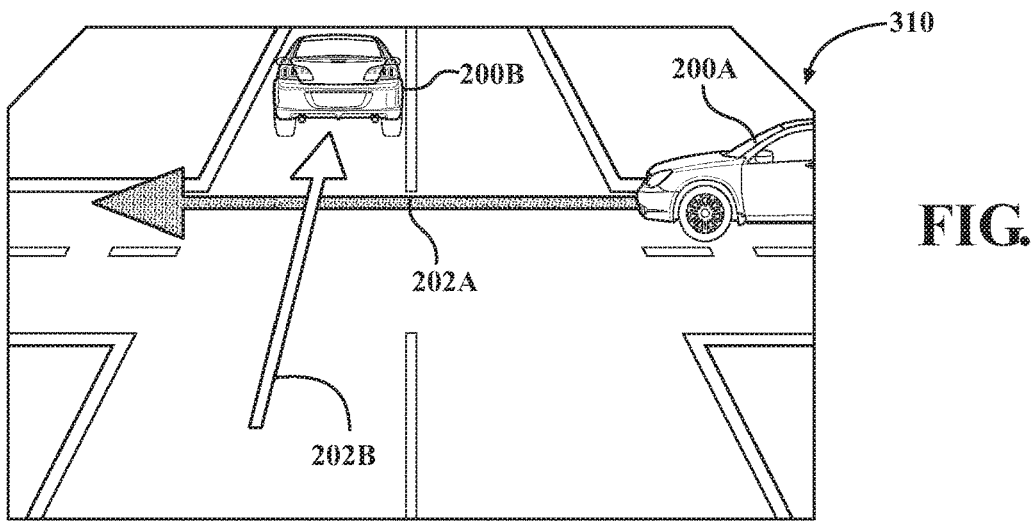
Figure 33C:
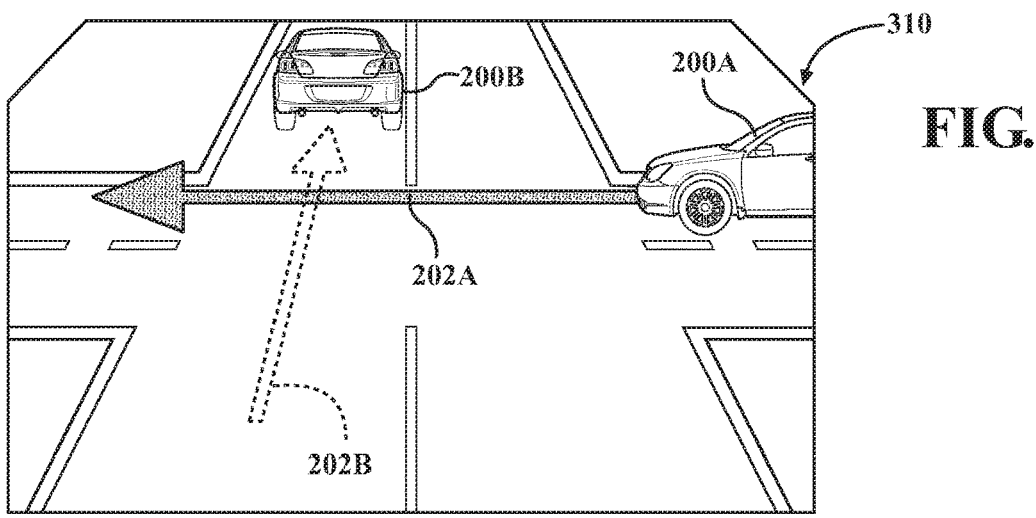

FIGS. 33A-33C illustrate a modification of at least one predicted trajectory, in accordance with the methods of FIG. 32. For example, FIG. 33A provides a top plan view 300 of an ego-vehicle 100 and a first road agent vehicle 200A having a current or future trajectory 202A and a second road agent vehicle 200B with a past tense road agent predicted trajectory 202B. FIG. 33B provides a driver's perspective point of view 310 of the scenario as provided in FIG. 33A. The ego-vehicle predicted trajectory is omitted for clarity. However, the presence of the past tense road agent predicted trajectory 202B may be confusing for user. Thus, FIG. 33C provides a modification of the shape and/or thickness, etc., of the past tense road agent predicted trajectory.

Figure 34:
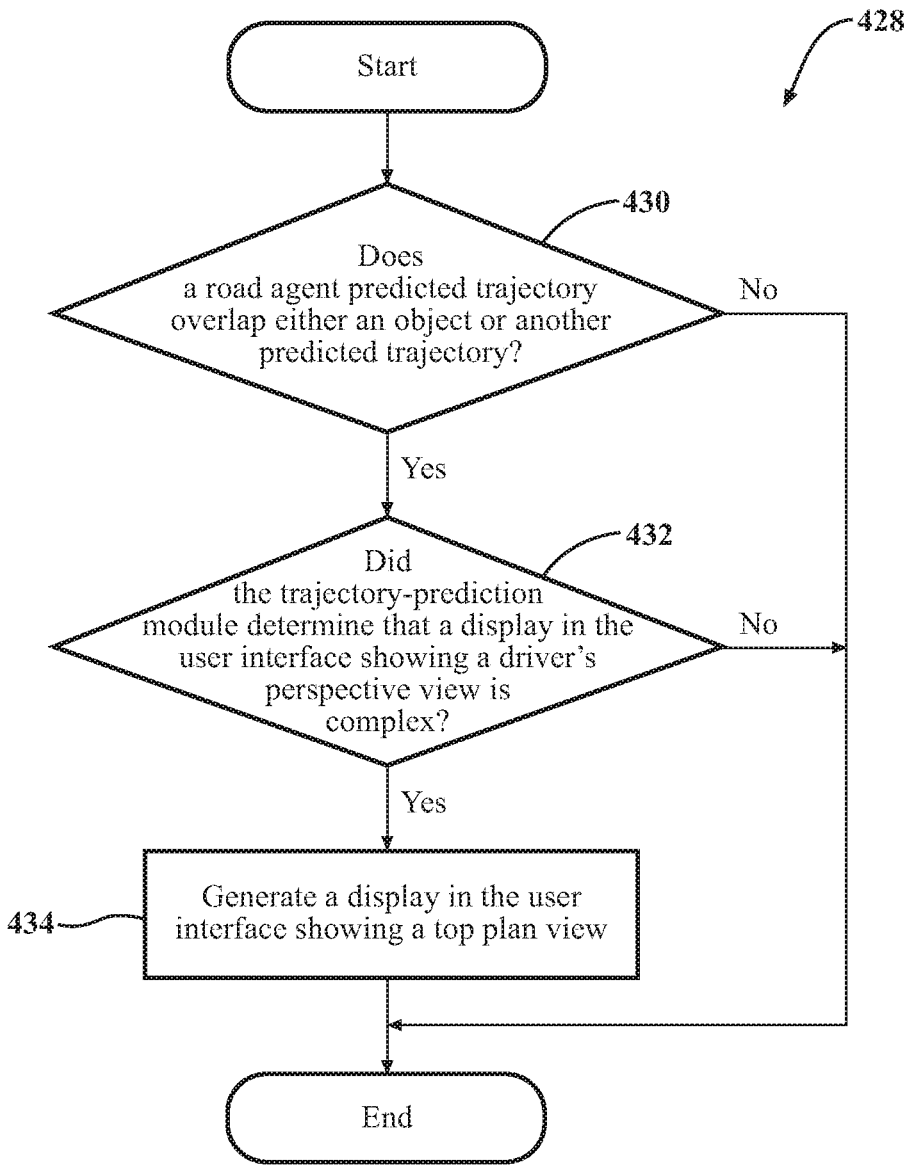
FIG. 34 is a flow chart diagram of a method for selecting a type of display to be provided in a user interface based on complexity, in accordance with an illustrative aspect of the present technology.

FIG. 34 is a flow chart diagram of a method 428 for selecting a type of display to be provided in a user interface based on complexity, in accordance with an illustrative aspect of the present technology. The method 428 is for generating trajectories for a vehicle user interface showing a driver's perspective view, and includes generating an ego-vehicle predicted trajectory for an ego-vehicle, and generating at least one road agent predicted trajectory for a road agent that is external to the ego-vehicle. As indicated by method step 430, after the respective predicted trajectories are generated, the method 428 continues by determining that at least one road agent predicted trajectory overlaps either an object or another road agent predicted trajectory. The method continues with step 432 where the trajectory prediction module determines that a display in the user interface showing the perspective view may be complex or confusing when presented/displayed with a driver's perspective field of view. In various aspects, a determination of complexity can be based on one or more of many factors, including: a threshold number and/or type of road agents and objects present in the display; locations of the road agents, objects, and predicted trajectories; time of day; traffic congestion; weather; experience of the user; duration of travel; and the like. In various aspects, a determination of complexity can be based on one or more calculations or confidence scores that may be based on, for example, density of the predicted trajectories, a number of road agents and/or objects, and a number of overlapping points. As provided in method step 434, the method includes generating a display in the user interface showing a top plan view, as opposed to a driver's perspective point of view. The use of the top plan view is intended to simplify the display and provide a user with a more complete display of surroundings and scenarios. In various aspects, the methods may include requesting instructions to obtain a selection request from a user, and allow a user to preview different display options and to freely switch between the different views. In various other aspects, the methods may include providing both types of displays to the user, for example, providing a top plan view in a first display, and a driver's perspective point of view display in a second display. In still further aspects, a single display can be generated providing both a top plan view and a driver's perspective point of view in a side-by-side arrangement, or the like.

With respect to the display of icons as well as the depiction of predicted trajectories, the roadways, objects, etc., it should be understood that the present technology should not be limited to the specific types and styles that are specifically described herein, and they may be customized as desired. In this regard, 35A-35C illustrate different non-limiting variations of predicted trajectories having different lines, 2-D patterns, and 3-D shapes. For example, FIG. 35 provides different types of line and arrow combinations and designs, which may include indications (shown as dots in FIG. 35A) of separate segments that may indicate a change in direction of travel. FIG. 35B provides different types of two dimensional shapes that may be used in the place of the lines of FIG. 35. The two-dimensional shapes may be designed with different gradients or colors to better indicate a direction of travel, speed, confidence levels, and the like. FIG. 35C provides different types of three-dimensional shapes that may be used in the place of the lines of FIG. 35. The three-dimensional shapes may be similarly be designed with different gradients or colors to better indicate a direction of travel, speed, confidence levels, and the like. The three-dimensional shapes may be provided with various levels of detail, ranging from the use of lines and simple shapes, to the display of detailed three-dimensional objects.

Figure 36A:
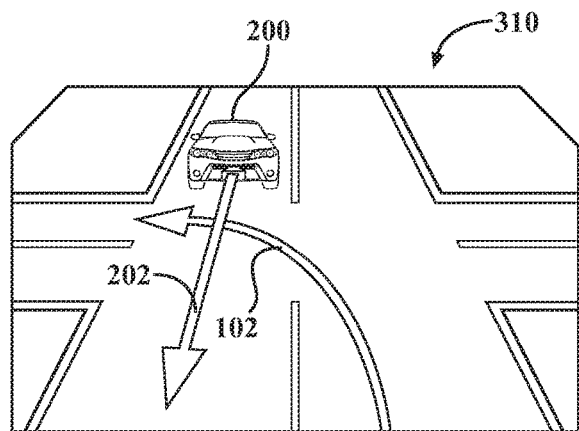
FIGS. 36A-36C illustrate 2-D and 3D predicted trajectories with an overlap of two predicted trajectories.
Figure 36B:
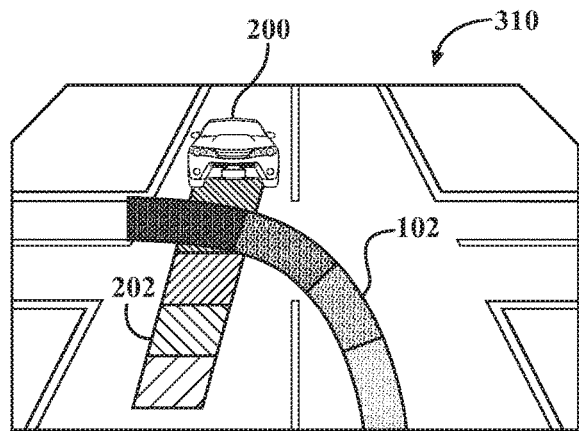
Figure 36C:
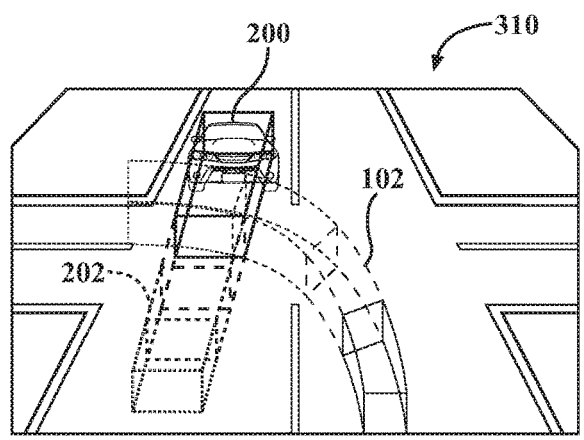

FIGS. 36A-36C illustrate 2-D and 3-D predicted trajectories with an overlap of two predicted trajectories. FIG. 36A illustrates the scenario previously discussed with respect to FIGS. 16A-16C, where the ego-vehicle predicted trajectory 102 intersects and overlaps with the road agent predicted trajectory 202. FIG. 36B provides two sets of two-dimensional shapes with varying colors and gradients to represent the predicted trajectories 102, 202. FIG. 36C provides two sets of three-dimensional shapes with varying colors and gradients to represent the predicted trajectories 102, 202.

Figure 37A:
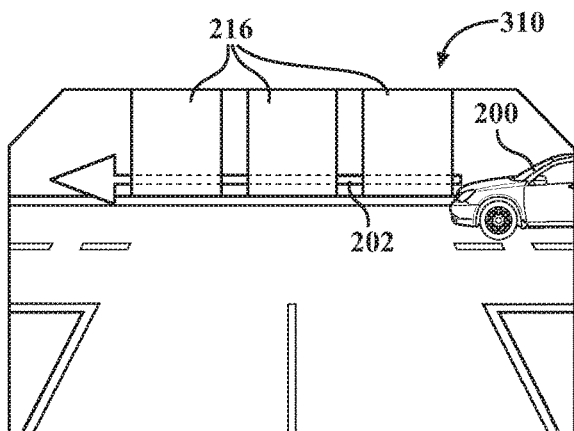
FIGS. 37A-37C illustrate 2-D and 3D predicted trajectories with an overlap of a predicted trajectory and at least one static object.
Figure 37B:
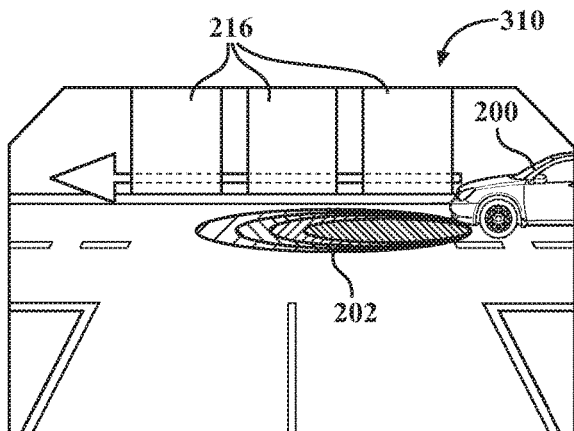
Figure 37C:
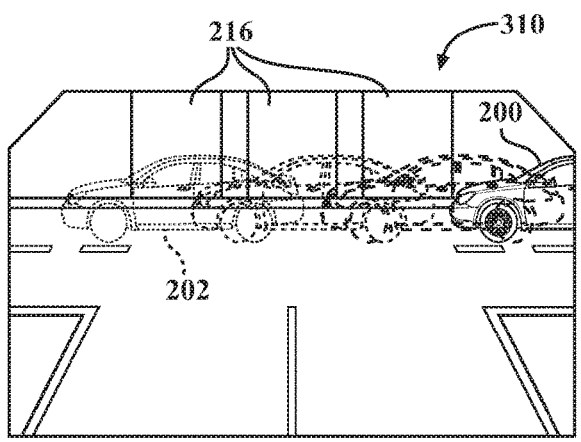

FIGS. 37A-37C illustrate 2-D and 3-D predicted trajectories with an overlap of a predicted trajectory and at least one static object. FIG. 37A illustrates the scenario previously discussed with respect to FIGS. 31A-31C, where the road agent vehicle 200 is travelling adjacent a plurality of static objects 216. FIG. 37B provides two-dimensional shapes with varying colors and gradients to represent the predicted trajectory 202. FIG. 37C provides three-dimensional shapes with varying blending, diluting, and hiding to represent the predicted trajectory 202.

Figure 38A:
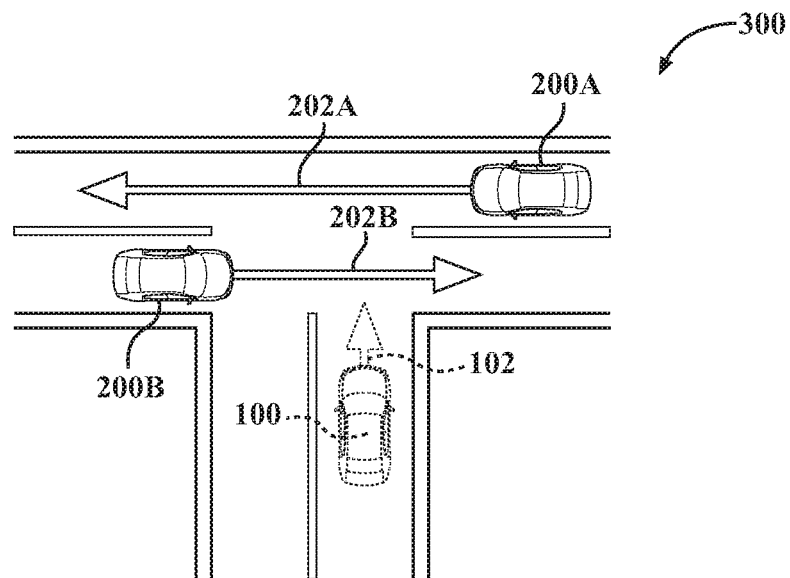
FIGS. 38A-38B illustrate the use of a combination of 2-D and 3D predicted trajectories on a single display.
Figure 38B:
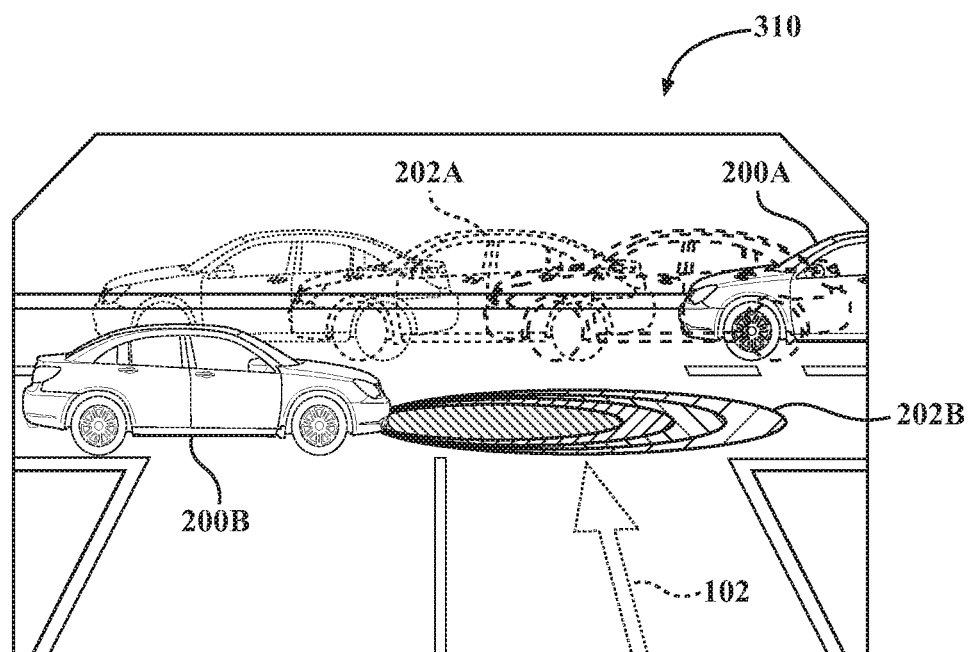

FIGS. 38A-38B illustrate the use of a combination of 2-D and 3D predicted trajectories on a single display. FIG. 38A provides a top plan view 300, and FIG. 38B provides a driver's perspective point of view 310 of the scenario presented in FIG. 38A. Specifically, FIG. 38B provides the ego-vehicle predicted trajectory 102 with a simple line pattern, provides a first road agent predicted trajectory 202A with a three-dimensional shape, and provides a second road agent predicted trajectory 202B with a two-dimensional shape. It should be understood that various modifications and combinations can be used with the present technology. In various aspects, the user may customize and change the display types, and the systems and methods may include changing a shape and/or dimension or predicted trajectories based on predetermined thresholds and requirements.

Each of the various methods described herein can be provided as part of systems that can include one or more processors and memory that may include a trajectory-prediction module including instructions that, when executed by the one or more processors, cause the processors to execute actions to perform the steps described in various parts of the methods. Similarly, each of the methods described herein can be stored as instructions on a non-transitory computer-readable medium.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more aspects, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver/operator. In one or more aspects, the vehicle 100 is highly automated or completely automated. In one aspect, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more aspects, the vehicle 100 operates autonomously according to a particular defined level of autonomy. For example, the vehicle 100 can operate according to the Society of Automotive Engineers (SAE) automated vehicle classifications 0-5. In one aspect, the vehicle 100 operates according to SAE level 2, which provides for the autonomous driving module 160 controlling the vehicle 100 by braking, accelerating, and steering without operator input but the driver/operator is to monitor the driving and be vigilant and ready to intervene with controlling the vehicle 100 if the autonomous module 160 fails to properly respond or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the aspects are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the aspects are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one aspect, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the trajectory prediction system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the trajectory prediction system 170, and/or the autonomous driving module(s) 160 may control some or all of these vehicle systems 140 and, thus, may be partially or fully autonomous.

The processor(s) 110, the trajectory prediction system 170, and/or the autonomous driving module(s) 160 can be operably connected to communicate with the various vehicle systems 140 and/or individual components thereof. For example, returning to FIG. 1, the processor(s) 110, the trajectory prediction system 170, and/or the autonomous driving module(s) 160 can be in communication to send and/or receive information from the various vehicle systems 140 to control the movement, speed, maneuvering, heading, direction, etc. of the vehicle 100. The processor(s) 110, the trajectory prediction system 170, and/or the autonomous driving module(s) 160 may control some or all of these vehicle systems 140.

The processor(s) 110, the trajectory prediction system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the trajectory prediction system 170, and/or the autonomous driving module(s) 160 can control the direction and/or speed of the vehicle 100. The processor(s) 110, the trajectory prediction system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions. Generally, the term module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the trajectory prediction system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed aspects are disclosed herein. However, it is to be understood that the disclosed aspects are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various aspects are shown in the collective figures, but the aspects are not limited to the illustrated structure or application.

The flowcharts and block diagrams in the figures illustrate the architecture, functionality, and operation of possible implementations of systems, methods and computer program products according to various aspects. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing description is provided for purposes of illustration and description and is in no way intended to limit the disclosure, its application, or uses. It is not intended to be exhaustive or to limit the disclosure. Individual elements or features of a particular aspect are generally not limited to that particular aspect, but, where applicable, are interchangeable and can be used in a selected aspect, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple aspects having stated features is not intended to exclude other aspects having additional features, or other aspects incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an aspect can or may comprise certain elements or features does not exclude other aspects of the present technology that do not contain those elements or features. The terms "a" and "an," as used herein, are defined as one or more than one. The term "plurality," as used herein, is defined as two or more than two. The term "another," as used herein, is defined as at least a second or more.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A system for generating trajectories for a vehicle user interface showing a driver's perspective view, the system comprising:
   one or more processors; and
   a memory communicably coupled to the one or more processors and storing:
   a trajectory-prediction module including instructions that when executed by the one or more processors cause the one or more processors to:
   generate at least one road agent predicted trajectory for a road agent that is external to an ego-vehicle;
   determine that at least one road agent predicted trajectory protrudes from a display area and has an unknown direction of travel when displayed on the user interface showing a driver's perspective view;
   modify the at least one road agent predicted trajectory to provide an indication of direction by controlling operation of the user interface to perform at least one of:
   modifying a length of the at least one road agent predicted trajectory;
   adding a directional arrow to an appropriate end of the at least one road agent predicted trajectory; and
   adding an icon representative of the road agent to an appropriate end of the at least one road agent predicted trajectory to be visible when displayed on the user interface showing a driver's perspective view; and
   a control module including instructions that, when executed by the one or more processors, cause the one or more processors to update the user interface to include any modified road agent predicted trajectory.

2. A system for generating trajectories for a vehicle user interface showing a driver's perspective view, the system comprising:
   one or more processors; and
   a memory communicably coupled to the one or more processors and storing:
   a trajectory-prediction module including instructions that when executed by the one or more processors cause the one or more processors to:
   generate an ego-vehicle predicted trajectory for an ego-vehicle;
   generate at least one road agent predicted trajectory for a road agent that is external to the ego-vehicle;
   determine that the at least one predicted trajectory overlaps one or more static object that does not reside on a road or sidewalk when displayed on the user interface showing a driver's perspective view; and
   control operation of the user interface to modify the at least one predicted trajectory by diluting or blending the predicted trajectory at each location where the predicted trajectory overlaps one of the static objects; and
   a control module including instructions that, when executed by the one or more processors, cause the one or more processors to update the user interface to include any modified road agent predicted trajectory.

3. A system for generating trajectories for a vehicle user interface showing a driver's perspective view, the system comprising:
   one or more processors; and
   a memory communicably coupled to the one or more processors and storing:
   a trajectory-prediction module including instructions that when executed by the one or more processors cause the one or more processors to:
   generate an ego-vehicle predicted trajectory for an ego-vehicle;
   generate at least one road agent predicted trajectory for a road agent that is external to the ego-vehicle;
   determine that at least one predicted trajectory overlaps either an object or another predicted trajectory when displayed on the user interface showing a driver's perspective view; and
   control operation of the user interface to modify the at least one predicted trajectory by changing one or both of a shape and dimension of the at least one predicted trajectory; and
   a control module including instructions that, when executed by the one or more processors, cause the one or more processors to update the user interface to include any modified road agent predicted trajectory.

4. The system according to claim 3, wherein the trajectory-prediction module includes an instruction to:
determine that the at least one predicted trajectory is a past tense road agent predicted trajectory; and
the instruction to modify the at least one predicted trajectory comprises an instruction to change one or both of a shape and thickness of the past tense road agent predicted trajectory.

5. The system according to claim 3, wherein the shape and dimension of the at least one predicted trajectory is changed to be different from a shape and dimension of the ego-vehicle predicted trajectory.

6. A system for generating trajectories for a vehicle user interface showing a driver's perspective view, the system comprising:
one or more processors; and
a memory communicably coupled to the one or more processors and storing:
a trajectory-prediction module including instructions that when executed by the one or more processors cause the one or more processors to:
generate an ego-vehicle predicted trajectory for an ego-vehicle;
generate at least one road agent predicted trajectory for a road agent that is external to the ego-vehicle;
determine that at least one predicted trajectory overlaps either an object or another predicted trajectory when displayed on the user interface showing a driver's perspective view;
determine that a display in the user interface showing a driver's perspective view is complex; and
a control module including instructions that, when executed by the one or more processors, cause the one or more processors to:
generate a display in the user interface showing a top plan view; and
update the user interface to include any modified road agent predicted trajectory.

7. The system according to claim 6, wherein the control module further includes an instruction to obtain a selection request from a user to display one of a top plan view and a driver's perspective view.

8. The system according to claim 6, wherein the control module further includes an instruction to generate a display in the user interface showing both a top plan view and a driver's perspective view.

9. A method for generating trajectories for a vehicle user interface showing a driver's perspective view, the method comprising:
generating an ego-vehicle predicted trajectory for an ego-vehicle;
generating at least one road agent predicted trajectory for a road agent that is external to the ego-vehicle;
determining that the at least one road agent predicted trajectory is a past tense road agent predicted trajectory; and
modifying the at least one predicted trajectory by changing one or both of a shape and thickness of the past tense road agent predicted trajectory; and
updating the user interface to include any modified road agent predicted trajectory.

* * * * *